United States Patent
Vera et al.

(10) Patent No.: US 6,809,678 B2
(45) Date of Patent: Oct. 26, 2004

(54) DATA PROCESSOR CONTROLLED DC TO DC CONVERTER SYSTEM AND METHOD OF OPERATION

(75) Inventors: Raul Lucio Vera, Montebello, CA (US); Neil S. Symonds, Newbury Park, CA (US); Raymond J. Martin, Lake Forest, CA (US)

(73) Assignee: PerkinElmer Inc., Wellesley, MA (US)

( * ) Notice: Subject to any disclaimer, the term of this patent is extended or adjusted under 35 U.S.C. 154(b) by 41 days.

(21) Appl. No.: 10/272,702

(22) Filed: Oct. 16, 2002

(65) Prior Publication Data

US 2004/0075600 A1 Apr. 22, 2004

(51) Int. Cl.$^7$ ............................................. H03M 1/50
(52) U.S. Cl. ........................ 341/166; 396/287; 323/299
(58) Field of Search ........................ 363/65, 89, 21.14, 363/21.04, 17; 716/8; 341/166; 396/287; 702/60; 330/10; 323/299

(56) References Cited

U.S. PATENT DOCUMENTS

| | | | |
|---|---|---|---|
| 5,640,626 A | * 6/1997 | Makiyama et al. | ......... 396/287 |
| 5,796,627 A | * 8/1998 | Roldan | ......................... 702/60 |
| 6,031,749 A | 2/2000 | Covington | |
| 6,069,804 A | * 5/2000 | Ingman et al. | ........... 363/21.14 |
| 6,163,139 A | 12/2000 | Symonds | |
| 6,169,669 B1 | 1/2001 | Choudhury | |
| 6,172,889 B1 | * 1/2001 | Eguchi et al. | ................. 363/95 |
| 6,222,745 B1 | * 4/2001 | Amaro et al. | .................. 363/65 |
| 6,331,801 B1 | * 12/2001 | Schmitt et al. | ................ 330/10 |
| 6,400,582 B1 | * 6/2002 | Hemena et al. | .......... 363/21.04 |
| 6,442,047 B1 | * 8/2002 | Cohen | .......................... 363/17 |
| 6,460,168 B1 | * 10/2002 | Yamamoto et al. | ............. 716/8 |
| 6,590,370 B1 | * 7/2003 | Leach | ......................... 323/299 |
| 6,690,590 B2 | * 2/2004 | Stamenic et al. | .............. 363/89 |

OTHER PUBLICATIONS

Cho et al. (U.S. patent application Ser. No. 10/229,612) "Motor Control Drive Current", filed on Aug. 27, 2002.*
Smith et al. (U.S. patent application Ser. No. 10/103,093) "Broadcast data receiver apparatus and method for controlling power supply", filed on Mar. 21, 2002.*

* cited by examiner

Primary Examiner—Jean Bruner Jeanglaude
(74) Attorney, Agent, or Firm—Gregory L. Roth

(57) ABSTRACT

A flexible, reliable and economical DC to DC power converter system includes a plurality of DC to DC converter units, a pulse width modulation current share bus interconnecting the DC to DC converter units and a synchronization signal connected to each of the DC to DC converter units to synchronize each of the DC to DC converter units to the same frequency. Each DC to DC converter unit includes a power section, a controller and a standard universal interface connecting the power section to the controller such that the power section can be changed to accommodate different input voltages, output voltages and current loads without making significant hardware changes in the controller. The controller includes a digital signal processor having a calibration table matching control parameters to the specific circuit characteristics of the power section. The digital signal processor has a clock signal synchronized to the synchronization signal, resolves master/slave contention for controlling the output voltage in response to signals sent and received over the current share bus and generates pulse width modulation power switch control signals controlling the power section to operate in either dual or single converter mode at different frequencies in response to varying system output current demands.

70 Claims, 22 Drawing Sheets

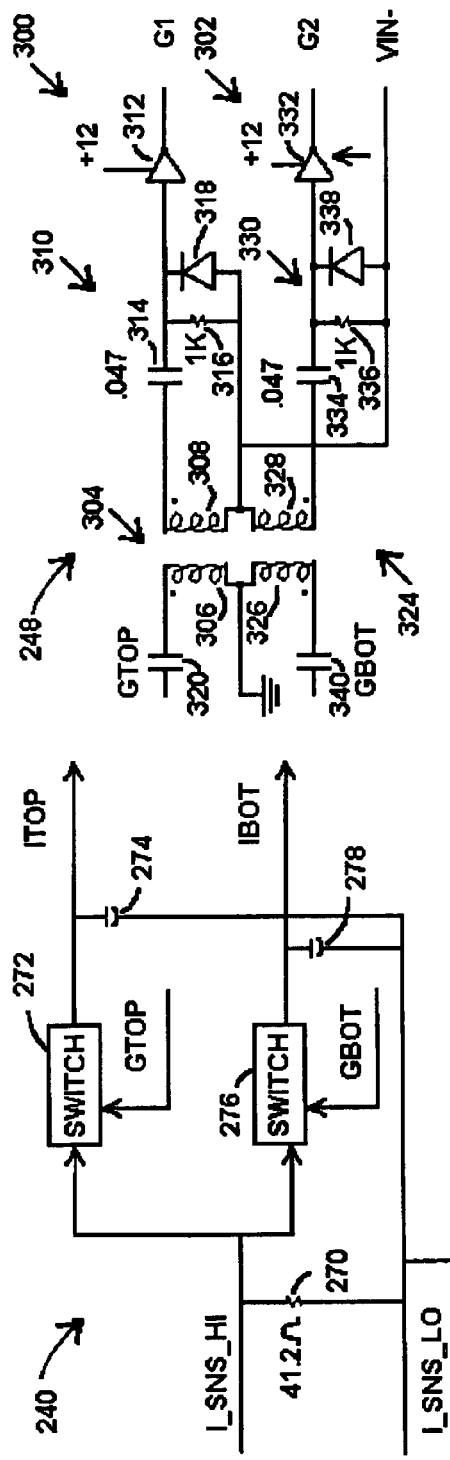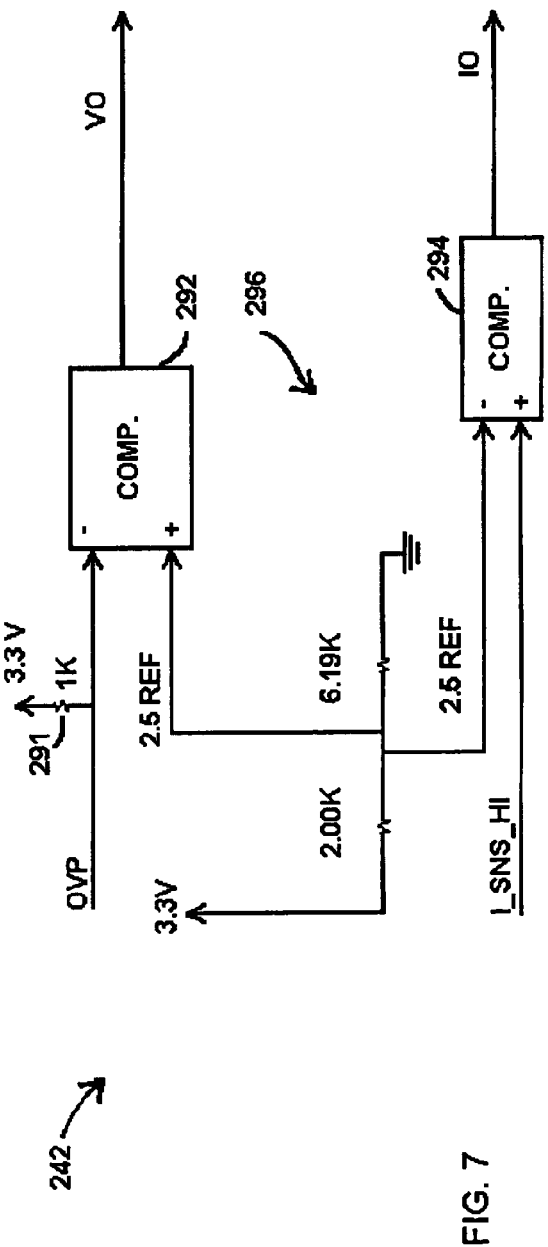
FIG. 6
FIG. 7
FIG. 8

DATA PROCESSOR CONTROLLED DC TO DC CONVERTER SYSTEM AND METHOD OF OPERATION

BACKGROUND OF THE INVENTION

DC to DC converter systems are typically used to supply the electrical power requirements of electronic equipment. The converter systems receive electrical energy from a primary DC source and provide electrical energy output at a precisely controlled voltage or current magnitude. The primary DC source is typically an unregulated voltage source such as a full wave rectifier having a filtered output and an input connected to utility AC power or alternatively the output of an uninterruptible power supply.

DC to DC converters are typically used in applications such as electronic equipment where there is a requirement for one or more regulated voltages, overload protection in the form of current limiting to guard against a short circuit, and galvanic isolation of relatively low voltage loads from higher voltage primary power sources. There are oftentimes requirements for synchronization of the converter switching frequency to an external clock signal and for a bidirectional current sharing signal that enables multiple converters to be connected in parallel so they can share a common load. A continuing trend toward circuit miniaturization demands ever smaller sizes while power conversion efficiency, low cost and reliability remain extremely important.

Conventional DC to DC converters use analog feedback loops that must be custom designed to meet specific requirements for primary input voltage, output voltage and output current. Such designs tend to be relatively inflexible. The design costs are difficult to justify unless a large number of units are to be manufactured. Furthermore, manufacturing costs are often increased by a need to custom select and fit certain circuit components during production testing.

U.S. Pat. No. 6,169,669 to Choudhury teaches an uninterruptible power supply that uses a digital signal processor to control conversion of AC power to DC power and back to AC power. In the event of a power failure, the output AC power is generated in response to DC power provided by a backup battery. U.S. Pat. No. 6,031,749 to Covington et al. teaches a universal power module for lighting systems in which a power converter controlled by a digital signal processor converts a high voltage AC input to DC and then controls power output transistors to generate a desired power output characteristic.

However, a need remains for a flexible, high efficiency, reliable and low cost DC to DC converter that can be readily adapted to accommodate smaller production runs having varying requirements for input voltage, output voltage and current limits.

SUMMARY OF THE INVENTION

An accurate, low cost, flexible DC to DC converter system and method in accordance with the invention includes a plurality of DC to DC converter units connected in parallel, a pulse width modulation current share bus interconnecting the DC to DC converter units, and a synchronization source providing a synchronization signal to each of the DC to DC converter units. Mutual pulse width modulation communication of DC to DC converter unit current information over the current share bus facilitates resolution of master/slave contention among the DC to DC converter units while enabling substantially equal current sharing and accommodation of a DC to DC converter unit drop out.

A method in accordance with the invention includes generating a synchronization signal, synchronizing the clock signals of a plurality of DC to DC converter units to the synchronization signal, generating on the current share bus a pulse width modulation current share signal by each DC to DC converter unit, resolving master/slave contention at each DC to DC converter unit in response to the pulse width modulation signals appearing on the current share bus, automatically assuming the current load of a failed DC to DC converter unit among the other DC to DC converter units and providing substantially equal load current from each operating DC to DC converter unit.

Each DC to DC converter unit includes a power section having two power converter circuits that operate in response to two pulse width modulated power switch control signals, a controller and a standardized universal interface providing communication between the controller and the power section. Communication of signals through the universal interface at standardized signal levels enables changes in the power section to be made to accommodate different input voltages, output voltages and load currents without requiring significant hardware changes in the controller. The standardized universal interface signals include power signals for operation of the controller, signals representing power section input voltage, output voltage and current as well as pulse width modulation power switch control signals controlling the operation of the power section. The power section includes two power converter circuits that are operated in either single converter or dual converter mode at either regular or double frequency in response to pulse width modulation power switch control signals as necessary to maintain required output current while operating in continuous current conduction mode when possible.

Each controller includes a digital data processor communicating the pulse width modulation power switch control signals through the standardized universal interface in response to the power signals, current signals, and input and output voltage signals received from the power section through the standardized universal interface. The digital signal processor reads and drives the current share bus and responds to current share information by either assuming master status and regulating system output voltage or assuming slave status by driving the output with a current substantially equal the current provided by the master. The digital signal processor preferably stores a calibration table that matches the control program to the particular component and operating characteristics of the DC to DC converter unit.

BRIEF DESCRIPTION OF THE DRAWINGS

A better understanding of the invention may be had from a consideration of the following Detailed Description, taken in conjunction with the accompanying drawings in which:

FIG. 6 is a schematic and block diagram representation of a sample and hold circuit used in the controller shown in FIG. 5;

FIG. 7 is a schematic and block diagram representation of a comparator circuit used in the controller shown in FIG. 5;

FIG. 8 is a schematic representation of a driver circuit used in the controller shown in FIG. 5;

DETAILED DESCRIPTION

Figure 1:
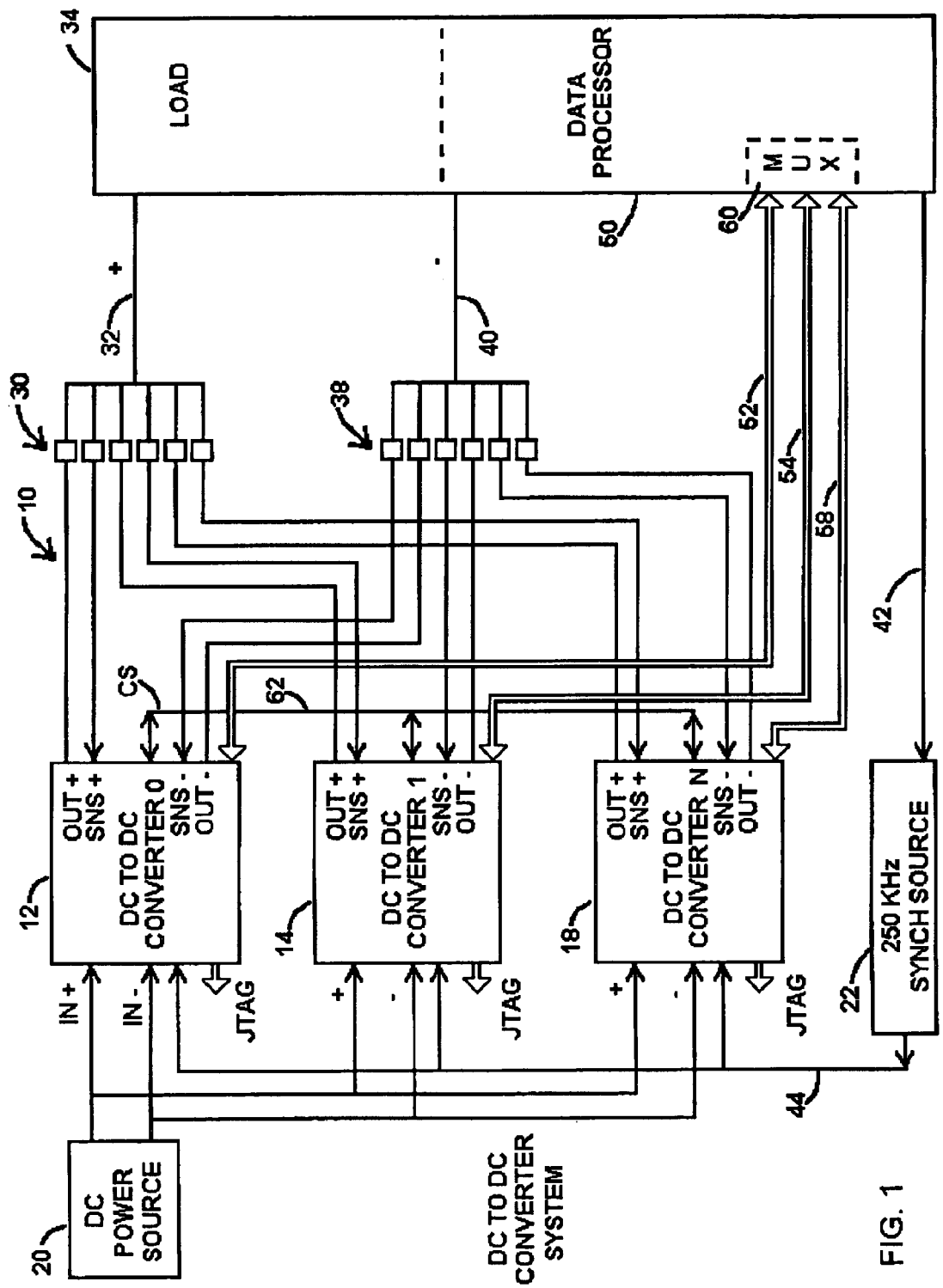
FIG. 1 is a block diagram representation of a DC to DC converter system in accordance with the invention.

Referring now to FIG. 1, a preferred embodiment of a DC to DC power converter system 10 in accordance with the invention includes a plurality of DC to DC power converter units 12, 14, . . . 18, a DC power source 20, and a 250 KHz synchronization source 22. The DC to DC power converters 12–18 of power converter system 10 each have positive power output terminals, OUT+, connected in parallel through a set of plug connectors 30 to a positive power input terminal 32 of a load 34 and negative power output terminals, OUT−, connected in parallel through a set of plug connectors 38 to a negative power input terminal 40 of load 34. Each of the power converter units 12, 14, . . . 18 also has a positive voltage sense input, SNS+, that is connected in parallel through the set of connectors 30 to positive power input terminal 32 of load 34 and a negative voltage sense input, SNS−, that is connected in parallel through the set of connectors 38 to the negative power input terminal 40 of load 34.

While the two separate pairs of terminals OUT+, SNS+ and OUT−, SNS− for each converter 12, 14, 18 appear to be redundantly connected in parallel, a slightly different, but significant, voltage typically appears at the two terminals of a terminal pair in the vicinity of each converter unit 12, 14, . . . 18. Because a heavy current normally passes through the power terminals OUT+ and OUT−, a small voltage drop on the order of a few hundred millivolts may develop along the conductor connecting the power output to the connector 32 or 40. While the voltage drop is small, it can still be significant compared to the tight voltage tolerances of present day electronics equipment. The output voltage sense inputs SNS+ and SNS− are connected to the load power conductors 32, 40 by conductors that do not have heavy load current voltage drops across them and that therefore more accurately reflect the voltages that are being experienced near load 34. The negative power input terminal 40 of load 34 is typically grounded within load 34.

In the present example a regulated output voltage of 5.0 volts is provided to load 34. Load 34 is not part of the present invention, but might typically be a radar system or a navigation system having a data processor 50 as part of the load. Alternatively, a data processor 50 may represent substantially the entire load or there may be no data processor in the load. If a data processor 50 is present, data processor 50 may be connected by user interface buses 52, 54, 58 to converter units 12, 14, . . . 18. In the present example data processor 50 is connected through a multiplexer 60 to converter units 12–18 through user interface buses 52–58, respectively. The connection of a data processor to one or more of the power converter units 12, 14, . . . 18 is not required for operation of the converter units, but if the connection is made an exchange of status information and operating parameters between the data processor 50 and any connected power converter unit 12, 14, . . . 18 is enabled.

A standardized Joint Test Action Group (JTAG) connection is provided for each power converter unit 12, 14, 18 to enable testing and entry of program data into a flash memory of a digital signal processor within each converter unit 12, 14, . . . 18. A current share signal line or path CS 62 connects to each power converter unit 12, 14, . . . 18 and indicates the output current magnitude from the power converter 12, 14, . . . 18 providing the largest output current magnitude. The remaining converter units adjust their current outputs to a substantially equal magnitude, thus enabling substantially uniform sharing of the output load current among all of the converter units 12, 14, . . . 18. The converter unit nominally providing the largest current (because of component tolerances actual current may vary slightly from unit to unit) operates as a DC to DC converter system 10 master by regulating the output voltage on load outputs 32, 40.

The master controls the output voltage and generates periodic current share (CS) pulses every 1.6384 millisecond with a pulse width proportional to the master input current (which is substantially proportional to the output current). The slaves operate in current tracking mode as long as the slave output voltage is at or above the nominal design voltage. The slaves respond to each CS pulse leading edge by placing their own CS pulse onto the WIRED-OR CS bus 62. However, because the pulse width of each slave output current share signal is deliberately reduced by a small offset from the pulse width that would indicate the actual current, during normal operation the slave CS pulses are slightly shorter than the master CS pulses and only the master CS pulses are detected at the controller CS pulse inputs.

However, should the master be unable to maintain its share of the current load for some reason, the slaves will increase their current outputs as necessary to maintain the minimum nominal design output voltage and one of the slave pulse widths will exceed the master pulse width. To prevent minor transient effects from producing a change of master, the slave pulse widths are reduced by a small amount (Current Share Proximity) from the pulse width that reflects the actual current value. When the master recognizes that its own pulse is no longer the widest pulse on the current share bus 62, it relinquishes its status as master, stops sending current share pulses and assigns itself a low priority for again becoming the bus master.

Since the slave units only assert their own pulse onto the current share bus in response to the leading edge of the master pulse, when the master stops asserting pulses onto the current share bus, no further pulses will appear on the current share bus. The slave units monitor the time between each current share pulse as they wait for the bus master to assert the next pulse and when no pulse appears within 5 milliseconds of the expected time period the slave units begin increasing their own priority status until a slave unit reaches sufficient priority status to become a new bus master and begin asserting current share pulses onto the current share bus 62. As discussed more fully hereafter, a Tick Timer Interrupt 412 looks for the CS pulse once every 5 milliseconds. Each time a pulse is not found the slave unit increases its priority. When the slave reaches top priority it assumes the role of current share master and begins placing PWM current share signals on the current share bus. Failure of a converter unit thus allows the remaining units to assume the load of the failed unit and seamlessly continue operation of the power supply system 10 without interruption. Typically a multi-unit power converter system 10 is designed with sufficient power redundancy to accommodate the failure of at least one power converter unit and possibly two or more.

A 250 KHz synchronization source 22 is also an optional feature that enables the switching signals generated by the individual DC to DC converters 12, 14, . . . 18 to be frequency locked to a common signal source so as to reduce beat frequencies and asynchronous noise that might interfere with load equipment that is being powered by the system 10 or that might interfere with nearby equipment. In the present example, 250 KHz synchronization source 22 responds to a reference clock signal received from load 34 over signal path 42 and generates as an output a 250 KHz synchronization signal over signal path 44 that is communicated to each of the converter units 12, 14, . . . 18 as signal SYNCH_IN. The reference clock signal is typically derived from the master clock of data processor 50 or some other clock signal within load 34. Alternatively, 250 KHz synch source 22 can generate the synch signal 44 on a stand alone basis without synchronization to a load clock signal or the DC to DC power converter units 12, 14, . . . 18 can operate without synchronization to an external synchronization signal 44.

DC power source 20 is typically a full wave rectifier receiving electrical power from an AC utility source and providing a filter capacitor across the positive and negative output conductors. DC power source 20 may have alternative implementations such as an uninterruptible power supply or the battery-alternator/generator system of a vehicle.

Figure 2:
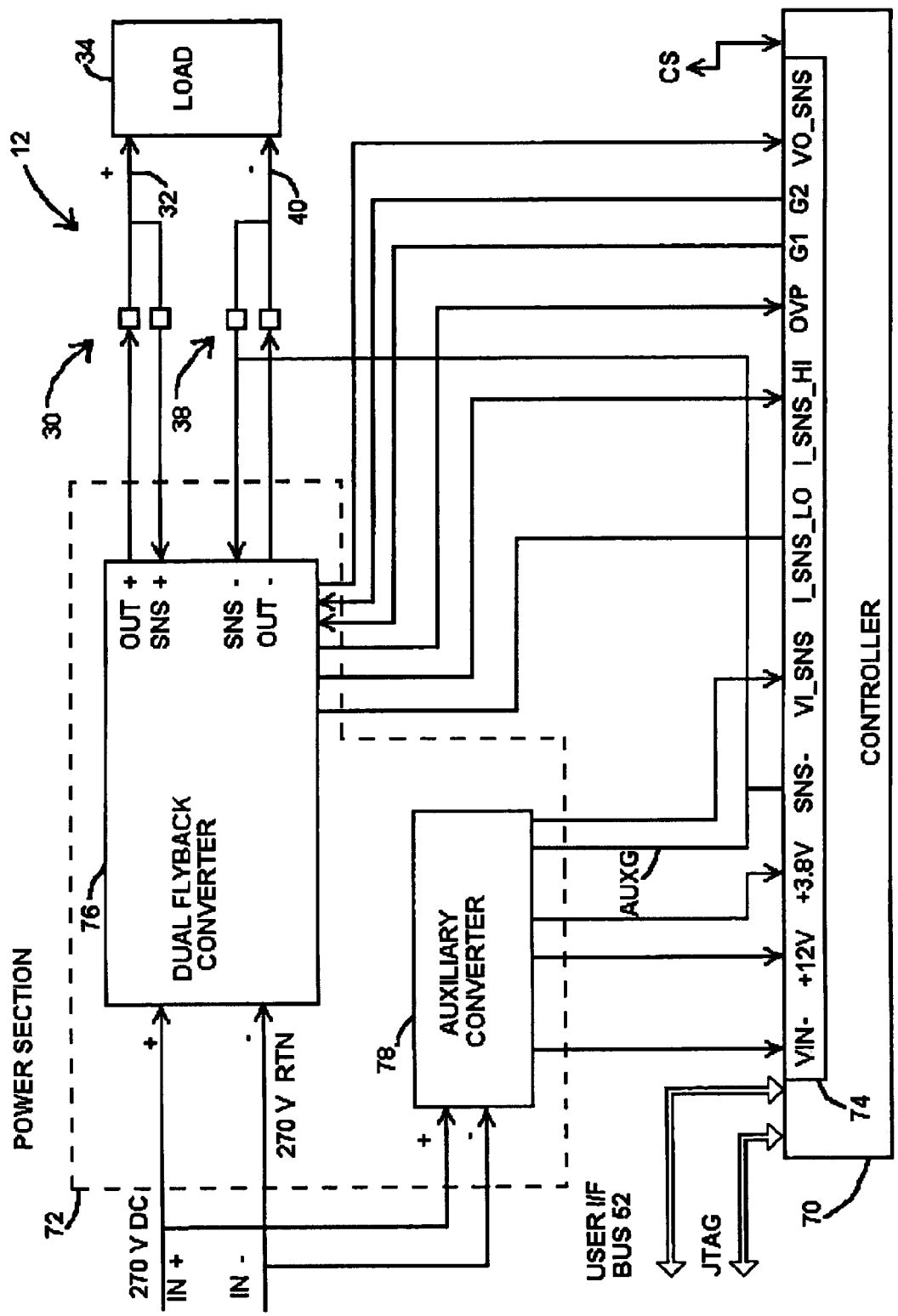
FIG. 2 is a block diagram representation of a DC to DC power converter unit shown in FIG. 1.

Making further reference now to FIG. 2, DC to DC power converter unit 12, which is representative of all power converter units 12, 14, . . . 18, includes a controller 70 connected to a power section 72 through a standardized, universal interface 74. Standardized universal interface 74 has standardized signal levels and information representations that can remain substantially unchanged notwithstanding changes in the design of the power section 72 or the pulse width modulated power converter circuits therein. In addition to the signals in the universal interface 74 connecting controller 70 to power section 72, a current share signal, CS, connects controller 70 to other controllers of the DC to DC converter system 10, a JTAG bus is available for testing and writing firmware parameters and programs and a user interface bus 52 is available for connection to a system level data processor.

The signals in the universal interface 74 enable the communication of power, status and control signals between controller 70 and power section 72. Power section 72 has a dual flyback converter 76, which supplies the heavy load current, and an auxiliary converter 78, which supplies the much lighter power requirements of controller 70 as well as information indicating the input voltage from DC power source 20. Dual flyback converter 76 supplies the load power (current and voltage) at outputs OUT+, OUT− in response to high voltage DC power input IN+, IN−, which are at approximately 270 volts DC in the present example. Signals SNS+ and SNS− sense the positive and negative load voltages while avoiding voltage drops that occur in the main power conductors connected to OUT+ and OUT−. Signal SNS− is ground referenced within controller 70. Auxiliary converter 78 operates in response to the input power signals IN+ and IN− to provide comparatively small power requirements for operating controller 70 and provides a negative voltage signal VI_SNS that represents the input voltage. The negative input power signal, IN−, is communicated to controller 70 through interface 74 as signal VIN− and is the reference for signals +12 V, G1 and G2. A signal AUXG provides the ground reference for the input voltage signal, VI_SNS, I_SNS_HI, I_SNS_LO, OVP, VO_SNS and the 3.8 volt auxiliary power signal. Signal AUXG connects to signal SNS− before being communicated through universal interface 74 to controller 74 and becomes the ground reference for controller 70.

The universal interface provides for communication of a standard set of status and control signals between controller 70 and power section 72 at standardized signal levels which enable a single hardware implementation of controller 70 to accommodate many different design variations in power section 72 and particularly design variations in the power converter 76 portion of power unit 72 with minimal or no changes in the hardware of controller 70.

Varying requirements for input voltage, output voltage and output current may indicate different circuit components or designs for the power section 72. For example, a power section 72 having transistors, transformers and other components optimized for a high input voltage, high output current application may be too expensive or consume too much power for use in a low input voltage or low output current application. The use of the universal interface 74 enables the design of power section 72 to be optimized for specific applications without changing the hardware design of controller 70. Not only can specific circuit components be optimized, but different design and operating modes can be used as long as they can operate in response to the pulse width modulated (PWM) switching signals, G1 and G2, provided by controller 70 to control the operation of power section 72. It may or may not be necessary to change the firmware or control parameters stored by controller 70, in response to circuit changes in power section 72, but changing firmware and control parameters is more cost effective than changing the hardware design of controller 70 to match hardware changes in power section 72.

Figure 3:
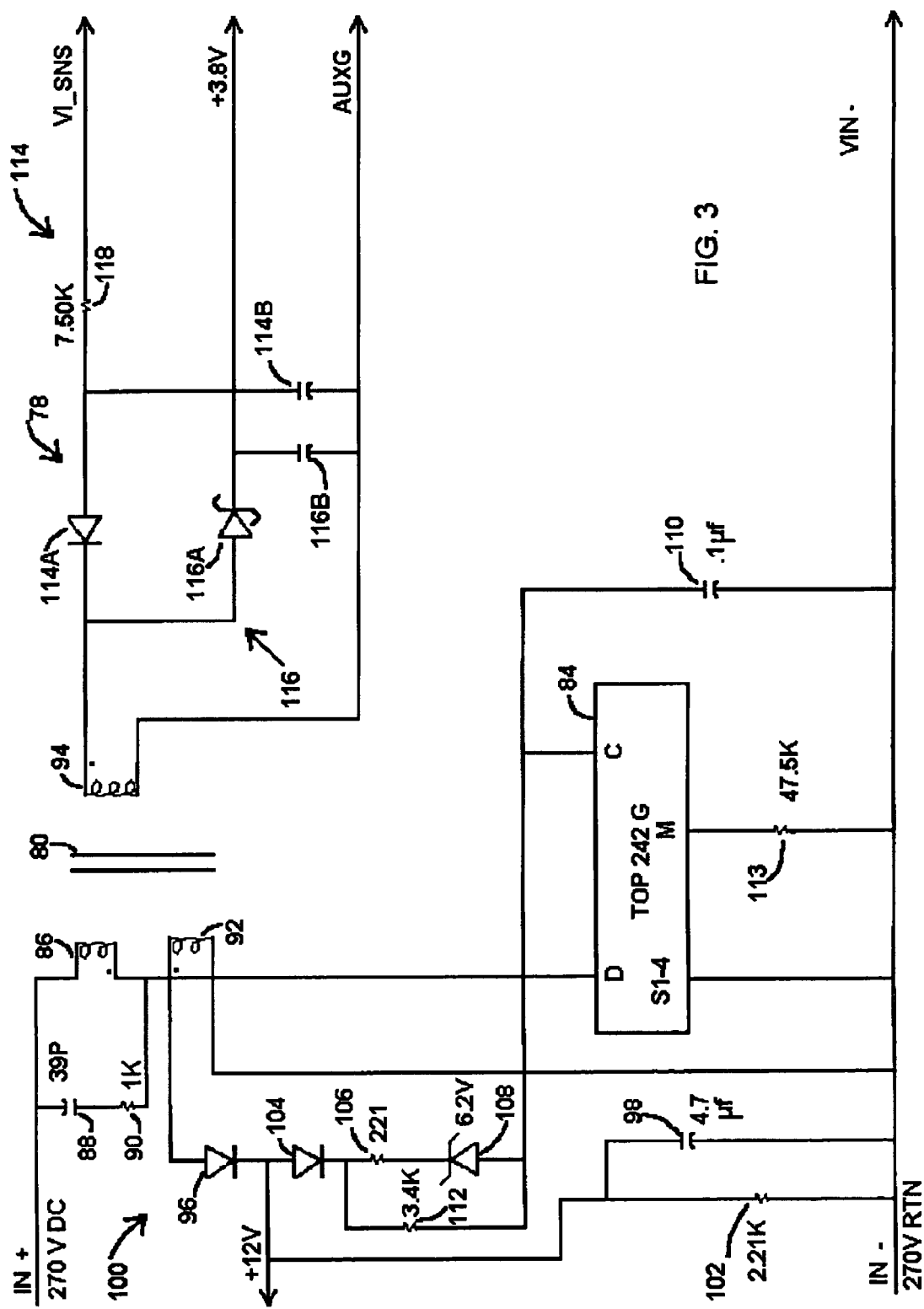
FIG. 3 is a block diagram and schematic representation of an auxiliary power converter used in the power converter unit shown in FIG. 2.

Referring now to FIG. 3, the auxiliary DC to DC converter 78 includes power transformer 80 and a pulse width modulation controller 84 connected to control the operation of an FET power switch within controller 84 to maintain required voltage ranges at the output of auxiliary converter 78. A 187 turn primary winding 86 of transformer 80 has one terminal connected to the system 10 positive power input IN+ and the other end connected to the D or drain terminal of controller 84.

Controller 84 has an internal FET switch having its drain connected to terminal D and its source connected to terminals S1 to S4, which are in turn connected to the input voltage return, IN−, which is input voltage ground. In the present example the input voltage between IN+ and IN− is 270 volts DC. The gate or control terminal of the FET switch within controller 84 is connected to be controlled in pulse width modulation flyback mode by the pulse width modulation controller which produces a duty cycle selected to regulate the +12 volt output from auxiliary converter 78, which is one of the inputs to universal interface 74. A 39 picofarad capacitor 88 and a 1K resistor 90 are connected across primary winding 86 to form a snubber circuit that reduces the amplitude of the voltage transient that occurs at the D terminal of PWM controller 84 when the flow of current through primary winding 86 is interrupted. The transient is caused by energy stored in the leakage inductance of the transformer. PWM controller 84 is advantageously implemented as an integrated circuit. Such a circuit is available from Power Integrations, Inc., as model TOP242G.

Transformer 80 has two secondary windings 92 and 94. Secondary winding 92, which has 33 turns, has a first terminal connected to a diode 96 and 4.7 microfarad capacitor 98, which is connected back to the other terminal of secondary winding 92 to form a half wave rectifier 100. The turns ratio (187:33) of secondary winding 92 is selected to enable the auxiliary converter 78 to operate in flyback mode to maintain a 12 volt output from half wave rectifier 100, which voltage is made available to the universal interface 74. The negative terminal of secondary winding 92 is connected to the negative power input terminal IN− and is designated VIN− at the universal interface 74. A 2.21 K resistor 102 pre-loads the +12 Volt output with about 5.5 ma to help improve voltage regulation.

The C terminal of PWM controller 84 serves as both the power input and the regulated voltage feedback terminal for controller 84. The 12 volt output is connected through a diode 104, a 221 ohm resistor 106 and a 6.2 volt Zener diode 108 to the C input of controller chip 84. The C input is also connected through a 0.1 microfarad voltage stabilizing capacitor 110 to input ground. A 3.4K resistor 112 is connected in parallel with resistor 106 and Zener diode 108.

At startup, terminal D of controller 84 draws approximately 2 ma through primary winding 86 to charge capacitor 110 to about 6 volts through terminal C. When the voltage on terminal C reaches about 6 volts, switching action begins and the chip draws power from the 12 volt output through terminal C and the resistor diode combination 106, 108, 112. Terminal C also performs the voltage regulation feed back function as controller 84 pulse width modulates the internal FET connected to terminal D to maintain the voltage at terminal C at 5.8 volts. When the voltage drops across diodes 104 and 106 are added to the regulated 5.8 volts, the voltage at the 12 volt output terminal is maintained at approximately 12.6 volts. A 47.5K resistor 113 connected between terminal M and ground reduces the current limit point of controller 84 from about 1 amp to about 0.3 amp to protect the fine wire of the transformer windings from damage due to excessive current.

The second secondary winding 94 of transformer 80, which has 11 turns, has a pair of half wave rectifiers 114, 116 connected across the terminals of winding 94. The half wave rectifier 116 operates in flyback mode to produce an output voltage of +3.8 volts for universal interface 74 while the other half wave rectifier 114, which operates as an input voltage detector, is energized concurrently with primary winding 86 to produced a negative output voltage VI_SNS for universal interface 74 that is a scaled version of the input voltage and is indicative of the input DC voltage across terminals IN+ and IN−, except that it is negative in polarity. The load on the 3.8 volt output is approximately constant at about 120 ma.

The return terminal of winding 94 is signal AUXG which is connected to the load negative voltage sense signal, SNS− before being communicated through universal interface 74 to controller 70. The signals are referred to as signal SNS− within controller 70, where they become the ground reference. A 7.50K resistor 118 is connected in series with the input voltage sense signal VI_SNS to provide a standardized voltage level to universal interface 74. Resistor 118 is part of a resistive divider (the remainder is part of the controller 70) (FIG. 5) that shifts the sensed input voltage from negative to positive to accommodate an analog-to-digital converter that requires a positive input voltage.

The half wave rectifier 114 is implemented with a diode 114A and a 0.1 microfarad capacitor 114B connected between the terminals of winding 94. Similarly, half wave rectifier 116 is implemented with a Schottky diode 116A and a 150 microfarad capacitor 116B connected between terminals of winding 94.

Figure 4:
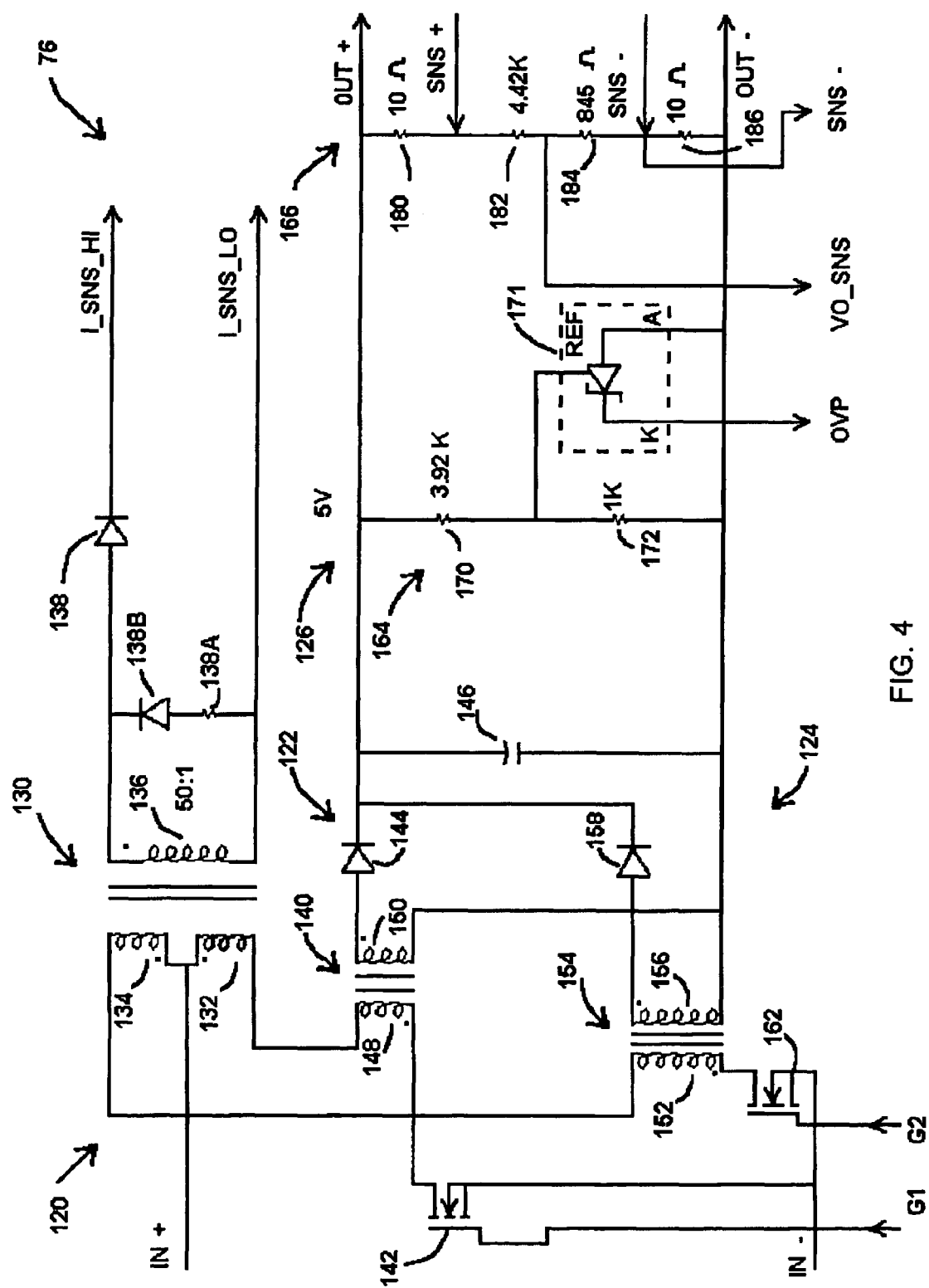
FIG. 4 is a schematic representation of a dual flyback power converter used in the power converter unit shown in FIG. 2.

Referring now to FIG. 4, the dual flyback converter 76 has a current sensing circuit 120, a first pulse width modulated power converter circuit 122, a second pulse width modulated power converter circuit 124 and an output status detector 126. In the present embodiment power converter circuits 122 and 124 are flyback converters because they transfer power to the output during the off time of switches 142, 162 using energy previously stored in the transformers 140, 154 during the first and second power switch 142, 162 on time. Dual flyback converter 76 can operate in either single converter or dual converter mode in response to pulse width modulation control signals G1 and G2, which are part of the universal interface 74. Dual converter 76 generates a regulated DC voltage across outputs OUT+ and OUT−. In the present example, the output voltage is selected to be +5 volts, although other voltages such as +3.3 volts as well as + and −12 volts are also commonly required.

Current sense circuit 120 senses the input current of DC to DC converter unit 12 and includes a current transformer 130 having dual primary windings 132, 134 and a single secondary winding 136 having a turns ratio of 50:1 relative to each of the primary windings 132, 134. Because the input and output currents are substantially proportional to one another, the current sensing circuit 120 is both an input current detector and an output current detector even though current sensing circuit 120 actually detects input current. The output terminals of secondary winding 136 are connected across a diode rectifier 138 whose output terminals form the universal interface 74 current sensing inputs, I_SNS_HI and ISNS_LO, to controller 70. A current sense or burden resistor within controller 70 is connected across the output terminals to produce a voltage that is proportional to the converter unit 10 input current, thus enabling controller 70 to monitor the input current of converter unit 12.

The first power converter circuit 122 includes a first power transformer 140, a first FET power switch 142, a first half wave rectifier diode 144 and a filter capacitor 146 connected across the power output terminals OUT+, OUT−. Power transformer 140 has a 52 turn primary winding 148 and a 4 turn secondary winding 150. Primary winding 148 is connected in series with the first primary winding 132 of current sense transformer 130 and first switch 142 between the positive and negative power input terminals IN+ and IN−. Consequently, when switch 142 is turned on in response to signal G1 current flows from input terminal IN+ through the first primary winding 132 of transformer 130, the primary winding 148 of first power transformer 140 and power switch 142 to the negative terminal IN− of the input power supply.

The flow of current through the first primary winding 132 of current sense transformer 130 is reflected into the secondary winding 136 where it is rectified by half wave rectifier 138 for communication through the universal interface 74 as signals I-SNS_HI and I_SNS_LO to enable controller 70 to monitor the primary winding input current.

A resistor 138A and a diode 138B are also connected across secondary winding 136 to dissipate the magnetizing current.

As current flows through primary winding 148 of the first power transformer 140 the negative of the input voltage is reflected to secondary winding 150 with current flow being blocked by diode 144. With secondary winding current blocked by diode 144, only a magnetizing current flows through primary winding 148. Throughout the pulse width modulated "on" time of power switch 142 the magnetizing current gradually increases and consequently the energy stored by power transformer 140 gradually increases.

When switch 142 turns off, the energy previously stored by power transformer 140 causes current to flow from secondary winding 150, through diode 144 and capacitor 146 and back to secondary winding 150. Since filter capacitor 146 is connected in parallel with the load, an alternative current path passes from secondary winding 150 and diode 144 to the load 34 (FIGS. 1 and 2) and then back to secondary winding 150. Since a longer "on" cycle for switch 142 causes more current to flow through secondary winding 150 during the "off" portion of a duty cycle, the voltage across filter capacitor 146 can be regulated by pulse width modulation of the duty cycle of power switch 142.

The second power converter circuit 124 is essentially connected in parallel with the first power converter circuit 122 except that primary input current passes through the second primary winding 134 of current sense transformer 130 rather than the first primary winding 132. The 52 turn primary winding 152 of second power transformer 154 is connected in series with the 4 turn second primary winding 134 of current sense transformer 130 and a second FET power switch 162 between the DC input power terminals IN+ and IN−. The secondary winding 156 of second power transformer 154 is connected through half wave rectifier diode 158 to filter capacitor 146 and output terminal OUT+ and then back to the opposite terminal of secondary winding 156. Secondary winding 156 and diode 158 of the second flyback power converter circuit 124 are thus connected in parallel with secondary winding 150 and diode 144 of the first flyback power converter circuit 122.

Operation of the second power converter 124 is essentially the same as that of the first power converter 122 except that the duty cycle is controlled by turning second power switch 162 on and off in response to universal interface 174 control signal G2. Normally switches 142 and 162 are turned on during alternating half cycles of a 125 KHz duty cycle with first switch 142 being turned on at the beginning of the first half cycle and turned off after a period of time that varies with the output current load while second power switch 162 is turned on at the beginning of the second half cycle and turned off after a period of time that varies with the output current load.

It is desirable that the converters circuits 122, 124 operate in continuous conduction mode wherein sufficient current flows in the secondary winding 150 or 156 that current flows continuously throughout the off portion of the duty cycle. If the load requirement decreases to the point that the converters 122, 124 begin operating in discontinuous conduction mode wherein the secondary winding current falls to zero before the end of the off portion of a duty cycle, operation of one of the converters can be discontinued by not activating the gating signal G1 or G2 during the corresponding half cycle of the duty cycles. This puts all of the output load on one converter and makes operation in discontinuous conduction mode less likely. When the load increases sufficiently to permit operation of both converters in continuous conduction mode, controller 70 simply begins turning on both switches 142, 162 with PWM control during alternate half periods of a duty cycle.

In the present example under normal load conditions the PWM duty cycle frequency is 125 KHz with signal G1 gating on the first converter 122 at the beginning of a duty cycle and signal G2 gating on the second converter 124 at the beginning of the second half of each duty cycle. Since two converters are switched on during each duty cycle the effective converter switching frequency is 250 KHz. Under light load conditions only the first converter 122 is gated on by signal G1, but the PWM duty cycle frequency is increased to 250 KHz, thus keeping the effective combined switching frequency at 250 KHz.

The output status detector 126 has two separate output voltage detectors implemented as an over voltage detector 164 generating over voltage protection signal OVP for universal interface 74 and output voltage detector 166 generating universal interface 74 signals VO_SNS and SNS−. Over voltage detector 164 is a voltage divider having 3.92K resistor 170 and a 1K resistor 172 connected in series between the positive and negative output terminals OUT+ and OUT−. A voltage detector circuit 171 is connected from a point between resistors 170 and 172 and OUT−. In the present example voltage detector circuit 171 is an LMV431 integrated circuit that is available from Texas Instruments. Voltage detector circuit 171 has its REF terminal connected between resistors 170 and 172 and it's A terminal connected to OUT−. The over voltage signal, OVP, is taken from the K output (cathode) of voltage detector circuit 171.

Under normal circumstances signal OVP is maintained at 3.3 volts by a pull-up resistor (see FIG. 7) and the REF input to voltage detector circuit is below 1.24 volts. However, if the output voltage rises above 6.1 volts, the REF input to voltage detector circuit 171 will rise above 1.24 volts, causing voltage detector circuit 171 to detect an over voltage condition and pull signal OVP down to 1.24 volts above the anode, which is connected to OUT−. OUT− is close to ground. In addition to detecting over voltage conditions, voltage detector circuit 171 generates an over voltage signal, OVP, causing the power supply to be shut down in the event that the voltage sensing terminals SNS+ and SNS− should be connected backwards by a user.

As the output voltage is changed for different load applications, the ratio of resistors 170, 172 can be changed to cause input signal REF to rise above 1.24 volts as the output voltage rises above the selected over voltage magnitude.

The output voltage detector 166 generates universal interface 74 signal VO_SNS, which is the output voltage feedback signal used to control the output voltage and universal interface 74 signal SNS−, which closely represents the ground voltage at a connected load and is used by controller 70 as a low voltage ground reference. Output voltage detector 166 has 4 resistors 180, 182, 184 and 186 connected in series between the power output terminals OUT+ and OUT−. Signals SNS+ and SNS− are returned to converter 76 from the positive and negative power lines of the load and represent the best measurements available to converter 76 of the actual positive and negative (ground) voltages at the load. Signal SNS+ is connected between resistors 180 and 182 while signal SNS− is connected between resistors 184 and 186.

Resistors 182 and 186 each have a value of 10 ohms, which is selected to be large compared to the value of the conductor resistance in the wires connecting signals OUT+, SNS+, SNS− and OUT− to load 34 yet small compared to the value of voltage divider resistors 182 and 184. Because resistors 180 and 186 are large compared to the resistance of the conductor connected to load 34, most of the load current flows through the main load conductors for signals OUT+ and OUT− and most of the current induced voltage drop occurs across these conductors. This means that a much smaller current flow and a much smaller voltage drop occurs across the voltage sense conductors so that signals SNS+ and SNS− accurately represent the actual power supply voltages at the load 34.

Voltage divider resistors 182, 184 are selected to generate a standardized voltage sense output signal, VO_SNS, of 0.80 volt when the load voltage is at its nominal value (5 volts in this example). This value of 0.80 volts, after multiplication by 3 to 2.4 volts (see FIG. 5), is well within the operating range of an analog to digital converter within controller 70 and is also the lowest output voltage for which converter system 10 is designed to provide regulation. If the nominal output voltage is 0.80 volts, resistor 182 is reduced to a value near zero and controller 70 can maintain a minimum 0.80 regulated output voltage. The regulated output voltage can then be changed without changing the design of controller 70 simply by changing the dividing ratio of resistors 182, 184 to accommodate different nominal output voltages. In the present example, resistor 182 is 4.42 K and resistor 184 is 845 ohms to provide a divider ratio of 0.1605 that reduces the nominal output voltage of 5 volts to the required 0.80 volts for signal VO_SNS.

Figure 5:
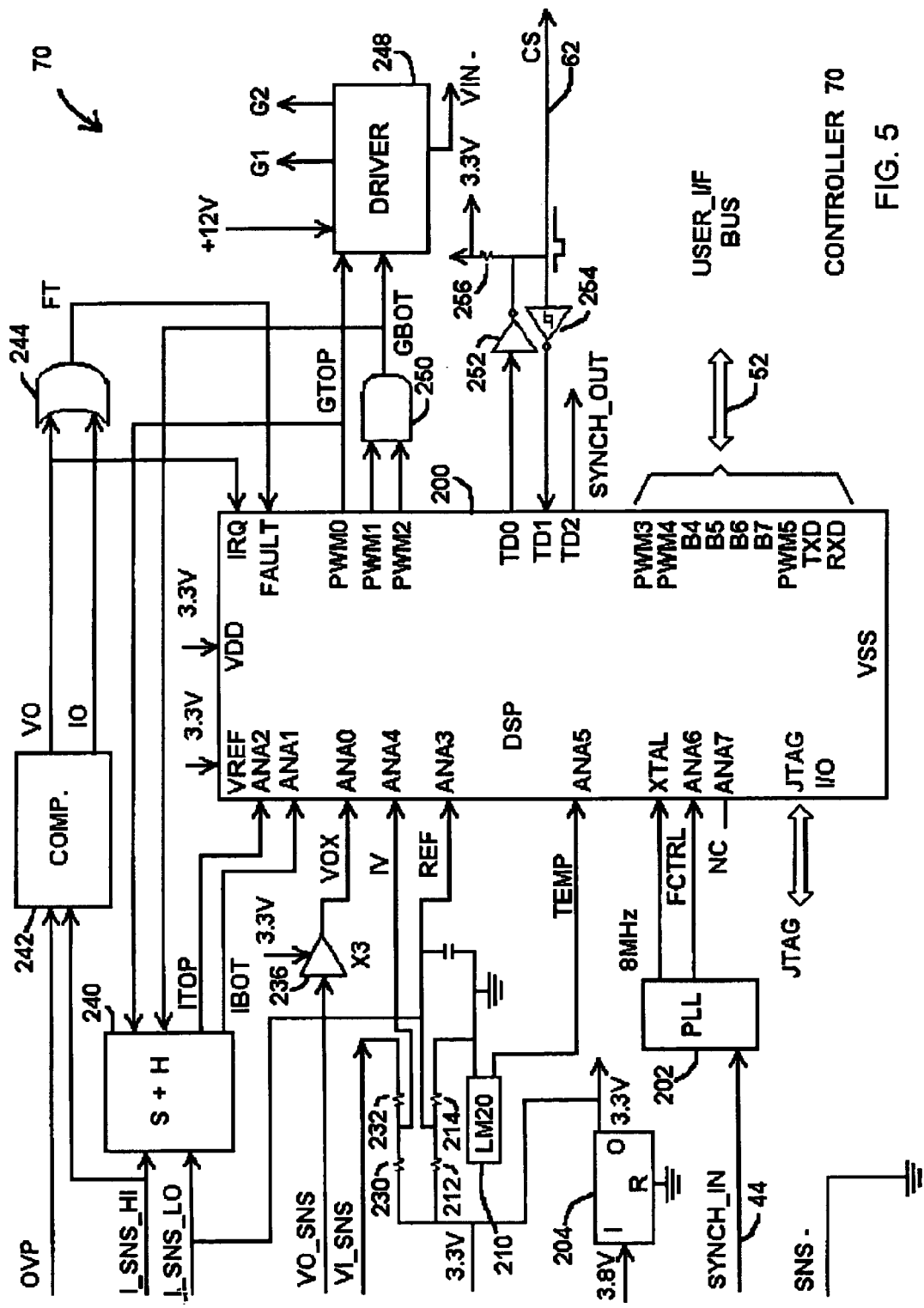
FIG. 5 is a block diagram and schematic representation of a controller used in the power converter unit shown in FIG. 2.

Referring now to FIG. 5, the controller 70 includes a digital signal processor 200 as well as circuits for conditioning the various input and output signals. In the present example digital signal processor (DSP) 200 is implemented on a single integrated circuit chip as a model DSP56F801 signal processor manufactured by Motorola Inc. DSP 200 has 8 analog inputs ANA0–7 that are connected to two analog-to-digital converters and also has six pulse width modulation (PWM) outputs, PWM0–5. The analog inputs receive status information in the form of analog signal representations of various system status signals and the analog-to-digital converters operate in response to the signal inputs to convert the analog representations to digital representations that are stored as digital values in a digital buffer and made available for digital processing under program control. The received status information includes input current information derived in response to the input current signals that are indicative of the input current to the power converter circuits 122, 124, output voltage information derived in response to the output voltage signal that is indicative of the output voltage of the converter unit 12, over voltage information derived in response to the over voltage signal that is indicative of the voltage at the outputs of the power converter circuits 122, 124 and input voltage information that is derived in response to the input voltage signal and indicates the input voltage to the power converter unit 12 and the power converter units 122, 124. The PWM0, PWM1 and PWM2 outputs are programmable to emit constant frequency logic signals whose frequencies and pulse widths or active portions of duty cycles can be selected and modified under program control by the core program execution unit of DSP 200. The PWM3, PWM4 and PWM5 outputs are programmed as software controlled latched logic outputs that are used for test purposes.

DSP 200 also has several programmable logic inputs and outputs and a serial interface that can be used to implement status and control functions. A standard JTAG (Joint Test Action Group) interface is available for the manufacturer to use for loading firmware into the internal flash memory of the DSP 200 and for testing. DSP 200 has its own internal 8 MHz clock reference and can optionally operate either in response to the internal reference or in response to an external 8 MHz clock signal reference received at input XTAL. The DSP 200 clock frequency is at a frequency 10 times the external or internal clock reference signal or 80 MHz.

In the present example a phase locked loop 202 optionally receives a 250 KHz clock signal, SYNCH_IN, from a system source as previously discussed, multiplies the frequency by 32 and outputs an 8 MHz clock signal to DSP 200 input XTAL, which 8 MHz clock signal is frequency locked to the received 250 KHz clock signal. The frequency control signal, FCTRL, used by phase locked loop 202 to command a variable frequency oscillator is connected to analog input ANA6 of DSP 200. DSP 200 starts up under control of its internal 8 MHz clock signal reference when power is first applied. Subsequently, it can test the magnitude of signal FCTRL under program control. If this signal is within a selected magnitude range that indicates phase locked loop 202 is properly generating an 8 MHz clock signal in response to a 250 KHz input signal, DSP 200 can switch under program control to generate its 80 MHz clock signal in response to the 8 MHz clock signal received at input XTAL. DSP 200 has an internal phase locked loop that generates the nominal 80 MHz clock signal at a frequency 10 times the 8 MHz signal received at terminal XTAL.

The return signal SNS− from the negative or ground load voltage is most likely connected to ground within a load 34. Signal SNS− becomes the zero voltage reference for the controller 70. The 3.8 volt local power supply input from the auxiliary converter 78 is connected to an integrated circuit voltage regulator, which outputs a regulated 3.3 volt power signal in response to the 3.8 volt input signal. This signal provides the $V_{DD}$ power input to DSP 200 as well as several 3.3 volt reference signals to different location within controller 70, including an input VREF that is used as a voltage reference by the analog-to-digital converters.

A temperature sensing circuit 210 is connected between the 3.3 volt power signal and ground and generates a temperature indication signal, TEMP, that varies inversely with temperature. Signal TEMP is connected to analog input ANA5 of DSP 200. Temperature sensing circuit 210 is implemented as a model LM20 micro SMD Temperature Sensor that is available from National Semiconductor. If controller 70 becomes overheated or too cold, DSP 200 operates in response to signal TEMP to set a flag, TEMP Over/Under in System Status. In a given application the flag can be responded to by generating warning signal, shutting down the power section 72 by terminating active status of the G1 and G2 switching signals or by take other protective action. No response is presently implemented in this example.

A 0.25 volt reference signal, REF, is generated at the junction of two voltage divider resistors 212, 214, which have values of 7.15K and 590 ohms. Signal REF is connected to the ANA3 analog input to DSP 200 and input as digital signal REF Result for use in compensating the digital values determined by the analog-to-digital converters. The internal analog-to-digital conversions experience errors as the temperature of DSP 200 changes. To provide a uniform zero reference notwithstanding these variations, a variable Offset is generated in response to REF Result in a smoothing operation and is used to correct for these errors.

Universal interface signal VI_SNS, which represents the input voltage from DC power source 20, is derived from a 7.50K resistor 118 within auxiliary power converter 78 and connects to one end of a resistor voltage divider network having two resistors 230, 232 connected in series between 3.3 volts and signal VL_SNS. Resistor 230 has a value of 2 K and resistor 232 has a value of 10 K. Signal VL_SNS is a negative voltage and connection of the signal through the voltage divider to +3.3 volts provides a positive voltage offset that increases the signal to a positive value that is within the 0.25 to 3.0 volt range of the analog-to-digital inputs to DSP 200. An input voltage signal, IV, that is responsive to the input voltage is taken from the junction point between resistors 230 and 232 and connected to the analog input ANA4 of DSP 200. Placing a portion of the resistance of the voltage divider with the auxiliary converter circuit 78 allows different nominal input voltages to be accommodated by changing resistor 118 of the auxiliary converter and without changing the controller 70, thus allowing standardization of controller 70 notwithstanding different input and output voltage requirements.

Universal interface signal VO_SNS carries information representing the value or the regulated output voltage at the load and represents the value that is actually controlled by controller 70. It will be recalled that voltage divider resistors are selected to provide signal VO_SNS a magnitude of +0.80 volts when the output voltage at the load is at the design value, which is 5.0 volts in the preferred example. To use the maximum resolution of the DSP 200 analog-to-digital converter, an amplifier 236 amplifies the signal VO_SNS by a predetermined amount to generate an amplified signal VOX that is connected to the ANA0 input of DSP 200. Amplifier 236 has an internal voltage divider that responds to signal +3.3 volts to generate a positive offset of 0.25 volt at signal VOX that is later subtracted out in response to the reference signal REF. In the present example, the nominal 0.80 volt signal is multiplied by a factor of 3 to 2.4 volts and then offset an additional 0.25 volts to 2.65 volts, which represents about 80% of the 0.25 to 3.3 volt range of the analog-to-digital converters.

This allows the output voltage feedback signal VO_SNS to increase to 1.0 volt or 25% above its nominal controlled output value before reaching the maximum input range of 3.3 volts of the DSP 200 analog-to-digital converter. At a 25% over voltage the output voltage is considered beyond an acceptable range and the power converter unit is shut down. The full 0.25–3.3 volt range of the analog-to-digital converter thus coincides with the full output voltage range of 0–125% of nominal magnitude (0–6.25 volts in the present example) and the full resolution of the DSP 200 internal analog-to-digital converter is utilized.

Satisfactory operation could be achieved with the output voltage value received at DSP 200 scaled to fall in the range of 70–90% of the 3.3 volt full scale input when the output voltage is at its nominal value (5 volts in the present example) with 80% being preferred. Above 90% the allowance for over voltage becomes severely limited while below 70% the precision is reduced while allowing for more over voltage than is necessary.

The input current sense signals I_SNS_LO and I_SNS_HI from the universal interface 74 are communicated to a sample and hold circuit 240 where the representations of current magnitude for the first and second converter circuits 122, 124 are latched at the end of the PWM switch on time in response to switch gating control signals GTOP, GBOT, respectively, and made available to the DSP 200 analog inputs at ports ANA2, ANA1 as signals ITOP and IBOT. Sample and hold circuit 240 is described in greater detail hereafter. Signal I_SNS_LO is the return signal for the current sense signal and is connected to signal REF to provide a 0.25 volt offset for the current sense signals. This offset meets DSP 200 analog input requirements and permits compensation for temperature induced variations when the offset is later subtracted out in response to the REF input signal.

Because power converter circuit 122 appears in FIG. 4 above or on top of power converter circuit 124, power converter circuit 122 will be referenced in conjunction with DSP 200 and the software as the first or "top" (TOP) converter circuit and converter circuit 124 will be referenced as the second or "bottom" (BOT) converter circuit. However, the selection of which converter is selected as the first or top converter is arbitrary.

The universal interface 74 signals I_SNS_HI and OVP contain information representing input current (which is substantially proportional to the output load current) and output over voltage at the dual flyback converter 76, which indicates whether or not the output voltage exceeds a predetermined value, and are communicated to a comparator circuit 242. Comparator circuit 242 compares the signal I_SNS_HI to a voltage reference signal and generates a logic high or active over current logic signal, IO, if signal I_SNS_HI exceeds a predetermined selected limit. Comparator 242 also compares over voltage signal OVP to a voltage reference signal and generates a logic high or active over voltage logic signal, VO, if signal OVP drops below a predetermined, selected limit. Signal OVP is normally pulled up to 3.3 volts by a pull-up resistor but is driven low in the event of an over voltage condition. If either signal VO or IO goes active high it activates the output, FT of an OR gate 244.

Signal FT is connected to the FAULT input of DSP 200, causing DSP 200 to immediately terminate the generation of switch gate control signals GTOP and GBOT if either an over voltage or over current situation is detected at the flyback converter 76. In the present example, a fault is signaled if either current or voltage exceeds the design value by 25%. Signal VO is also communicated to the IRQ terminal of DSP 200 to generate an interrupt request, IRQ, if an over voltage condition exists. The IRQ interrupt code sets an IRQ Over Voltage flag which informs the remainder of the program that the fault was caused by an over voltage condition. If a fault is triggered by an over voltage a serious system problem is assumed and resumption of the gating signals GTOP and GBOT is permitted only after power has been turned off and back on. If the FAULT input is triggered by an over current condition (perhaps an accidental shorting of the output terminals), a transient condition is assumed and the firmware is permitted to reset the fault condition and continue operation of the dual converters 76. Comparator circuit 242 is discussed in greater detail hereafter.

The six PWM outputs from DSP 200, PWM0–5, can emit constant frequency logic signals having pulse widths and frequencies controlled by the DSP 200 core program execution unit under program control. In the present implementation PWM0–2 are used to generate the power switch gating control signal GTOP and GBOT from which gating signals G1 and G2 are derived by driver circuit 248 to actually control the power switches. Signal GTOP is generated directly at output terminal PWM0 with the active portion of a duty cycle beginning at the start or each duty cycle and continuing for a period of time (less than one half the duty cycle) that is determined under program control to maintain the output voltage of converter 76 at the design value (5 volts in the present example). In dual converter operation the maximum active duty cycle portion is 3.2 microseconds. In single converter operation the maximum active duty cycle portion is 1.6 microseconds.

DSP 200 allows each PWM output to be set up under program control to generate a PWM output at a selected frequency with a selected active portion for each duty cycle. Consequently, the operating program can update the active time of the output duty cycle from time to time as needed to regulate the output voltage of converter 76 without having to individually control each duty cycle.

When operating in dual converter mode, the output switch control signal GBOT has nominally the same active time duration as signal GTOP (small differences can be imposed to compensate for circuit component tolerance variations), but is delayed by one half duty cycle switching period. The particular DSP 200 does not conveniently permit this half cycle delay, but does permit the generation of an inverted clock signal at the duty cycle frequency that is low or off for the first half of each duty cycle period and high or on for the second half of each duty cycle period. Such a signal is output at terminal PWM1.

The signal output at terminal PWM2 is selected to have the active portion of the duty cycle set at the selected time duration plus one half of a duty cycle switching period. The two signals output from terminals PWM1 and PWM2 are then gated by an AND gate 250, causing the output gating control signal GBOT to have an active high duty cycle portion that begins when output PWM2 goes active at the beginning of the second half of each duty cycle and remains active high for the determined active time period under control of the output from PWM2. The net effect is thus to delay the active or on time of signal GBOT by one half duty cycle switching period relative to signal GTOP.

In addition to controlling the actual gating signals generated by driver circuit 248, signals GTOP and GBOT are communicated to sample and hold circuit 240 where they control the sampling of the input current signals, I_SNS_HI and I_SNS_LO. The voltages of the input current signals are held in response to the negative transition at the end of the active high interval of each PWM duty cycle so that the held voltage represents the peak input or magnetizing current magnitude at the time the switches 142, 162 (FIG. 4) are turned off.

The TD0 terminal of DSP 200 is configured as an output terminal driving the current share (CS) signal line 62 through an open drain output inverter-driver 252 while terminal TD1 is configured as an input terminal responding to the CS signal through an inverting Schmidt trigger 254. Signal line 62 is also connected through a pull-up resistor 256 to +3.3 volts, thus effectively forming a WIRED-OR current share bus CS 62. DSP 200 can emit a pulse on terminal TD0 which is connected via the open drain inverter driver buffer 252 to the CS signal line 62. DSP 200 can measure the width of a pulse appearing at input TD1 as communicated through Schmidt trigger 254 from the CS signal line 62.

When power is first applied to the converter system 10, the converters 12, 14, . . . 18 each monitor the CS bus 62 in slave mode to see if any signals are present on the bus. If none is found the slave units begin increasing their priority with each occurrence of the 5 millisecond Tick Timer interrupt. When a slave unit achieves adequate priority without finding a CS 62 pulse, that slave unit assumes master status and begins emitting a stream of pulses at a frequency of approximately 0.6103 KHz (1.6384 millisecond period) with the pulses having a duration in 25 nanosecond increments that is proportional to a software value, Average FET Current, that is derived from the peak switch current of its flyback converter 76 as measured in response to the digitally converted signals ITOP Result and IBOT Result which are digitally converted in response to the analog peak input current signals ITOP, IBOT at ports ANA2 and ANA1, respectively, of DSP 200.

If a pulse is found on the current share bus 62, the DSP 200 emits a pulse synchronously with the pulse found on the bus, which synchronous pulse has a duration proportional to the software value Average FET Current, which is responsive to input current. The width of the slave pulses are reduced by a small offset that prevents normally occurring small signal changes from causing a change in the current share master. The emitted pulse is synchronous in the sense that the emitted pulse has an active high state (at the DSP 200) which begins simultaneously with the active high state of a pulse received at port TD1 from the bus.

Each converter also measures the duration of each pulse on the current share bus, CS. Because of the wired-or nature of the CS bus, the measured pulse duration will be the duration of the longest pulse placed on the bus by any of the converter units 12, 14, . . . 18, which corresponds to the unit having the largest current. If a converter unit 12, 14, . . . 18 finds that a measured pulse has the same duration as the pulse it emitted onto the bus, it assumes that it emitted the longest pulse and is handling the largest peak input current and therefore assumes the role of current share master. Otherwise it assumes the role of current share slave.

The master converter thereafter initiates the CS pulses until it either fails or is forced to yield its role as master by sensing a pulse on the CS bus that is longer in time duration than its own pulse. If the master fails, no pulses are generated. This failure of pulse signals causes the slave unit with the highest priority to assume the role of the new bus master. The slave converter units interpret the difference between the duration of the pulses on the CS bus and the duration of their own pulses (adjusted for the actual current value without the small offset reduction) as an error value that is input to a proportional integration differential (PID) control loop that is executed under program control by the firmware of the DSP 200. The output current from each slave DC to DC converter 12, 14, . . . 18 is regulated or feed back controlled to be equal to the current that is being supplied by the master as indicated by the duration of the current sharing pulses. In this way the load current is shared substantially equally while each slave unit remains a slave under normal circumstances with the peak input current and corresponding CS pulse duration at each slave approaching that of the master converter unit, but with the slave unit current sharing pulse duration remaining slightly less than that of the master converter unit because of the small, predetermined fixed offset subtracted from each slave unit pulse duration.

In this way the master converter unit remains master and the slave converter units remain slaves until something unusual happens. The program execution unit of the master unit DSP 200 operates a feedback loop under control of the DSP 200 firmware to regulate the load 34 voltage as sensed by signal VO_SNS and input to analog input ANA0 as signal VOX following magnitude multiplication by amplifier 236 and a 0.25 volt offset. While the master unit regulates the load voltage, the slave units share the load current by maintaining their own input currents (and consequently their output currents) equal to that of the master as long as the indicated output voltage does not drop below the nominal value.

The converters are not permitted to allow the load output voltage to drop below the nominal value. Consequently, if the master converter fails or its output voltage falls, one or more of the slave converters will deliver more current than the master and the slave unit current share pulse will have a longer duration than that of the previous master even though the pulse has been slightly reduced in duration. This slave will determine that the current share pulse matches its own pulse in time duration and will automatically assume the role of system master (if the slave unit has achieved sufficient priority) while the previous bus master will recognize that it is no longer generating the longest CS pulse and will yield its status as bus master and become a slave unit if it retains sufficient operational capability to do so. As long as the remaining converter units have sufficient capacity to meet the load requirements the failure of a converter unit will not disrupt power supply operation. The number of units in a multiple converter unit system is typically selected to accommodate a single converter unit failure, but nothing precludes a system that can accommodate zero converter unit failures or multiple converter unit failures.

Referring now to FIG. 6, sample and hold circuit 240 stores an indication of the input current magnitude during each half of a duty cycle when DC to DC converter unit 12 is operating in dual converter mode and during each pulse when converter unit 12 is operating at double frequency in single converter mode (e.g., in response to a light load). In single converter mode the current sampling rate remains constant because the duty cycle frequency is doubled while the number of samples per period is reduced from two to one. However, only every second current sample is actually measured (input and converted to a digital value) by the DSP 200. The input current signal, I_SNS_HI is connected to a 41.2 ohm current sense or burden resistor 270 having the opposite terminal connected to the I_SNS_LO return signal, which is also connected to the 0.25 volt reference voltage, REF.

Signal I_SNS_HI is coupled through a switch 272, which is controlled by gate signal GTOP, to generate an output signal ITOP, which is held by a holding capacitor 274. Signal I_SNS_HI is similarly coupled through a switch 276, which is controlled by gate signal GBOT, to generate output signal IBOT, which is held by a holding capacitor 278. During the first half of a duty cycle when gating signal GTOP goes positive to command the "on" portion of the first converter circuit 122 duty cycle it also opens gate 272, allowing capacitor 274 to follow the voltage on input current signal I_SNS_HI. When gate control signal GTOP turns off, switch 272 is turned off and capacitor 274 holds a voltage which represents the input current at the end of the "on" portion of a duty cycle of first converter circuit 122. Switch 276 and capacitor 278 operate in the same manner to acquire and hold the voltage on signal I_SNS_HI at the end of the "on" portion of the second half of each duty cycle when the second gating signal, GBOT is active for the second power converter circuit 124.

Referring now to FIG. 7, comparator circuit 242 has two comparators 292, 294 and a resistive voltage divider circuit 296. Voltage divider circuit 296 contains a pair of voltage divider resistors that extend between +3.3 volts and ground to generate a 2.5 volt reference signal, 2.5 Ref. The resistors have values of 2.00 K and 6.19 K.

Comparator 292 compares the over voltage signal OVP from the universal interface 74 to the 2.5 volt reference signal. If the output voltage from converter 12 exceeds the maximum allowable over voltage, signal OVP, which is normally pulled up to 3.3 volts by 1K pull-up resistor 291 will drop to 1.24 volts, causing comparator 292 to generate an active high VO signal which in turn causes OR gate 244 to generate an active high FT signal. Signal FT causes DSP 200 to terminate generation of the GTOP and GBOT power switch gating control signals when communicated to the FAULT input of DSP 200. Signal VO is also communicated to the interrupt request IRQ input of DSP 200, causing an interrupt that causes DSP 200 to set an IRQ Over Voltage flag that enables the program to distinguish between an over voltage caused fault and an over current caused fault.

Similarly, if the input current to converter 12 exceeds the maximum allowable over current limit, signal I_SNS_HI will exceed 2.5 volts, causing comparator 294 to generate an active high 10 signal which in turn causes OR gate 244 to generate an active high FT signal. Signal FT causes DSP 200 to discontinue generation of signals GTOP and GBOT when communicated to the FAULT input of DSP 200.

Referring now to FIG. 8, driver circuit 248 has two pulse driver circuits 300, 302. Pulse driver circuit 300 has a transformer 304 having a primary winding 306 and a secondary winding 308, a DC restorer circuit 310 and driver 312. DC restorer circuit 310 includes a 0.047 microfarad capacitor 314 providing AC coupling between secondary winding 308 and driver 312 and a 1K discharge resistor 316 and a diode 318 connected in parallel between the input to driver 312 and the return terminal of secondary winding 308. The return terminal of secondary winding 308 is also connected to VIN−, which serves as high voltage ground.

One terminal of primary winding 306 of transformer 304 is connected in series through a 0.1 microfarad capacitor 320 to the GTOP output of DSP 200. Capacitor 320 blocks the DC component of the GTOP signal from reaching primary winding 306. The other terminal of winding 306 is connected to ground. Thus, when DSP 200 emits a positive GTOP pulse signal, the signal is communicated through transformer 304 and capacitor 314 to driver 312. Driver 312 responds with a positive pulse signal G1, which turns on top power switch 142. When the positive pulse on signal GTOP terminates, diode 318 protects the input to driver 312 by clamping the input just below ground while resistor 316 dissipates the magnetizing energy of transformer 304.

Pulse driver circuit 302 is similar to pulse driver circuit 300. Pulse driver circuit 302 has a transformer 324 having a primary winding 326 and a secondary winding 328, a DC restorer circuit 330 and driver 332. DC restorer circuit 330 includes a 0.047 microfarad capacitor 334 providing AC coupling between secondary winding 308 and driver 332 and a 1 K discharge resistor 366 and a diode 338 connected in parallel between the input to driver 332 and the return terminal of secondary winding 328. The return terminal of secondary winding 328 is also connected to VIN−, which serves as high voltage ground.

One terminal of primary winding 326 of transformer 324 is connected in series through a 2.2 microfarad capacitor 340 to the GBOT output of DSP 200. Capacitor 340 blocks the DC component of the GBOT signal from reaching primary winding 326. Capacitor 340 is larger than capacitor 320 to accommodate overshoot and undershoot conditions that occur when signal IBOT is turned off in 250 KHz mode. Thus, when DSP 200 emits a positive GBOT pulse signal, the signal is communicated through transformer 324 and capacitor 334 to driver 332. Driver 332 responds with a positive pulse signal G2, which turns on bottom power switch 162. When the positive pulse on signal GBOT terminates, diode 338 protects the input to driver 332 by clamping the input just below ground while resistor 336 dissipates the magnetizing energy of transformer 324.

The pulse transformers 304, 324 provide galvanic isolation between the relatively high input voltages to which the power switches 142, 162 are referenced and the relatively low output voltage to which the remainder of controller 70 is referenced.

Firmware Description

Figure 9:
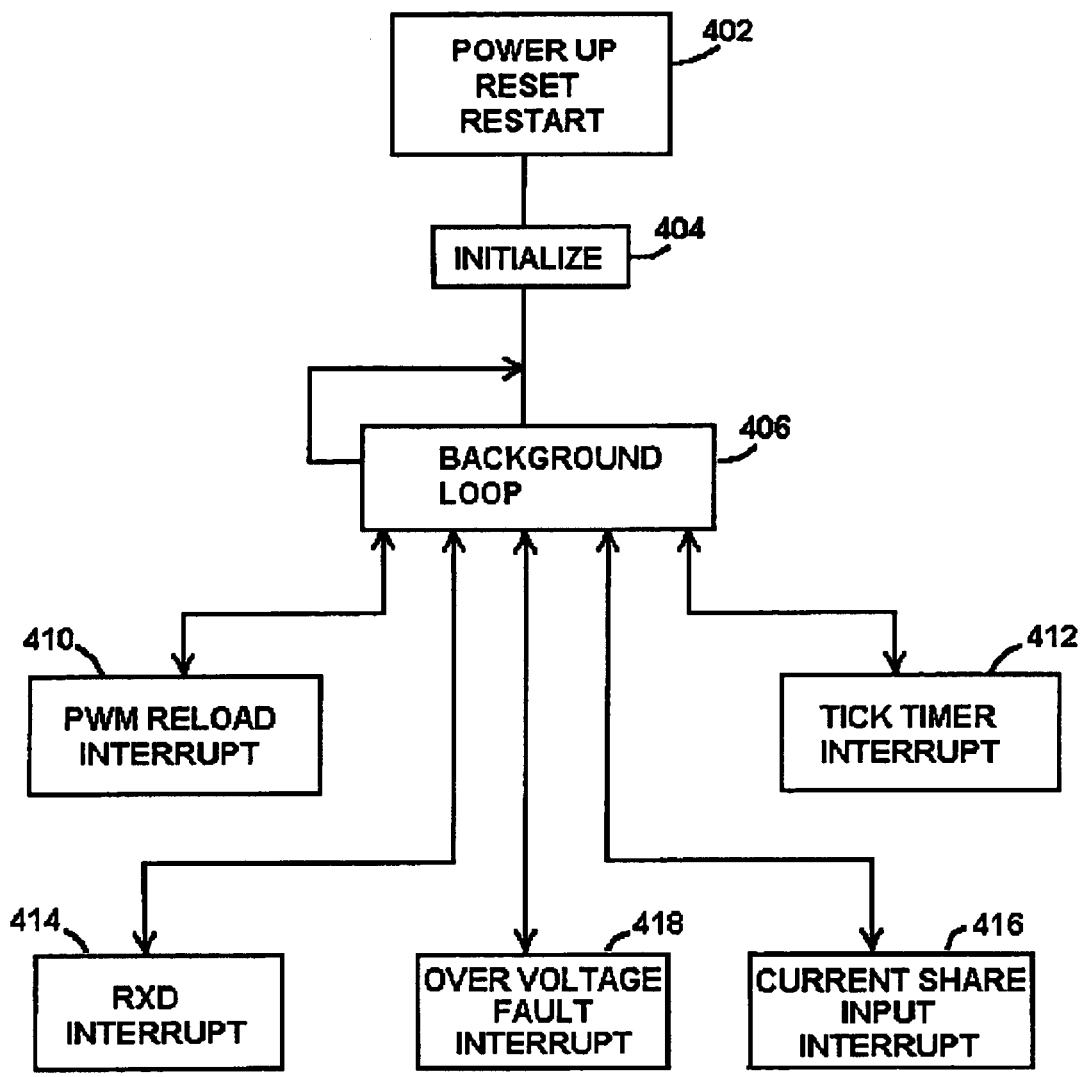
FIG. 9 is a block diagram representation of a firmware program used in a digital signal processor of a controller shown in FIG. 5.

A flowchart of the firmware program 400 for operating the DSP 200 is shown in FIG. 9, to which reference is now made. Following startup 402, which can result from power on, an external reset or a computer operating properly (COP) timeout, DSP 200 normally executes an initialization routine 404. The COP timeout reset is intended to prevent damage to the power section 72 or to an external load 34. A COP timeout is generated if a COP timer is not restarted within a certain period of time. If the DSP is operating properly, program 400 should continually restart the timer before a timeout occurs.

Following a one time execution of initialization routine 404, program 400 begins the repetitive execution of a background loop 406 which performs normal maintenance and housekeeping functions. Many of the important functions of the program 400 are executed as part of an interrupt of the background loop 406. The interrupt service routines are PWM Reload Interrupt 410, Tick Timer Interrupt 412, RXD Interrupt 414 (process received serial input), Current Share (CS) Input Interrupt 416 and Over Voltage FAULT Interrupt 418.

The DSP 200 stores a Calibration Table containing various conversion constants that match the firmware to actual hardware design parameters and circuit components in the power section 72. At the time of manufacture, the Calibration Table is stored in the flash memory that stores the firmware. The first operation of initialization routine 404 is to transfer the Calibration Table from flash memory to RAM. The Calibration Table is initially loaded with values that are typical for the specified input, voltage, output voltage and current output of the power supply. Many of these values are subsequently changed in response to actual testing to more closely match the values to the actual components used in the power supply. However, the initial values are typically within 5% of the final values. The Calibration Table parameters and their initial values are set forth in the following Table 1.

TABLE 1

| NAME | INITIAL VALUE | DESCRIPTION |
| --- | --- | --- |
| 0 Osc Adjust* | 34 | Adjust internal DSP 200 oscillatory frequency |
| 1 Desired Vout | 3159 (5000 mv) | Calibrated representation of output voltage (5000 mv * Vout Gain/32,768) |
| 2 Vout Tolerance | 158 (250 mv) | Calibrated representation of max deviation in output voltage (250 mv * Vout Gain/32,768) |
| 3 Not Used | | |
| 4 Vout Gain* | 20703 (0.6318) | Calibration gain adjustment for output voltage Integer representation of 0.6318 (0.6318 * 32768 = 20703) |
| 5 Vout Sense Offset* | 63 | Calibration offset adjustment for output voltage |
| 6 Current Limit Value | 1485 | Calibrated current limit related parameter Used to calculate Max Primary Current |
| 7 Current Limit Offset | 4020 | Calibrated current limit related parameter Used to calculate Max Primary Current |

TABLE 1-continued

| NAME | INITIAL VALUE | DESCRIPTION |
| --- | --- | --- |
| 8 Current Limit Slope | 26818 | Calibrated current limit related parameter Used to calculate Max Primary Current |
| 9 Temperature Min | −861 (−50 C.) | Calibrated representation of min temperature (−50 * 32768/ Temperature Gain) |
| 10 Temperature Max | 1463 (85 C.) | Calibrated representation of max temperature (85 * 32768/ Temperature Gain) |
| 11 Vin Gain* | 4168 | Calibration gain adjustment for input voltage Integer representation of 0.12720 (0.12720 * 32,768 = 4168) |
| 12 Vin Sense Offset* | 507 | Calibration offset adjustment for input voltage |
| 13 Min Input Volts | 983 (125 V) | Calibrated representation of min input voltage (125 * 32,768/Vin Gain) |
| 14 Max Input Volts | 3145 (400 V) | Calibrated representation of max input voltage (400 * 32,768/Vin Gain) |
| 15 Current Reference | 600 | Test value used in current only mode |
| 16 Configuration | | See Configuration Variable |
| 17 Prop Volt Gain1 | 70 | For voltage loop PI controller when not using current loop |
| 18 Integral Volt Gain1 | 90 | For voltage loop PI controller when not using current loop |
| 19 Prop Amp Gain1 | 40 | For current loop PI controller |
| 20 Integral Amp Gain1 | 40 | For current loop PI controller |
| 21 Temperature Gain* | 1903 | Calibration gain adjustment for temperature Integer representation of 0.058 (0.058 * 32,768 = 1903) |
| 22 Temperature Offset* | 1300 | Calibration offset adjustment for temperature |
| 23 Software OVP | 3791 (6000 mv) | Calibrated representation of software over voltage protection limit (6000 * Vout Gain/32768) |
| 24 Integral Volt Gain2 | 10 | For voltage loop PI controller (when using current loop) |
| 25 Not Used | | |
| 26 Ext OSC Low Limit | 2400 | Calibrated representation of minimum for Ext Osc Control Sense |
| 27 Ext OSC Hi Limit | 3200 | Calibrated representation of maximum for Ext Osc Control Sense |

*Corrects hardware tolerance.

The values stored in the Calibration Table serve to match the firmware of DSP 200 to the actual design selections and component tolerances of the power section 72. Values Vout Gain, Vout Sense Offset, Vin Gain, Vin Offset, Temperature Gain and Temperature Offset are derived by comparing actual measured values to the values as sensed by the DSP 200 at the time of manufacture or during subsequent testing. The values could then be used to adjust the corresponding voltage and temperature values sensed by DSP 200. However, the sensed values are updated hundreds or thousands of times a second and substantial processing capacity would be consumed making these adjustments. To preserve processing capacity and reduce the number of calculations, set points and thresholds are correspondingly adjusted at the time of manufacture rather than make adjustments in response to each DSP 200 input measurement.

Determining and loading of the Calibration Table is performed at initial testing of each power supply 12, 14 . . . 18. Re-calibration can be performed later if desired. Calibration is performed using the serial connection 52, 54 . . . 58 to an external data processor 50. Each DSP 200 maintains 2 copies of its Calibration Table. One copy is preserved in nonvolatile Flash memory and another copy is read from the Flash memory and stored in RAM for normal operation. At the time of manufacture, Flash memory is loaded with a start-up copy of the Calibration Table along with the firmware program. The start-up values are expected to be within 5% of the final values and allow reasonable operation of a converter unit until the final values can be determined.

The external data processor 50 can read and write each value in the RAM copy of the Calibration Table. It can also write one or more new values into the RAM copy and then command the DSP 200 to write the RAM copy back into Flash memory, thus preserving the new values in nonvolatile memory. This capability is used to customize the Calibration Table to the specific design parameters and component values of a DC to DC power converter unit 12, 14 . . . 18 at the time of manufacture. Any external data processor 50 used for production time calibration is most likely, but not necessarily different from a data processor 50 connected to a unit 12, 14 . . . 18 as part of a DC to DC converter system 10.

The first values to be calibrated are the oscillator related values. A production test fixture connects the serial port TXD terminal through a 220 ohm resistor to ground. It also connects a precision 250 KHz signal to the SYNCH_IN signal and divides the SYNCH_IN frequency by 64 (3.906 KHz) and applies it to the input from CS bus 62.

When DSP 200 is powered up it connects an internal 10 K pull-up resistor between the TXD port and +3.3 volts and tests the input value. Normally the input value will be high and DSP 200 proceeds with a normal initialization. However, if the input has been diverted to ground, the input will be low and DSP 200 proceeds to calibrate the oscillation values. This is a convenient technique that makes use of the limited number of terminals of DSP 200 for calibration without interfering with normal operation.

In a calibration Osc Adjust loop, DSP 200 reads the value of TIMER_D1, which should be 10240[1/(25 nanoseconds*3.906 KHz)]. If the TIMER_D1 value is less than 10240, Osc Adjust is decremented in the Calibration Table. If the TIMER_D1 value is greater than 10240 Osc Adjust is incremented in the Calibration Table. Then the new value of Osc Adjust is written into the DSP 200 Osc Adjust Hardware Register.

Next, the DSP 200 code reads the FCTRL Result value determined by the A/D in response to the frequency control signal, FCTRL and ANA6. This value represents the center frequency of the phase locked loop 202 when it is operating at exactly 250 KHz. Ext OSC Low Limit is determined as FCTRL Result−400 and Ext OSC Hi Limit is determined as FCTRL Result+400. The calibration Osc Adjust loop is then repeated until the 220 ohm resistor connecting TXD to ground is removed, at which time DSP 200 begins initialization and proceed to normal operation.

The production test fixture also removes the 250 KHz signal from SYNCH_IN and the 3.0906 KHz signal to the input that connects to CS bus 62. The previously adjusted oscillator calibration values still reside in the RAM copy of the Calibration Table and operation of DSP 200 proceeds during the remainder of the calibration process as though DSP 200 were in normal operation.

Next, the Calibration Table values related to input voltage are determined. The actual input voltage is set to 100 volts and Vin Sense Offset is set to zero. The external data processor 50 obtains Vin Sense=4096−Vin Result−Vin Sense Offset−Offset from DSP 200. Vin Sense is saved in a variable Vin Sense 100. The actual input voltage is then set to 400 volts and the external data processor 50 again obtains Vin Sense and saves it as Vin Sense 400.

External data processor 50 then calculates Kg=(100−400)/(Vin Sense 100−Vin Sense 400) and Ko=Vin Sense 100−(100/Kg). External data processor 50 then writes the following values into the DSP 200 RAM copy of the Calibration Table:

1. Vin Gain = Kg * 32,768
2. Vin Sense Offset = Ko
3. Min Input Volts = 125/Kg
4. Max Input Volts = 400/Kg Even though the calculations produce fractions represented as floating point numbers, the Calibration Table values sent to DSP 200 are sent in an integer representation rounded off with standard rounding techniques.

The next Calibration Table values to be calibrated relate to output voltage as sensed by DSP 200 (in millivolts). The first output voltage parameter to be calculated is Vout Sense Offset. The external data processor 50 modifies the RAM copy of the DSP 200 Calibration Table by setting Vout Sense Offset to zero and Desired Vout to −200. This assures that the output voltage actually goes to zero, since it cannot go negative. The external data processor 50 now obtains Vout Sense=[(VOX Result1+VOX Result6)/2]−Vout Sense Offset−Offset (the DSP 200 internal determination of the output voltage at operation 600) from DSP 200 and writes the value back into the Vout Sense Offset value of the RAM copy of the Calibration Table. Since Vout Sense Offset is subtracted from VOX Result in the equation generating Vout Sense, this makes Vout Sense equal to zero when the output is actually zero.

Once Vout Sense Offset has been determined, external data processor 50 returns Desired Vout to the nominal 5000 millivolts to determine Vout Gain. Since DSP 200 has not yet been calibrated, the actual output voltage may vary somewhat from 5,000 millivolts.

The external data processor 50 then obtains the new Vout Sense from DSP 200 and reads the actual output voltage with an external digital multi-meter. External data processor 50 then recalculates Vout Gain=32,768*(Vout Sense/External DMM millivolts) and writes the new value into the RAM copy of the Calibration Table. A typical value for Vout Gain might be 20703.

The external data processor 50 now uses the new calibrated value of Vout Gain to calculate other output voltage related values and writes them into the RAM copy of the Calibration Table.

1. Desired Vout (calibrated) is 5000 millivolts * Vout Gain/32768 or typically 3159.
2. Vout Tolerance (calibrated) is 250 millivolts * Vout Gain/32,768 or typically 158.
3. Software OVP (calibrated) is 6000 millivolts * Vout Gain/32,768 or typically 3791.

Next, the temperature values are calibrated by the external data processor 50 setting Temperature Offset in the RAM copy of the Calibration Table to zero and adjusting the actual temperature of the DC to DC power converter unit 12, 14 . . . 18 to 0 degrees C. The external data processor obtains Temperature Sense=4096−TEMP Result−Temperature Offset from the DSP 200 and writes the value back into Temperature Offset in the RAM copy of the Calibration Table. This now causes the Temperature Sense to be zero at 0 degrees C.

Next the temperature of the DC to DC power converter unit 12, 14 . . . 18 is increased to 50 degrees C. and the external data processor 50 obtains a new Temperature Sense value from DSP 200. The external data processor 50 then determines Temperature Gain=32,768*50/Temperature Sense and stores the calibrated Temperature Gain value in the RAM copy of the Calibration Table. A typical value might be 1903.

The calibrated value off Temperature Gain is then used to determine the following additional values and store then in the RAM copy of the Calibration Table:

1. Temperature Min = −50 * 32,768/Temperature Gain = −861
2. Temperature Max = 85 * 32,768/Temperature Gain = 1463

The calibration process is completed by calibrating the current limit related values. The external data processor 50 sets the value of Current Limit Value in the DSP 200 RAM copy of the Calibration Table to 4096. This effectively disables current limiting and prevents the current limiting code in DSP 200 from executing. The output voltage of the power supply will be at substantially the calibrated nominal value of 5000 millivolts. External data processor 50 sets the input voltage to 150 volts and the external load to 35 amps. The external data processor 50 obtains Top FET Current (which is ITOP Result-Offset), from DSP 200 and stores the value as variable mlp1. External data processor 50 also obtains the PWM0 Value from DSP 200 and stores the value as variable PWM0 Value 1. Next, the external data processor 50 sets the input voltage to 400 volts and the external load to 35 amps. External data processor 50 again obtains Top FET Current and stores the value as mlp2 and obtains PWM0 Value and stores the value as PWM0 Value
2. Next, the external data processor 50 sets the output of the power supply to 2 volts by setting Desired Vout in the RAM copy of the Calibration Table to 2000*Vout Gain/32,768. Vout Gain has already been calibrated. The input voltage is set to 270 volts and the external load is set to 35 amps. External data processor 50 then obtains Top FET Current from DSP 200 and stores the value as mlp3. PWM0 Value is again obtained and stored as PWM0 Value 3. External data processor 50 then performs the following calculations:
    1. mD1=PWM0 Value 1/320
    2. mD2=PWM0 Value 2/320
    3. mD3=PWM0 Value 3/320
    4. mVi1=150
    5. mVi2=400
    6. mVi3=270
    7. T1=(mD1−mD2)/(mD1−mD3)
    8. T2=(mlp1−mlp2)/(mlp1−mlp3)
    9. T2=(md1*mVi1−MD2*mVi2k)−((MD1*mVi1−mD3*mVi3)*T1
    10. Ks=T2/(2*T3)
    11. Current Limit Slope=Ks*32,768
    12. T1=mlp1−mlp2
    13. T2=(mD1*mVi1−mD2*mVi2)*2*Ks
    14. T3=(mD1−mD2)*Ks
    15. Current Limit Offset=(T1−T2)/T3
    16. T1=mD1*mVi1*2*Ks
    17. T2=mD1*Current Limit Offset*Ks
    18. Current Limit Value=mlp1−T1−T2

External data processor 50 then commands writing the calibrated values Current Limit Slope, Current Limit Offset and Current Limit Value to the RAM copy of the DSP 200 Calibration Table. It also changes Desired Vout back to the calibrated value of 5000*Vout Gain/32,768.

Even though the above calculations may produce fractions originally represented by floating point numbers, data processor 50 only sends integer value (rounded to the nearest integer) representations to the DSP 200 Calibration Table. For an output current of 35 amps, typical calibrated values are:

Current Limit Slope=26818
Current Limit Offset=4020
Current Limit Value=1485

Calibration values for (1) Current Reference, (2) Prop Volt Gain1, (3) Integral Volt Gain1, (4) Prop Amp Gain1, (5) Integral Amp Gain1, (6) Integral Volt Gain2 are set at the time of manufacture to control various feedback loop gains and are not adjusted to match specific power supply components. The Configuration variable is not strictly a calibration value, but inclusion in the Calibration Table is a convenient way to make the Calibration variable available to an external data processor 50.

After all of the Calibration Table values have been calibrated, external data processor 50 commands DSP 200 to write the calibrated RAM copy of its Calibration Table into nonvolatile Flash memory with a Write Flash command so that the calibrated values will not be lost when power is turned off.

In the following text, conversion of fraction Calibration Table values used in equations from an integer representation to a fractional representation is sometimes explicit and is sometimes implied. For example, the fractional value of nominal Vout Gain is 0.6318 or 20703/32,768. If an equation does not explicitly divide an integer representation of a Calibration Table fraction by 32,768, it should be understood that this conversion to a fractional value is implied in the equation.

Returning to the description of the initialization, the Initialize operation 404 sets the internal DSP 200 oscillator value by writing Osc Adjust from the Calibration Table into the DSP 200 oscillator adjust hardware register.

The DSP 200 stores a System State variable in its alterable memory. The System State variable can be set to one of the following five states as represented by the corresponding value indicated in the following list as (x):

Normal—Feedback control loops are closed, power supply is providing power (0)

Soft Start—Startup prior to closing feedback control loops (1)

Software Over Voltage Fault—Power supply shut down due to software detected output over voltage condition (2). Software over voltage fault checking is done in the PWM Reload interrupt code 410. The primary over voltage protection is performed by hardware (see comparator 242, FIGS. 5, 7), but this test is relatively inflexible. A lower voltage setting can be programmed in the Software OVP calibration setting to provide software over voltage shutdown. The software over voltage fault shutdown is not as reliable as the hardware over voltage shutdown because if the DSP 200 code crashes, the software shutdown code may not function properly.

Over Voltage Fault—Power supply (PWM) shut down due to FAULT input signal and IRQ (3)

Over Current Fault—Power supply (PWM) shut down due to FAULT input signal (4)

OFF—Power supply output off due to OFF input signal (5)

The initialize routine 404 next sets the system state to Soft Start by writing a "1" into the system state variable.

The DSP 200 also stores a System Status variable containing 10 System Status flags for controlling program execution, which are listed as follows:

1. Over Current—Power supply is in current limit mode
2. Vin Under/Over—Vin Sense is below Min Input Volts or above Max Input Volts
3. Vout Good—is within Vout Tolerance of Desired Vout
4. Reset—Power-on, reset or restart has occurred
5. PLL Locked—internal DSP PLL is locked
6. Ext OSC Good—External oscillator control voltage (FCTRL Result) Is above Ext OSC Low Limit and below Ext OSC Hi Limit
7. Master Mode—Power supply current sharing mode is master
8. 125 KHz Mode—Power supply is operating with both top and bottom sections of power section 72 at 125 KHz
9. 250 KHz Discontinuous—Power supply is operating with only top section of power stage at 250 KHz and output power is below continuous conduction mode current
10. TEMP Under/Over—Power supply temperature is above the maximum limit or below the minimum limit.

The initialization code sets the Reset flag and 125 KHz Mode flag in System Status and clears all other flags. Setting the Reset flag allows an external data processor to determine by use of the user interface bus 52 if the power supply experienced a power-up, reset or restart that produced the initialization. The only time the Reset flag is cleared after being set during initialization is when an external data processor 50 requests calibration data from the DSP 200.

The initialization code next configures the input/output ports for communication over the user interface bus 52 with an external data processor 50 with function and DSP 200 port assignments as follows:

OVER CURRENT (B4)—Output-Power supply is in current limit mode

VIN UNDER/OVER (B7)—Output—Vin Sense is out of range

VOUT GOOD (B5)—Output—Vout Sense is within tolerance

OFF (B6)—Input—Turns output power off

Output signals from the DSP 200 are normally totem pole (actively driven both high and low) but the desired configuration is open drain (driven low, but high impedance for high). The open drain output for the above listed I/O ports is simulated by setting the port as normal to output "0" for a zero output and setting the port to "input" to simulate a high impedance output "1".

These signals are part of the user interface bus 52 providing connection to an external data processor 50 to allow the external data processor 50 to receive the output status values or to use the Off input to turn off the DSP 200 and hence the entire power supply. The three output signals are initialized to "one" (inactive state) and thereafter reflect system status as operation begins.

The user interface bus 52 providing communication with an external data processor 50 has a serial read port RXD and a serial transmit port TXD. This serial communication mechanism allows the external data processor 50 to change operating parameters in DSP 200, request status information, receive measurement data, monitor input and output signal values, and configure the operating mode of the DSP 200. The initialization routine 404 configures the RXD port for 28.8 K Baud and to generate an interrupt request for each byte of data received. The interrupt request causes interrupt routine RXD Interrupt 414 (Serial Data Received code) to be executed. The serial transmit port TXD is also initialized to 28.8 K Baud.

A signal PWM Reload is generated by a Reload timer internal to DSP 200 as the master clock signal for the PWM duty cycle switching period for gating the power switches 142, 162. The reload timer is initialized to generate signal PWM Reload once every 8 microseconds, which corresponds to once for each duty cycle when DSP 200 is operating in normal dual converter 125 KHz Mode or once every two duty cycles when DSP 200 is operating in a light load, single converter 250 KHz duty cycle mode. Signal PWM Reload is a positive pulse. Since subsequent actions are responsive to the positive going leading edge, the pulse width is not important and is not specified by the manufacturer.

The PWM switch signals are generated in either 125 KHz dual converter mode or 250 KHz single converter mode. The PWM switch signals have a period of 8 microseconds in 125 KHz mode and 4 microseconds in 250 KHz mode and a resolution of 25 nanoseconds. To change the duty cycle of an output a new duty cycle value (pulse width time duration value) is first stored in the desired PWM value register. This new value does not become effective to control the PWM output until the beginning of the next reload opportunity. PWM reload opportunities can be configured to be any integer multiple of the PWM periods (either 4 or 8 microseconds) and are always aligned with the PWM Reload signal. For the present application the PWM reload opportunity is set to 1 for 125 KHz mode and 2 for 250 KHz mode, thus maintaining the reload opportunity period and the PWM Reload signal period at 8 microseconds for both modes.

DSP 200 has two internal analog-to-digital converters that respond to analog input ports ANA0–3 and ANA4–7, respectively. The DSP 200 also has an eight measurement buffer that can store the digital representations of any eight sequential measurements of the analog inputs as determined by the analog-to-digital converters. The initialization code configures the storage sequence to be triggered in one shot mode in response to the negative going edge of a 1.85 microsecond positive pulse from internal timer TIMER_C2. Timer TIMER_C2 is in turn initialized to be triggered every 8 microseconds in response to the initial positive going edge of signal PWM Reload. Thus, when timer TIMER_C2 makes a high to low transition 1.85 microsecond after each PWM Reload signal, the sequence of 8 values from the A/D inputs is evaluated and the value is stored in the 8 locations for the buffer. The signal name "Result" refers to a value stored in one of the buffers. For example, ITOP Result refers to the value of input signal ITOP after it has been converted to a digital value and stored in one of the 8 buffer registers.

The order in which the signals are read into the buffers together with their hardware and software signal names is set forth in Table 2 as follows:

TABLE 2

| INPUT ORDER | DSP PIN NAME | SIGNAL NAME | A/D RESULT BUFFER NAME | OFFSET VARIABLE USED | OFFSET CORRECTED VARIABLE NAME |
|---|---|---|---|---|---|
| 0 | ANA1 | IBOT | IBOT Result | Offset | Bottom FET Current |
| 1 | ANA0 | VOX | VOX Result1 | Vout Working Offset | Vout Sense |
| 2 | ANA2 | ITOP | ITOP Result | Offset | Top FET Current |
| 3 | ANA4 | IV | IV Result | Vin Working Offset | Vin Sense |
| 4 | ANA5 | TEMP | TEMP Result | Temperature Sense Offset | Temperature Sense |
| 5 | ANA3 | REF | REF Result | N/A | N/A |
| 6 | ANA0 | VOX | VOX Result6 | Vout Working Offset | Vout Sense |
| 7 | ANA6 | FCTRL | FCTRL Result | N/A | Ext Osc Control Sense |

The timing, and thus order, is important with respect to evaluating some of the analog signals. In normal 125 KHz dual converter mode the positive going PWM control signals GTOP and GBOT have a pulse width that varies from 0 to 3.2 microseconds in 25 nanosecond increments. Signal GTOP begins with the positive edge of PWM Reload and signal GBOT begins ½ cycle or 4 microseconds later. In 250 KHz single converter mode PWM control signal GTOP pulses have a duration of 0 to 1.6 microseconds beginning with the PWM Reload signal and they are repeated after 4 microseconds at the beginning of the next duty cycle.

Consequently a time interval window exists during the time interval 3.2 to 4.0 microseconds in 125 KHz mode (1.6 to 4.0 microseconds in 250 KHz mode) following each PWM Reload signal during which the ITOP output of sample and hold circuit 240 representing the input current to top converter 122 is stable and not changing. The DSP 200 requires 0.85 microsecond for the first sample and 0.60 microsecond for each subsequent sample. The starting sample time in microseconds for each input following the PWM Reload pulse is thus: IBOT 1.85; VOX 2.70; ITOP 3.30; IV 3.90; TEMP 4.50; REF 5.10; VOX 5.70; and FCTRL 6.30. Starting the sampling with a 1.85 microseconds delay and sampling input ANA2 3rd in the sequential order assures that this input is sampled during the timer interval 3.30 to 3.90 microseconds, a time interval during which signal ITOP is stable. While the IBOT input to ANA1 is sampled two intervals earlier, this signal is sampled during the second half of a 125 KHz duty cycle and is stable throughout the first half. The second or bottom converter 124 is not operated in 250 KHz mode. Measurement of the top and bottom FET currents at a time when the sample and hold value represents the final maximum input current at the end of the active portion of a duty cycle is thus assured.

The output voltage value (VOX) that is sampled through ANA0 has a small, but measurable ripple that is synchronous with the 250 KHz power switch gating frequency. Even small variations in the measured output voltage can result in substantial changes in the output current. It has been found that double sampling this output voltage value both second in order and next to last reduces the effects of this ripple, especially when switching between 125 KHz CCM (Continuous Conduction Mode) and 250 KHz Mode. The two double sampled values VOX Result1 and VOX Result6 are averaged to form the variable VOX Result that is in turn used to calculate Vout Sense, which is the DSP 200 representation of the output voltage.

The bottom and top input current sense signals, IBOT and ITOP, which are the DSP 200 representations of the top and bottom currents, have an analog input voltage range of 0.25 volt to 3.0 volts, which corresponds to a range of 0 to 3.3 amperes of FET 162 and 142 current. Related Calibration Table values include Current Limit Offset, Current Limit Value, Current Limit Slope and Current Reference.

The output voltage sense signal, VOX has an analog input voltage range of 0.25 volt to 3.3 volts, which corresponds to a range of 0 to 6.3 volts at the output, SNS+, SNS−. Related Calibration Table values include Vout Sense Offset, Vout Sense Gain, Desired Vout, Vout Tolerance and Software OVP.

The input voltage sense signal, IV, has an analog input voltage range of 0.25 volt to 3.0 volts, which approximately corresponds to a range of 500 to 0 volts. The range is inverted because input voltage is sensed as a negative value and then offset to positive values. Related Calibration Table values include Vin Sense Offset, Vin Gain, Min Input Volts and Max Input Volts.

The temperature sense input voltage sense signal, TEMP, has an analog input voltage range of 0.25 volt to 2.5 volts, which corresponds to a temperature range of 125 to −55 degrees C. temperature. Related Calibration Table values include Temperature Offset, Temperature Gain, Temperature Min and Temperature Max.

The phase locked loop 202 frequency control signal voltage sense signal, FCTRL, has an analog input voltage range of 1.0 volt to 3.0 volts, which corresponds to an external oscillator frequency range of 5 MHz to 11 MHz. Related Calibration Table values include Ext OSC Low Limit, Ext OSC Hi Limit and Allow Ext Osc flag (in the Configuration variable).

The input signal, REF, is fixed at 0.25 volt and serves as the offset reference for ITOP and IBOT. All DSP 200 analog inputs must be biased at 0.25 volt or above. The REF input to the DSP 200 is used to calculate the Offset variable to correct the analog input measurements and to help compensate for temperature drift of the DSP 200.

Next the initialization routine 404 configures the FAULT input to set the 3 PWM outputs PWM0–2 to logic zero in response to a logic "1" input at the FAULT terminal. Such an input means that either an over voltage or an over current condition has occurred and power section 72 is effectively shut down to prevent overload damage by terminating the active states of the PWM control signals GTOP and GBOT. Once the gating control signals have been disabled in response to an over voltage signal, they can only be re-enabled by terminating power to DSP 200 and then restarting DSP 200. This is a safety feature that prevents repeated over voltage conditions that might damage power section 72. If the FAULT input is triggered by an over current condition, DSP 200 assumes that the condition was a transient condition, such as an accidental short circuit by maintenance people, and allows generation of the power switch gating control signals GTOP and GBOT to be resumed under program control.

The over voltage signal VO also sets an interrupt request to permit DSP 200 to distinguish between an over voltage fault, VO, and an over current fault, IO. The interrupt service routine sets an IRQ Over Voltage flag that informs the program that the fault was caused by an over voltage.

Next the initialization routine 404 configures DSP 200 in slave mode for current sharing (CS) by setting timer TIMER_D0 to one shot mode. The negative current share pulses appearing on the CS line 62 interconnecting multiple converter units 12, 14, . . . 18 are inverted by buffers 252, 254 to positive pulses as they are input and output from DSP 200. In slave mode a positive edge at the beginning of a pulse received at DSP 200 input terminal TD1 (a negative edge on CS bus 62) causes timer TIMER_D0 to respond in one shot mode by generating a pulse at output TD0 having a duration proportional to the unit's input current, which time duration should be slightly shorter than the duration of the master pulse. The resolution of the current share pulses is 25 nanoseconds. When the DSP 200 is operating in Master current share mode, timer TIMER_D0 is set to free running mode with a period of 1.6384 milliseconds (610.5 Hz).

Timer D1 is initialized as a gated timer that counts while the input TD1 is high. When the TD1 current share input goes low (the inverted signal on CS bus 62 goes high), an interrupt, Current Share Input Interrupt 416, is generated. The interrupt code reads and saves the value of TIMER_D1 counter, which represents the low pulse duration of the current share signal. The resolution of TIMER_D1 is 25 nanoseconds.

Timer TIMER_D2 is configured to output a 250 KHz square wave to the SYNCH_OUT signal at terminal TD2. This signal allows multiple power units to synchronize their PWM switching frequencies to minimize RFI noise. There is no specific phase relationship between the SYNCH_OUT signal and the PWM outputs. Only the frequency of the SYNCH_OUT signal and the PWM gating signal outputs are the same.

In the present example the 250 KHz synch source 22 provides the synchronization signal 42 to each of the converter units 12, 14, . . . 18. However, in a system where the synch source 22 is not available, the Sync Out signal from one of the converters 12, 14, . . . 18 can be used to synchronize the remaining converters in place of signal 42.

Several variable starting values are now initialized by the initialization routine to values from the Calibration Table. Prop Amp Gain is initialized to Prop Amp Gain1, Integral Amp Gain is initialized to Integral Amp Gain1 and Prop Volt Gain is initialized to 20.

A timer TIMER_C0 is initialized as a tick timer to generate an interrupt every 5 milliseconds that calls the code for Tick Timer Interrupt 412.

The final initialization step is to enable PWM Reload Interrupts 410 by enabling the Reload timer to generate the PWM Reload signal every 8 microseconds. Prior to this point the converter unit 12, 14, . . . 18 generates no power to the load 34.

Upon starting the PWM Reload timer initialization 402 is complete and execution of the background loop 406 begins. The background loop executes approximately every 40 microseconds and can be interrupted at any time by the PWM Reload Interrupt 410, the Tick Timer Interrupt 412, the Current Share Input Interrupt 416, the RXD serial port data received interrupt 414 or the Over Voltage Fault interrupt 418.

Figure 10:
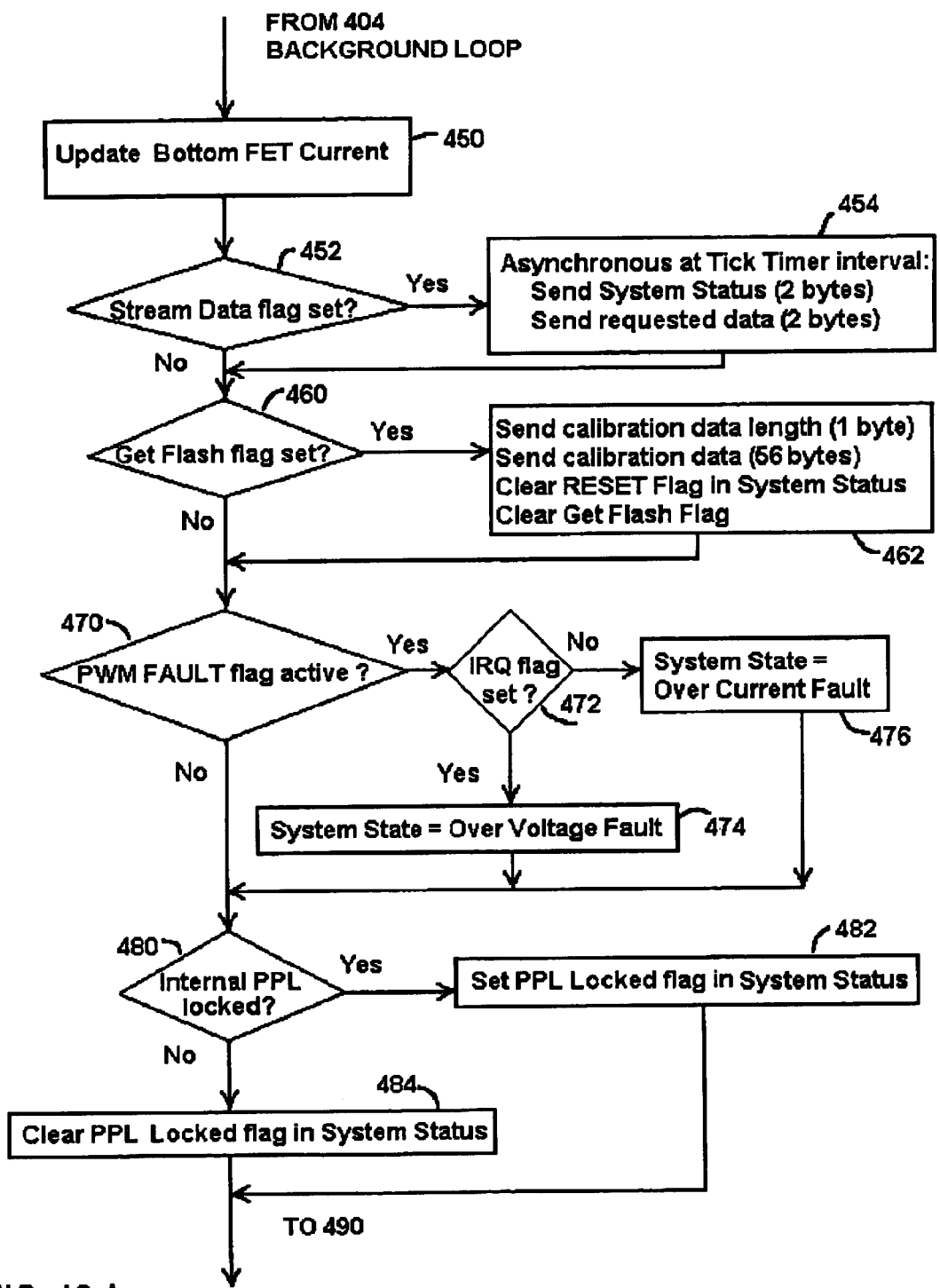
FIGS. 10A, 10B and 10C are a flowchart of a background loop used in the firmware program shown in FIG. 9.
Figure 10:
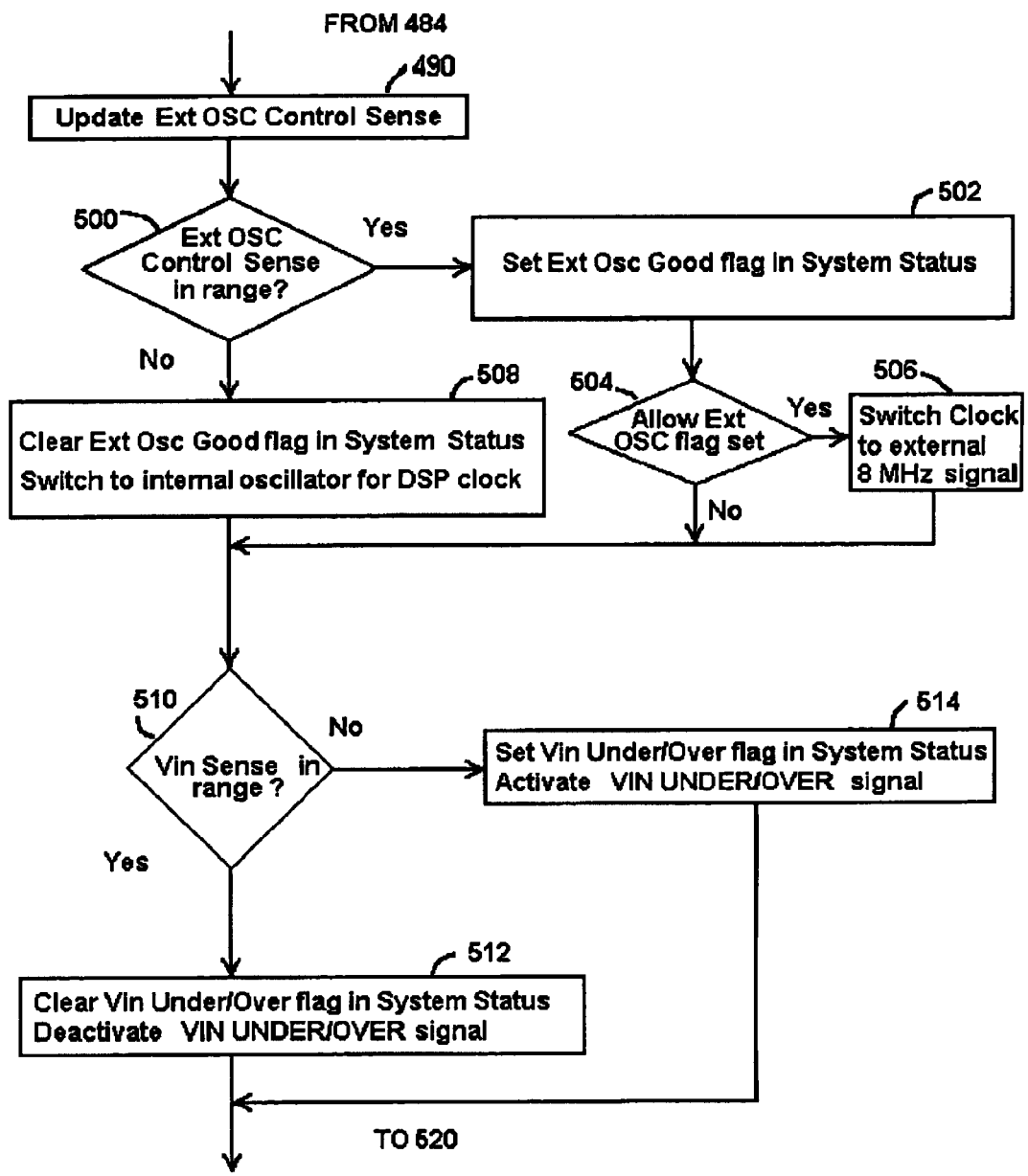
Figure 10:
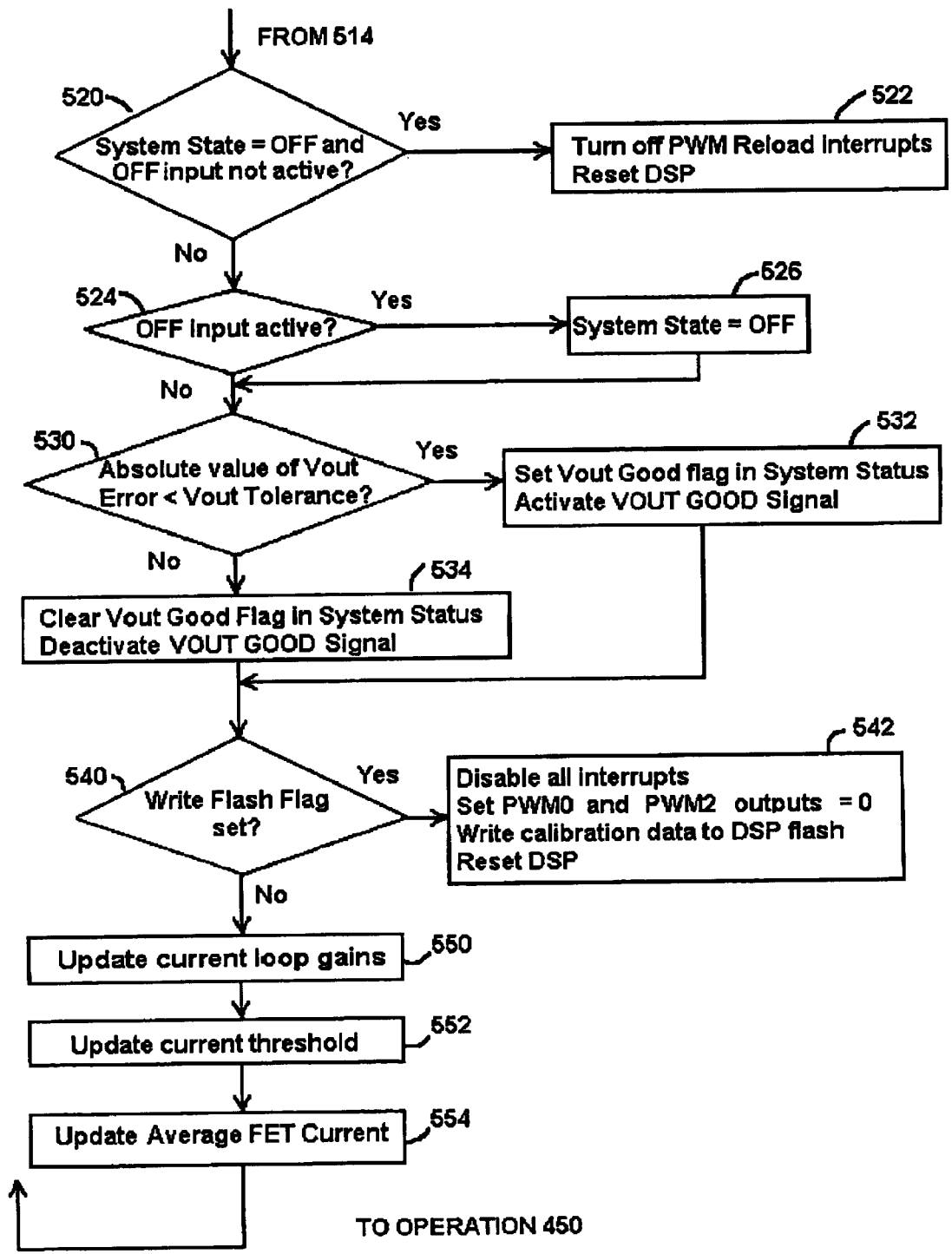
Figure 11A:
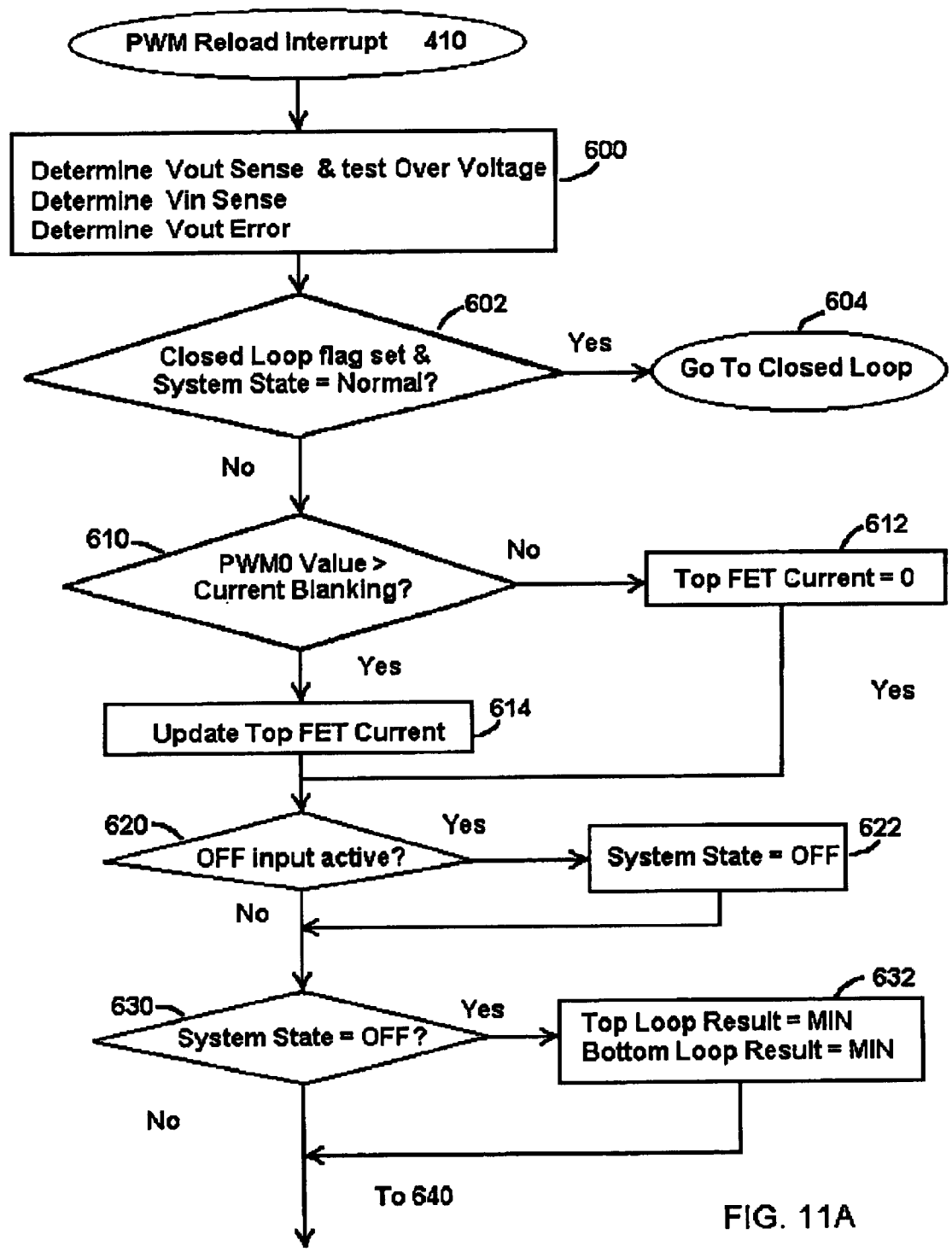
FIGS. 11A, 11B, 11C, 11D, 11E, 11F and 11G are a flowchart of a PWM Reload Interrupt used in the firmware program shown in FIG. 9.
Figure 11B:
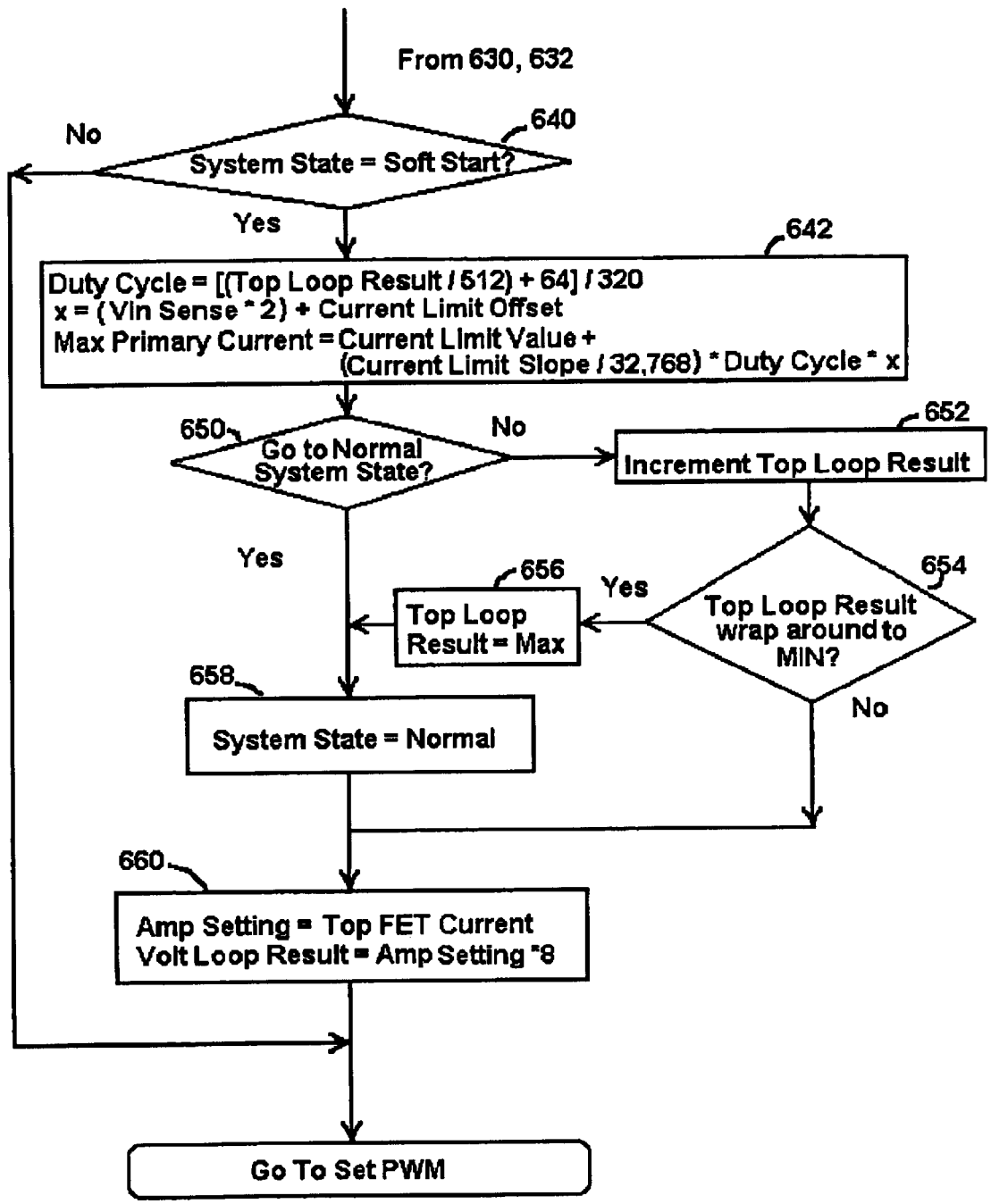
Figure 11C:
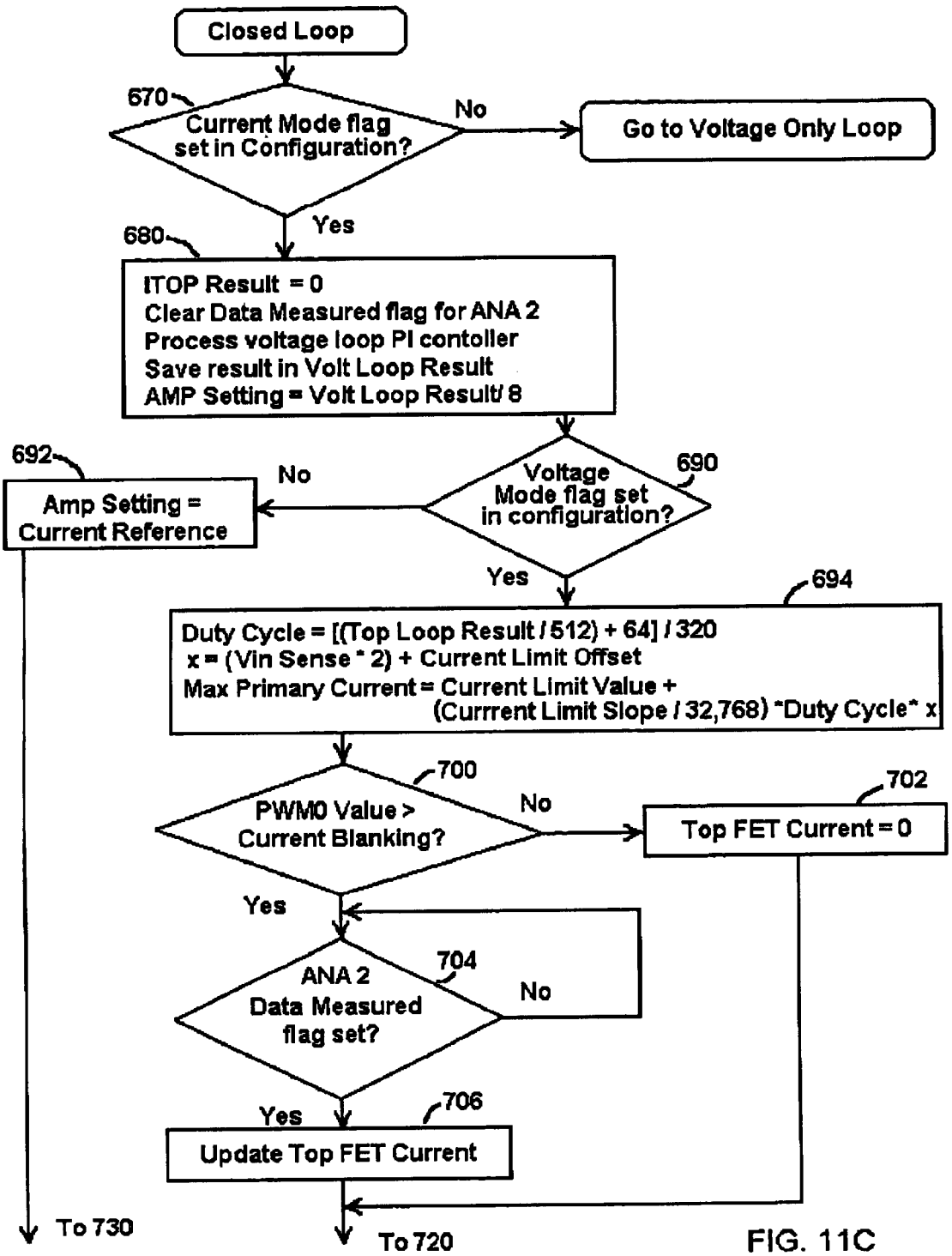
Figure 11D:
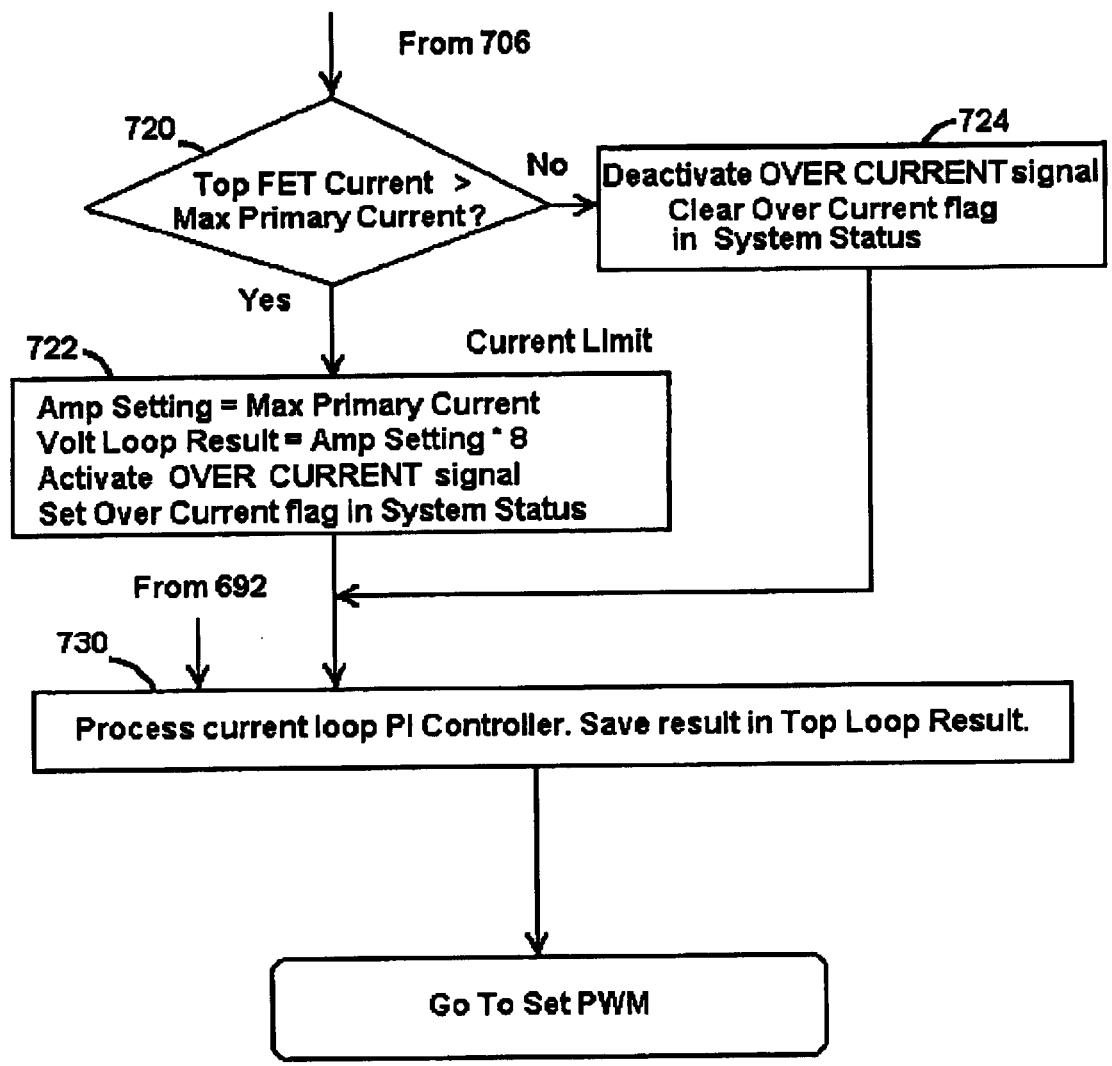
Figure 11E:
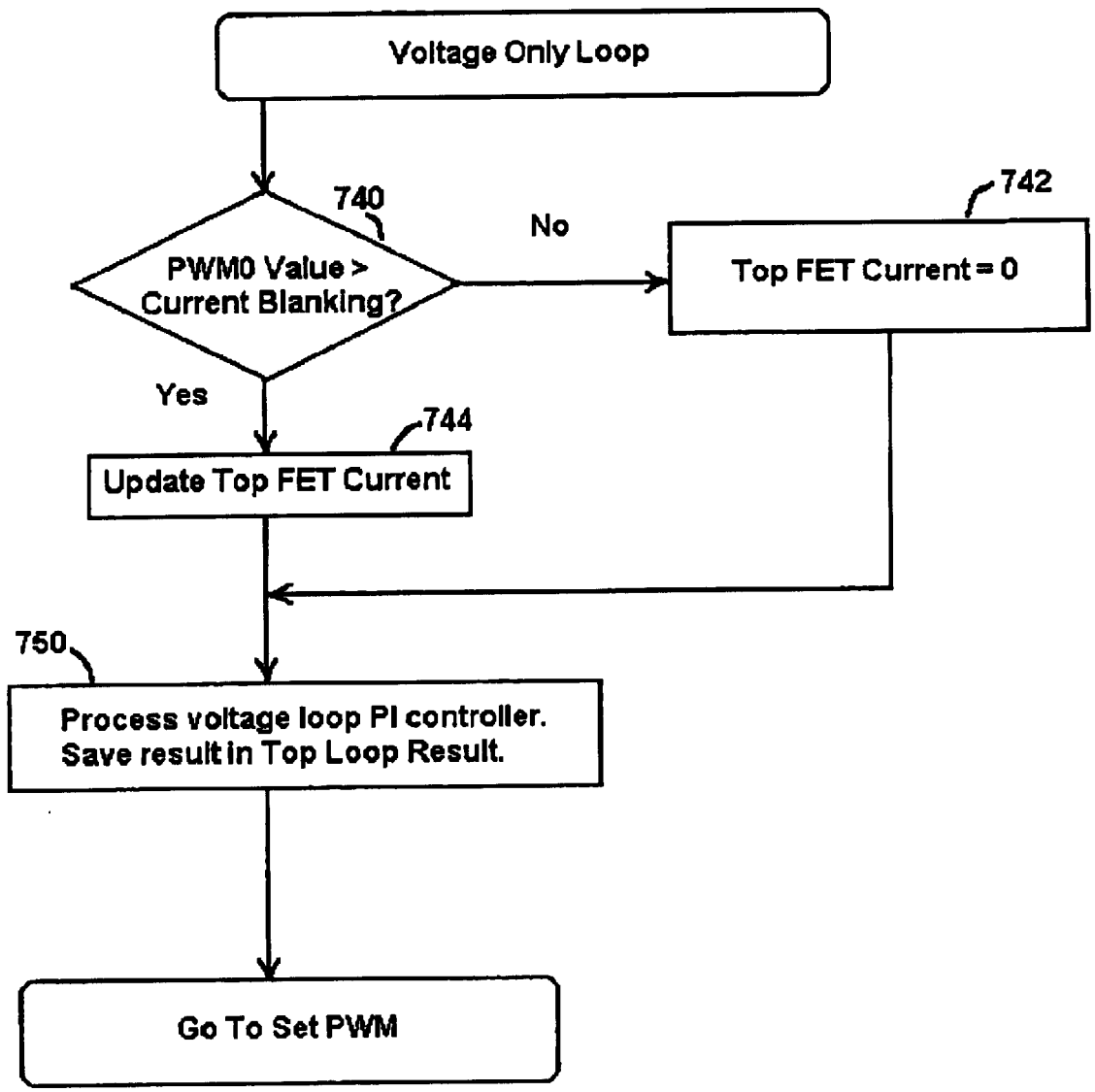
Figure 11F:
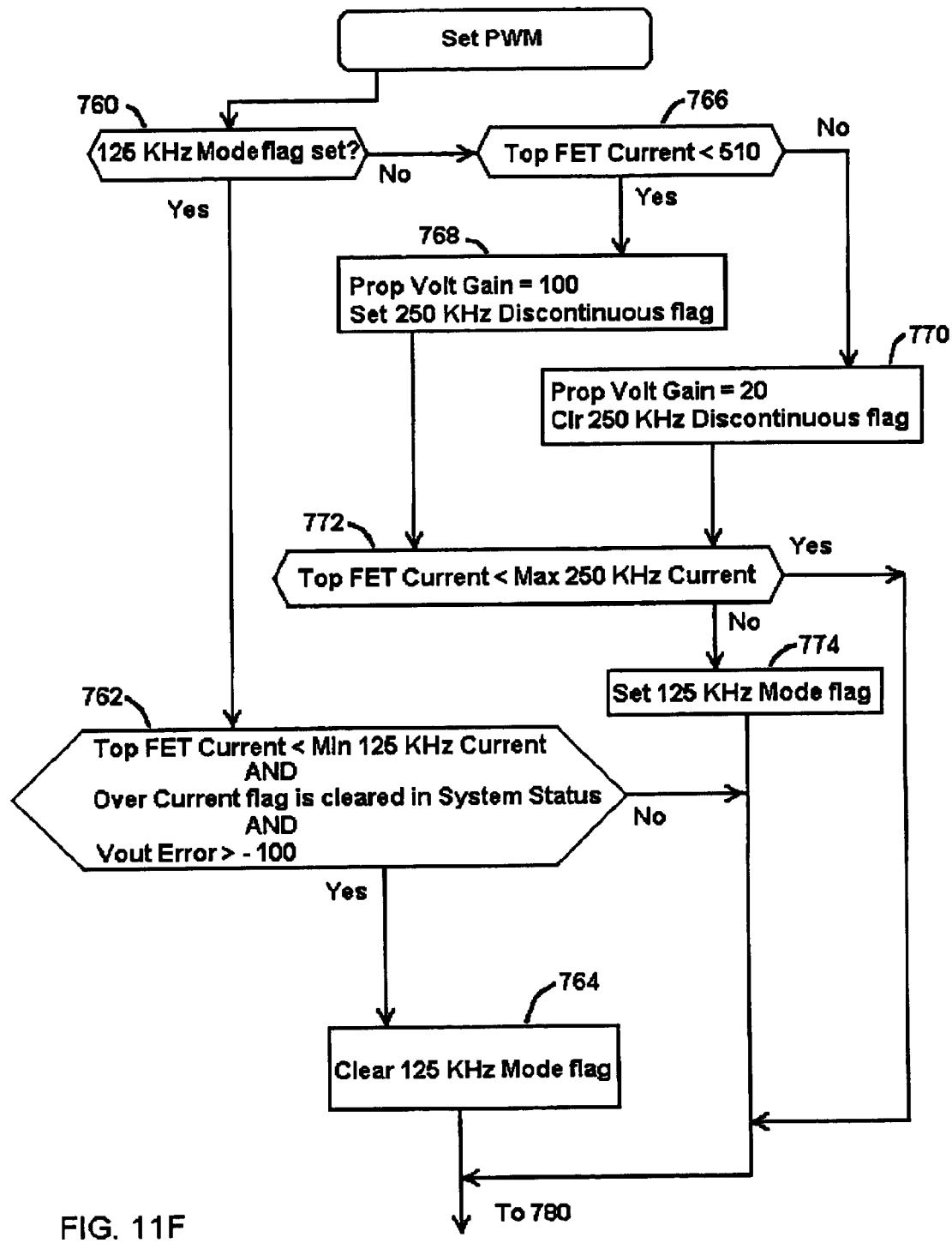
Figure 11G:
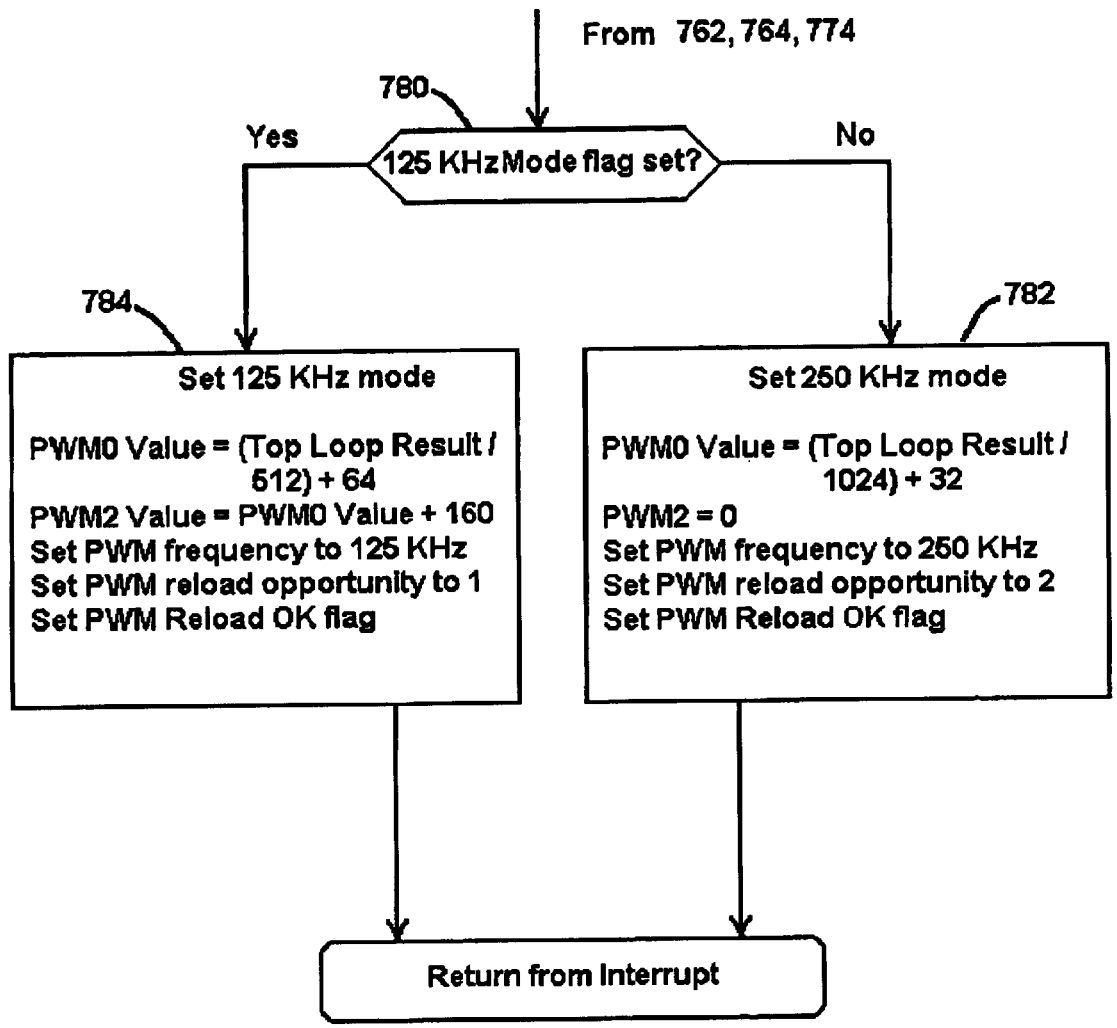

Referring now to FIGS. 10A–10C, the background loop 406, which executes approximately once every 70 microseconds, begins at operation 450 by reading the bottom FET power switch 162 input current sampled at ANA1 from the sequential buffer and storing the value in memory. The input currents of top and bottom converters 122, 124 are normally approximately the same and only the input current of top converter 122 is used to control the active duty cycle pulse width. However, the input current of bottom controller 124 is monitored so that an optional low speed temperature loop can adjust the active pulse width of the bottom drive signal G2 independently of the active pulse width of the top drive signal G1 to enable the top converter 122 and bottom converter 124 to equally share the load and compensate for any load difference that might arise from temperature gradients or component tolerances. The Bottom FET Current is also used to create an Average FET Current value for use with current sharing.

Bottom FET Current is determined as IBOT Result–Offset. IBOT Result is the value read from the A/D buffer in response to signal IBOT and Offset is a smoothed result derived from REF Result, which is the A/D buffer value determined from the 0.25 volt REF value.

In addition, a form of leading edge blanking is imposed on Bottom FET Current to assure that the current values are large enough to make the measurements meaningful. If the 125 KHz Mode flag is reset in System Status to indicate operation in 250 KHz mode or PWM0<=Current Blanking (=1), then Bottom FET Current is set to zero regardless of the calculated value.

The DSP 200 can be configured to continuously stream data to the serial port TXD of the user interface bus 52. Continuous streaming allows an external data processor 50 to continuously monitor a particular power supply parameter or measurement value without having to continuously request it. A 16 bit Configuration variable uses 9 bits as set forth in the following Table 3.

TABLE 3

| NAME | NO. BITS | DESCRIPTION |
| --- | --- | --- |
| View Mode | 4 | Select the desired parameter or measurement to be streamed to TXD serial port |
| Closed Loop | 1 | Overrides and controls closed/open loop operation |
| Current Mode | 1 | Enables/disables current loop operation |
| Voltage Mode | 1 | Enables/disables voltage loop operation |
| Stream Data | 1 | Controls streaming of view mode parameters or measurements to serial port TXD |
| Allow Ext Osc | 1 | Controls whether or not DSP 200 is allowed to use external 8 MHz as a clock source |

Values for the Configuration variable stored in flash memory at the time of manufacture when DSP 200 powers up are Closed Loop=1, Voltage Mode=1, Current Mode=1, View Mode=Vout Error, Stream Data=1 and Allow Ext Osc=1. The only way the flash configuration can be changed is by changing the values programmed during production or by special commands sent through the Serial Port.

The assignments for the 4 bit View Mode number are as follows:

```
0  PWM0 value (GTOP pulse width)
1  PWM1, PWM2 value (GBOT pulse width)
2  Top FET Current
3  Bottom FET Current
4  Min 125 KHz current
5  Max 250 KHz current
6  Vin Sense
7  Vout Sense
8  Vout Error
9  Offset (Reference signal)
10 Not used
11 Current Share In (pulse width)
12 Current Share Out (pulse width)
13 Current Share Loop Result
14 Temperature Sense
15 Not used
```

At operation 452 the background loop tests whether or not the Stream Data flag has been set in the Configuration variable. When the Stream Data flag is reset no streaming occurs. When the Stream Data flag is set streaming occurs by continually sending a sequence of four bytes of data through TXD at operation 454 for each tick of the 5 millisecond Tick Timer Interrupt. First the 16 bit (2 bytes) System Status variable is sent. Next a 16 bit (2 byte) value specified by the View Mode number in the Configuration variable is sent. The 4 bytes are then repeated at each successive 5 millisecond tick. The external data processor 50 can re-synchronize its byte counter with the streaming data by resetting the Stream Data flag, waiting for the streaming data to terminate, and then again setting the Stream Data flag, knowing the first 2 bytes will be the System Status bytes.

The rate at which each of the four bytes is sent is controlled by the Tick Timer flag set by the Tick Timer Interrupt 412 code. Setting this flag (once every 5 milliseconds) starts a new sequence of 4 bytes, thus controlling the rate that data is sent to the external data processor 50. To maximize the speed of the background loop each byte is sent asynchronously rather than requiring the program to wait for it to be sent.

To space the sending of the 4 bytes in time and avoid over burdening either DSP 200 of the serial port connection of user interface bus 52, the set of 4 bytes is sent once for each execution of the Tick Timer Interrupt 412 or every 5 milliseconds. The Tick Timer Interrupt 412 sets a Tick Timer flag each time it executes to inform the background loop 406 that the Tick Timer Interrupt 412 has executed.

As long as the Stream Data flag is set asynchronous communication operation 454 executes during each pass through the background loop. Asynchronous communication operation 454 is controlled in response to a byte counter variable and a Tick Timer flag. Initially the byte counter is reset to zero, causing the background loop 406 to examine the Tick Timer flag, which is set once every 5 milliseconds by Tick Timer Interrupt 412. If the Tick Timer flag is not set, operation 454 does nothing and the background loop continues cycling until the Tick Timer flag becomes set. Upon finding the Tick Timer flag set, operation 454 loads a first byte of data into the transmit buffer for DSP 200, increments the byte counter to one and tests for a count 4. The count will not be 4 so the background loop proceeds to the test 460. Meanwhile, DSP 200 sets a Serial Port Transmit flag to indicate that a byte of data is stored in the transmit buffer and is in the process of being sent. Once the byte has been sent the Serial Port Transmit flag is cleared.

During subsequent passes through asynchronous communication operation 454 the byte counter will have a count greater than zero. This count causes operation 454 to ignore the Tick Timer flag test and test the Serial Port Transmit flag. As long as the flag is set, operation 454 causes no further activity. However, once the Serial Port Transmit flag is found to be cleared, operation 454 loads a next byte of data into the transmit buffer, increments the byte counter and tests for a count of 4 before proceeding to test 460.

This continues until the byte counter reaches a count of 4, indicating that all 4 bytes have been loaded into the transmit buffer. The count of 4 causes the background loop to reset the byte counter and reset the Tick Timer before proceeding to operation 460. Thereafter, the count of zero will cause the background loop to test the Tick Timer flag and thus wait for the Tick Timer flag to again be set before again sending the 4 bytes of data as already described. Normally, sending the 4 bytes of data requires only a small portion of the 5 milliseconds between Tick Timer Interrupts 412. The end result is that the rate at which data is sent is slowed down to a reasonable controlled rate (some external data processor 50 serial ports are easily overloaded) while minimizing DSP processing overhead.

At test 460 the background loop determines whether or not a Get Flash flag has been set. If the Get Flash flag has been set, a send operation 462 sends calibration data to the external data processor 50 before proceeding to a PWM FAULT flag test 470. If the Get Flash flag has not been set the background loop proceeds directly to PWM FAULT flag test 470.

When the RXD Interrupt 414 responds to a GET FLASH command from the external data processor 50 requesting transmission of the Calibration Table RXD Interrupt 414 sets a Get Flash flag. Thereafter, if the Get Flash flag is set at test 460 the DSP 200 executes operation 462 by sending the RAM copy of the Calibration Table values to data processor 50 through the serial transmit port TXD. First a one byte value of 56 is sent to indicate the number of bytes of calibration data that are being sent. Then the 28 Calibration Table values are sent with 2 bytes per value. After the Calibration data has been sent, DSP 200 clears the Reset flag in System Status and clears the Get Flash flag that prompted the sending of the Calibration data.

At PWM FAULT flag active test 470 DSP 200 tests whether or not a PWM FAULT flag has been set in response to a FAULT input from signal FT in response to an over voltage or over current condition. If no, code execution proceeds to Internal PLL Locked test 480. If the fault resulted from over voltage, an Over Voltage Fault Interrupt 418 is also generated. The Over Voltage Fault Interrupt 418 sets an IRQ Over Voltage flag. If the PWM FAULT flag has been set, an IRQ Over Voltage flag set test 472 determines whether the IRQ Over Voltage flag has been set. If yes, the System State variable is set to Over Voltage Fault at operation 474 and the program proceeds to test 480. If the IRQ Over Voltage flag has not been set the System State variable is set to Over Current Fault at operation 476 and the background loop program proceeds to test 480.

DSP 200 has an internal phase locked loop (PLL) that multiplies a received (whether from an internal or external oscillator) 8 MHz clock signal by 10 to generate an 80 MHz internal clock signal. Internal PLL Locked test 480 determines whether or not this loop is locked. If yes, operation 482 sets the PLL Locked flag in the System Status variable and background loop execution proceeds to operation 490. If no, operation 484 clears the PLL Locked flag in the System Status variable and operation proceeds to operation 490.

At operation 490 the background loop then updates variable Ext OSC Control Sense equal to signal FCTRL Result stored in the sequential buffer which represents the frequency control signal, FCTRL, received at ANA6. Range test 500 is then performed by determining whether or not signal Ext OSC Control Sense is within its normal operating range between the Calibration Table values Ext OSC Low Limit and Ext OSC Hi Limit. If within the defined range, operation 502 sets the Ext OSC Good flag in the System Status variable and test 504 tests the Allow Ext Osc flag in the Configuration variable. If the Allow Ext Osc flag is set, operation 506 then switches DSP 200 to operate the clock in response to the external 8 MHz reference signal and proceeds to operation 510. If test 500 determines that Ext OSC Control Sense is not within the defined range, operation 508 clears the Ext OSC Good flag in System Status, switches to internal oscillator for the DSP 200 clock and proceeds to test 510. The speed of the PLL 202 is slow enough that if an external synch signal, SYNCH_IN, is lost, the DSP 200 can be switched back to the internal clock signal without disrupting operation.

Range test 510 determines if the value of Vin Sense is within the range defined by the Min Input Volts and Max Input Volts in the Calibration Table: If the value is within range, operation 512 clears the Vin Under/Over flag in System Status and deactivates the VIN UNDER/OVER output signal on the user interface bus 52 that appears at terminal B7 before proceeding to test 520. If the value is out of range, operation 514 sets the Vin Under/Overflag in System Status and activates the VIN UNDER/OVER output signal on the user interface bus 52 that appears at terminal B7 before proceeding to test 520.

Off test 520 determines whether the dual condition that the System State variable is set to OFF and the OFF input to port B6 from the user interface bus 52 is not active. This means that the external data processor 50 had previously asserted an OFF command and has now released the OFF command. If the dual test is true, operation 522 turns off the PWM Reload interrupts and executes a reset of DSP 200. This terminates the background loop 406 and returns program execution to Power Up, Reset, Start 402 and Initialization 404.

If the dual test 520 fails, test 524 determines whether an OFF command from the external data processor 50 is active. If yes, operation 526 sets the System State variable to OFF and the background loop proceeds to test 530. If the external OFF command is not being asserted the background loop proceeds to test 530. While in the Off state, DSP 200 continues to process the background loop and all interrupts continue to execute, although the PWM Reload interrupt operates differently during an Off state.

Test 530 determines whether or not the absolute value of Vout Error is less than the Vout Tolerance value in the Calibration Table. If yes, operation 532 sets the Vout Good flag in System Status and activates the VOUT GOOD output signal to the user interface bus 52 on terminal B5 of DSP 200. The background loop 406 then proceeds to test 540. If Vout is out of range operation 534 clears the Vout Good flag in System Status and deactivates the VOUT GOOD output signal to the user interface bus 52 on terminal B5 of DSP 200. The background loop 406 then proceeds to test 540.

Test 540 determines whether or not a Write Flash flag has been set. If the flag is set, operation 542 first disables all interrupts, sets PWM0 and PWM2 outputs to zero width, writes the calibration data (28 two byte Calibration Tale values) from the RAM to Flash memory and resets DSP 200. Resetting DSP 200 causes operation to resume Power Up, Reset, Restart 402 and Initialize 404. If the Write Flash flag is not set, execution proceeds to operation 550.

An external data processor 50 can modify the RAM copy of the Calibration Table by writing new values into the table. However, the new values will be lost if the DSP 200 is turned off or otherwise reset. To save these changes in the nonvolatile Flash memory, external data processor 50 issues a Write Flash command to the RXD serial port. This command causes the RXD Interrupt 414 to set the Write Flash flag. Setting the Write Flash flag causes the background loop to write the RAM copy of the Calibration Table to nonvolatile Flash memory, thus preserving the new values, as described for test 540 and operation 542. Resetting DSP 200 causes initialization routine 404 to copy the updated Calibration Table from Flash memory to RAM so that operation of DSP 200 can continue using the new values.

Some of the values in the Calibration Data are used only by the external data processor 50. For example, Vout Gain, Vin Gain and Temperature Gain allow the external data processor 50 to calculate calibrated values from the values sent by the DSP 200. It also uses these gains to determine values for Desired Vout, Min Input Volts, Max Input volts, Vout Tolerance, Software OVP, Temperature Min and Temperature Max in terms of uncalibrated raw measurements made by the DSP 200. This technique reduces processing overhead on the DSP 200 while maintaining accuracy. It also allows the external data processor 50 to read the calibration gains for that particular power supply so that an external copy of the calibration data does not need to be maintained. One of the first operations the external data processor 50 does when communicating to a power supply for the first time is to request the Calibration data so that it can represent all Calibration Table values and streamed data in terms of calibrated values.

The current loop gains are updated at operation 550. The gain values used by the current loop PI (proportional integral) controller (Prop Amp Gain1 and Integral Amp Gain1) are adjusted in response to the input voltage. The background loop operation 550 uses Vin Sense as calculated at operation 600 of the PWM Reload Interrupt 410 to calculate an intermediate variable Vin=Vin Sense*Vin Gain. Vin Gain is from the Calibration Table. Vin is used to access a table and update the current gain variables based on the following value relationships:

Vin<125 Vin Gain Correction=1.0

125<=Vin<147 Vin Gain Correction=0.852

147<=Vin<172 Vin Gain Correction=0.726

172<=Vin<202 Vin Gain Correction=0.619

202<=Vin<237 Vin Gain Correction=0.527

237<=Vin<278 Vin Gain Correction=0.449

278<=Vin<327 Vin Gain Correction=0.383

327<=Vin<383 Vin Gain Correction=0.326

383<=Vin Vin Gain Correction=0.278

The equations for updating the current gain variables are:

Prop Amp Gain=Prop Amp Gain1*Vin Gain Correction     (1)

Integral Amp Gain=Integral Amp Gain1*Vin Gain Correction     (2)

After operation 550 the current thresholds are updated at operation 552. The current thresholds use two values, Min 125 KHz Current and Max 250 KHz Current. The threshold values are updated at this point in the Background Loop 404 and then used in the PWM Reload Interrupt 410 to select operation in 125 KHz mode or 250 KHz mode. If the Top FET Current rises above Max 250 KHz Current DSP 200 switches to 125 KHz mode. If the Top FET Current drops below Min 125 KHz Current, DSP 200 switches to 250 KHz mode. A substantial separation is maintained between the two values so that the DSP 200 will not rapidly switch back and forth or "chatter" if it happens to be sitting at a change over point between the two modes. Having calculated Vin in operation 550, Vin is used in operation 552 to update the current threshold variables to a value as set forth below in Table 4.

TABLE 4

| Vin Range | Min 125 KHz Current | Max 250 KHz Current |
|---|---|---|
| Vin <= 125 | 991 | 1592 |
| 125 < Vin <= 147 | 1939 | 1633 |
| 147 < Vin <= 172 | 1089 | 1683 |
| 172 < Vin <= 202 | 1162 | 1738 |
| 202 < Vin <= 237 | 1198 | 1768 |
| 237 < Vin <= 278 | 1226 | 1792 |
| 278 < Vin <= 327 | 1146 | 1809 |

TABLE 4-continued

| Vin Range | Min 125 KHz Current | Max 250 KHz Current |
|---|---|---|
| 327 < Vin <= 383 | 1281 | 1838 |
| 383 < Vin | 1300 | 1855 |

After the current threshold values are updated at operation 552 the background loop 406 determines Average FET Current at operation 554. The Average FET Current value is the current share signal broadcast as a pulse width on the current share bus CS 62. The averaging operation uses 8 values stored in a circular buffer. A new value replaces the oldest value in the buffer on each pass through the main background loop 406. At operation 554, after a new value is added to the buffer Average FET Current is determined as the sum of all 8 values divided by 8. If the power section 72 is operating in 125 KHz mode, the new value added to the buffer is (Top FET Current+Bottom FET Current)/2.

If the converter is operating in 250 KHz mode, Duty Cycle is calculated as Duty Cycle=[(Top Loop Result/512)+64]/320 The new value added to the buffer is (Top FET Current/2+610−(0.44875*Duty Cycle). The purpose of this equation is to convert the 250 KHz value to an equivalent 125 KHz value. This is important so that the current share signal broadcast by DSP 200 is in normalized units that are compatible with all of the DC to DC power converter units 12, 14, . . . 18 in the DC to DC converter system 10 since the other power converter units have no way of knowing if a particular unit is operating in 125 KHz mode or 250 KHz mode.

PWM Reload Interrupt 410

Referring now to FIGS. 11A–11G, PWM Reload Interrupts 410 are generated every 8 microseconds in response to signal PWM Reload. PWM Reload interrupts 410 are disabled following a power-on, external reset or restart of the DSP 200 but are enabled at all other times. The PWM Reload interrupt code controls the closed loop operation of the voltage and current loops and the PWM gate control output signals GTOP and GBOT.

Operation 600 reads the two VOX measurement values stored in the 8 value sequential buffer as VOX Result1 and VOX Result6 by the A/D converter. These values are averaged to obtain a reduced noise value, $$\text{Vout Sense} = [(\text{VOX Result1} + \text{VOX Result6})/2] - \text{Vout Working Offset} \quad (3)$$

where Vout Working Offset=Vout Sense Offset+Offset. Vout Working Offset is updated at each Tick Timer Interrupt 412. If Vout Sense exceeds Software OVP in the Calibration Table, the DSP 200 acts at operation 600 to shut down the PWM outputs, set the System State variable to Software Over Voltage Fault and set TOP Loop Result and Bottom Loop Result to Min. Min is the smallest value the 16 bit representation of DSP 200 can be, −32,768. This Software OVP value is programmable whereas the hardware over voltage is not.

The input voltage variable, Vin Sense is determined in response to IV Result, which is sampled at port ANA4 and stored in the 8 register buffer. Vin Sense is determined as, $$\text{Vin Sense} = 4096 - \text{IV Result} - \text{Vin Working Offset} \quad (4)$$

where Vin Working Offset has been previously calculated as Vin Sense Offset+Offset. Subtraction of IV Result from 4096 reverses the negative slope characteristic of IV Result.

Signal Vout Error is next calculated for use in processing the voltage loop PI (proportional integral) controller. Use of a variable Current Share Loop Result enables the output voltage of the power supply to be increased when performing current sharing while in the slave mode. Signal Vout Error is calculated as $$\text{Vout Error} = \frac{\text{Vout Sense} - \text{Desired Vout} -}{\text{Current Share Loop Result}} \quad (5)$$

where Desired Vout is in the Calibration Table defining the nominal output voltage (5 volts in the present example) and Current Share Loop Result is calculated in response to current sharing (see equation (27)).

After operation 600, test 602 determines whether or not closed loop operation is enabled by setting of the Closed Loop flag in the Configuration variable and setting of the System State variable to Normal (0). If yes, a "Go to Closed Loop" jump 604 is executed. If no, the PWM Reload Interrupt 410 proceeds to PWM0 test 610.

Test 610 determines whether the PWM duty cycle (pulse width) is sufficiently wide to read the ITOP Result value input at ANA2. This is a form of leading edge blanking that is necessary because the sample and hold circuit 240 needs a minimum pulse width in order to function. Also, there is a delay and noise produced by the FET switches 142, 162 and power stage at the beginning of each pulse and it is desirable to wait until the pulse width is longer than this noise before starting the measurements. PWM0, PWM1 and PWM2 are the values corresponding to the respective DSP 200 pulse width outputs. The pulse widths are the values multiplied by 25 nanoseconds. If the pulse width for the PWM0 value is not greater than Current Blanking (=1), Top FET Current is set to 0 at operation 612 and execution proceeds to test 620. Current Blanking is set to 1, corresponding to a pulse width of 25 nanoseconds. To use an input value for Top FET Current, PWM0 pulse width value must thus be greater than 1 or at least 2 (corresponding to a pulse width of at least 50 nanoseconds). If the GTOP pulse width is long enough, operation 614 determines Top FET Current=ITOP Result−Offset and program execution proceeds to test 620.

At test 620 DSP 200 determines whether the Off input from the external data processor 50 is asserted. If yes, DSP 200 sets the system state variable to OFF (5) at operation 622 to cause the output power to be turned off and proceeds to system state Off test 630. If no, execution proceed directly to system state off test 630.

If the Off test 630 finds the System State variable set to OFF, the PWM Reload Interrupt executes operation 632 by setting variables Top Loop Result and Bottom Loop Result to a minimum value, Min (−32,768), which later causes the PWM outputs GTOP and GBOT to be set off. Execution then continues with test 640. If the System State variable is not set to OFF, execution passes directly to System State Soft Start test 640.

If it is determined at System State Soft Start test 640 that System State is not Soft Start, code for potentially changing Top Loop Result and Bottom Loop Result is bypassed by jumping directly to Set PWM, which is a subpart of the PWM Reload Interrupt 410. All other states besides Soft Start and OFF leave Top Loop Result and Bottom Loop Result unchanged. This allows other code (such as a program in an external data processor acting through the serial port Data Received Interrupt code) to directly control the PWM outputs. If System State is set to Soft Start execution proceeds to operation 642 and then to test 650.

At operation 642 the PWM Reload Interrupt calculates Max Primary Current as follows:

$$\text{Duty Cycle} = [(\text{Top Loop Result}/512) + 64]/320 \quad (6)$$

$$x = (\text{Vin Sense}*2) + \text{Current Limit Offset} \quad (7)$$

$$\text{Max Primary Current} = \text{Current Limit Value} + \text{Current Limit Slope}/32{,}768 * \text{Duty Cycle} * x \quad (8)$$

Next, at test 650 PWM Reload Interrupt 410 operates in Soft Start mode to check whether or not to transition to the Normal System State. The system state is set to Normal at operation 658 if any one of three tests is true: (1) Vout Error>=0 or (2) Vin Sense is greater than Min Input Volts or (3) Top FET Current>Max Primary Current. In principle Top Loop Result variable is incremented by one for each PWM Reload Interrupt until Vout Error shows that the converter 12 has reached the desired output voltage or the input voltage is in range or Top FET Current>Max Primary Current. If any of these three conditions is true the code attempts to close the current and voltage loops by setting System State to Normal at operation 658 before advancing to operation 660. This technique allows minimum start up time for the power stage while maintaining current limiting and preventing overshoot of the output voltage.

Thus, if none of the three tests is true, operation 652 increments Top Loop Result and then test 654 determines if Top Loop Result has wrapped around to MIN (−32768). If yes, Top Loop Result is set to MAX (32767) at operation 656, System State is set to Normal at operation 658 and program execution advances to operation 660. If there has been no wrap around of Top Loop Result, execution advances directly to operation 660.

At operation 660 Amp Setting is set to Top FET Current and Volt Loop Result is set to Amp Setting*8 before jumping to Set PWM. Volt Loop Result is the output of the voltage PI (proportional integral) loop and also serves as the voltage loop integrator. Amp Setting is the reference input to the current PI loop and is normally set to Volt Loop Result/8. Normally the voltage loop is the dominant (or outer) control loop and the voltage loop drives the current loop. This application scales down the output of the voltage loop by a factor of 8 (Volt Loop Result/8) and this becomes the Amp Setting value which is the desired set point of the current loop. Resetting these values here creates a smooth transition when the loops are closed.

However, there are two special cases where the current loop is the dominant loop (Soft Start at operation 660 and current limit at operation 722). In these two cases the current loop resets the output of the voltage loop (Volt Loop Result) because the current loop knows that the voltage loop may once again become the dominant loop. By resetting Volt Loop Result at these two places, the DSP 200 code eliminates any glitching when the voltage loop next becomes the dominant loop. In order to reset the output of the voltage loop, the current loop must invert the math so it multiples Amp Setting by 8.

The closed loop subpart of PWM Reload Interrupt 410 begins with test 670 to determine whether or not the Current Mode flag is set in the Configuration variable. Closed loop operation can proceed in any of three modes, which are summarized in Table 5 as follows:

TABLE 5

| | |
|---|---|
| (1) Voltage Only | |
| Input: | Vout Error |
| Output: | Top Loop Result |
| Gain values: | Prop Volt Gain1 and Integral Volt Gain1 |
| (2) Current Only | |
| Input: | Current Reference |
| | Top FET Current |
| Output: | Top Loop Result |
| Gain values: | Prop Amp Gain |
| | Integral Amp Gain |
| (3) Voltage and Current | |
| Inputs: | Vout Sense |
| | Vout Error |
| | Amp Setting (Volt Loop Result/8) |
| | Top FET Current |
| Outputs: | Volt Loop Result and Top Loop Result |
| Gain Values: | Prop Volt Gain, |
| | Integral Volt Gain2 |
| | Prop Amp Gain |
| | Integral Amp Gain |

The gains used by the current loop are corrected in accordance with Vin at operation 550 as previously described.

The desired mode is to operate the power supply using both voltage and current loops. For test purposes it is desired to operate the loops separately (voltage only or current only). If the Current Mode flag in the Configuration variable is not set, program execution jumps to Voltage Only Loop. If the Current Mode flag is set, execution proceeds to operation 680.

At operation 680 the ANA2 input, ITOP Result measurement in the A/D buffer is purged of any prior measurement from the A/D converter by setting it to zero. An internal Data Measured flag for the ANA2 input is also cleared so that the program can tell when a new value has been measured for that particular buffer location by the Data Measured flag again being set. The measurement of the ANA2, ITOP signal must be performed after the GTOP signal (G1) is off. Any residual result for ITOP Result is purged at this time so that a fresh result obtained after the top power switch gating signals, GTOP and G1, are off can be measured later.

Thereafter operation 680 processes the voltage loop PI (Proportional Integral) controller and saves the result in Volt Loop Result. The Voltage Loop PI controller uses the following equations:

$$\text{Voltage Loop Result} = Kp * [v(k-1) - v(k)] + [Ki * \text{Vout Error}]/4 + \text{Voltage Loop Result} \quad (9)$$

$$\text{Prior Vout Sense} = \text{Vout Sense} \quad (10)$$

$$\text{Amp Setting} = \text{Voltage Loop Result}/8 \quad (11)$$

where Kp=Prop Volt Gain, Ki=Integral Volt Gain2, v(k)=Vout Sense, v(k−1)=Prior Vout Sense. Prop Volt Gain is updated at the Set PWM subpart of PWM Reload Interrupt 410. The Ki term is divided by 4 to increase the gain resolution of the result. The calculation of Voltage Loop Result could result in a value greater than a signed 16 bit number (overflow) but the DSP 200 limits Voltage Loop Result to a signed 16 bit number when the intermediate calculation is stored into memory.

After operation 680, test 690 determines whether or not the Voltage Mode flag in Configuration is set. If not, the results of the voltage loop PI controller are not used, Amp Setting is set to the Current Reference Calibration Table value at operation 692 and execution jumps to operation 730 to process the current loop PI Controller.

If the Voltage Mode flag in the Configuration variable is set at test 690, then operation proceeds in voltage and current mode and output current limiting is checked. The Max Primary Current value represents the theoretical primary current value when the output current of the power supply equals the desired output current limit value. The power supply hardware does not directly sense the output current so it must be calculated based on input voltage, duty cycles and 3 values in the Calibration Table (1) Current Limit Value, (2) Current Limit Slope and (3) Current Limit Offset. If the Voltage Mode flag is set operation 694 calculates Max Primary Current as follows:

$$\text{Duty Cycle} = [(\text{Top Loop Result})/512) + 64]/320 \quad (12)$$

$$x = (Vin\ \text{Sense} * 2) + \text{Current Limit Offset} \quad (13)$$

$$\text{Max Primary Current} = \text{Current Limit Value} + \text{Current Limit Slope}/32{,}768 * \text{Duty Cycle} * x \quad (14)$$

Next, by determining whether or not PWM0 Value is greater than Current Blanking, test 700 determines if the duty cycle is sufficiently high to measure the top current signal, ITOP at ANA2 to update ITOP Result in the A/D buffer. This is a form of leading edge blanking and is necessary because the sample and hold circuit 240 needs a minimum pulse width in order to function. Also there is a delay and noise produced by the FET's in the power stage at the beginning of the pulse and it is desirable to bypass this noise. If the PWM0 Value is not great enough, operation 702 sets the Top FET Current to 0 before proceeding to operation 704. If PWM0 Value is sufficiently large, test 704 is continually executed until the A/D converter ITOP Result value representing the current through power switch 142 has been measured in response to signal ITOP at input ANA2. Typically sample and hold 240 is ready by the time of test 704 and no delay is imposed. When operation 680 purged any prior measurement result from ITOP Result it also cleared an ANA2 Data Measured flag internal to the A/D converter for the ANA2 input that now makes it possible to poll for a new result. Once the ITOP signal has been measured, operation 706 updates Top FET Current as $$\text{Top FET Current} = \text{ITOP Result} - \text{Offset} \quad (15)$$

and execution proceeds to test 720.

Test 720 next determines whether or not Top FET Current is greater than Max Primary Current. If the Top FET Current exceeds Max Primary Current then the power supply operates in current limit mode and executes operation 722 before proceeding to test 730. In current limit mode at operation 722 Amp Setting, which is the input to the current loop PI controller, is set to Max Primary Current; Volt Loop result is reset to Amp Setting*8 so that there will be a smooth transition if and when the DSP 200 comes out of current limit mode; the OVER CURRENT output to the User Interface Bus 52 is activated, and the Over Current flag in System Status is set. If Top FET Current is not greater than Max Primary Current at test 720, operation 724 Deactivates the OVER CURRENT user bus signal and clears the Over Current flag in System Status before execution proceeds to operation 730.

At operation 730 the Closed Loop subpart of PWM Reload Interrupt processes the current loop PI controller and saves the result in Top Loop Result before jumping to subpart Set PWM. The PI controller uses the following equations:

$$\text{Amp Error} = \text{Top FET Current} - \text{Amp Setting} \quad (16)$$

$$\text{Top Loop Result} = Kp*[i(k-1)-i(k)]+[Ki*\text{Amp Error}]/8 + \text{Top Loop Result} \quad (17)$$

$$\text{Prior Top FET Current} = \text{Top FET Current} \quad (18)$$

where Kp=Prop Amp Gain, Ki=Integral Amp Gain, i(k)=Top FET Current, i(k−1)=Prior Top FET Current. Prop Amp Gain is calculated in operation 510 of the background loop in response to Calibration Table data as Prop Amp Gain1*Vin Gain Correction (Eq. 1). Integral Amp Gain is calculated in operation 510 of the background loop as Integral Amp Gain*Vin Gain Correction (Eq. 2). The Ki term is divided by 8 to increase the gain resolution of the result. The calculation of Top Loop Result could result in a value greater than a signed 16 bit number but the DSP 200 limits Top Loop Result to a signed 16 bit number when the intermediate calculation is stored into memory.

In 125 KHz mode, the Top Loop Result numeric range is −32768 to 32767 while the PWM0 value has a numeric range of 0 to 128 and the PWM2 value has a numeric range of 160 to 288. The corresponding pulse width for the GTOP and GBOT pulses is 0 to 3.2 microseconds. The duty cycle numeric range is 0 to 40% for both the top and bottom power switch gating signals, GTOP, G1 and GBOT, G2. This provides a total maximum active duty cycle portion of 80%.

In 250 KHz mode, the Top Loop Result numeric range is −32768 to 32767 while the Top PWM value range is 0 to 64 corresponding to a pulse width range of 0 to 1.6 microseconds. The BOT PWM value and PWM value range is always 0 since the bottom converter is off. The 1.6 microsecond pulse width represents a 40% active duty cycle portion of the 4.0 microsecond duty cycle period used for 250 KHz mode operation.

The Voltage Only Loop subpart of PWM Reload Interrupt 410 begins with test 740 to determine whether PWM0 is greater than current blanking. This is a form of leading edge blanking as previously discussed. When operating in the voltage only mode the Top FET Current value is not used to process any loops, but might be used by the background loop 406 to balance the load between the top and bottom portions of the power unit (power switches 142, 162) (Current balancing is not actually implemented in the present example although provision is made for implementation in the future). It is also used in the background loop 406 to calculate Average FET Current. If PWM0 does not exceed Current Blanking, operation 742 sets Top FET Current to zero and program execution proceeds to operation 750. If PWM0 does exceed Current Blanking the program updates Top FET Current=ITOP Result−Offset at operation 744 before execution proceeds to operation 750.

Operation 750 processes the voltage loop PI controller and saves the result in Top Loop Result before the program jumps to Set PWM. The voltage only loop PI controller uses the following equations:

$$\text{Top Loop Result} = Kp*[e(k)-e(k-1)]+[Ki*e(k)]/4 + \text{Top Loop Result} \quad (19)$$

$$\text{Prior Vout Error} = \text{Vout Error} \quad (20)$$

Where Kp=Prop Volt Gain1, Ki=Integral Volt Gain1, e(k)= Vout Error, e(k−1)=Prior Vout Error. The Ki term is divided by 4 to increase the gain resolution of the result. The calculation of Top Loop Result could result in a value greater than a signed 16 bit number, but the DSP 200 limits Top Loop Result to a signed 16 bit number when the intermediate calculation is stored into memory.

The Set PWM subpart of PWM Reload Interrupt 410 determines whether the power supply should operate in normal 125 KHz mode or low current 250 KHz mode and sets up the control variables accordingly. It will be recalled that threshold values Max 250 KHz Current and Min 125 KHz Current were updated at operation 552 in the background loop 406. At test 760 the Set PWM subpart determines whether the DSP 200 is presently operating in 125 KHz mode by determining whether or not the 125 KHz Mode flag is set in System Status. If the 125 KHz Mode flag is set, the code performs a three part test to determine whether or not to clear the flag. At test 762 it is determined whether or not:

(1) Top FET Current<Min 125 KHz Current AND (2) Over Current flag in System Status is cleared AND (3) Vout Error>−100

If all three conditions are true, the 125 KHz Mode flag is cleared at operation 764 and the code proceeds to again test the 125 KHz Mode flag at test 780.

If any of the three tests at 762 are false, the power supply remains in 125 KHz mode and the code proceeds to again test the 125 KHz Mode flag at test 780 without clearing the 125 KHz Mode flag.

If at test 760 the 125 KHz Mode flag is not set (indicating 250 KHz mode) test 766 determines whether or not the Top FET Current is less than 510. If yes, operation 768 sets Prop Volt Gain to 100 and sets the 250 KHz Discontinuous flag in System Status before proceeding to test 772. If no, operation 770 sets Prop Volt Gain to 20 and clears the 250 KHz Discontinuous flag in System Status before proceeding to test 772.

At test 772 the code determines whether or not Top FET Current<Max 250 KHz Current. If yes, the 125 KHz Mode flag remains reset to indicate 250 KHz mode and the flag is again tested at test 780. If the Top FET Current is not below the maximum threshold, operation 774 sets the 125 KHz Mode flag before the flag is again tested at test 780.

Having determined whether operation should proceed in 125 KHz mode or 250 KHz mode and having set the 125 KHz Mode flag accordingly, test 780 now tests the status of the flag. If the 125 KHz Mode flag is reset, operation 782 sets up operation for 250 KHz mode, starting by calculating PWM0 Value as:

$$\text{PWM0 Value} = (\text{Top Loop Result}/1024) + 32 \qquad (21)$$

Operation 782 also sets PWM2 to zero to turn off the GBOT drive signal (G2), sets PWM Frequency to 250 KHz, sets PWM reload opportunity to 2 to keep the period of the PWM Reload Signal at 8 microseconds notwithstanding the doubling of the duty cycle frequency, sets a PWM Reload OK flag that enables generation of the PWM Reload Signal. A return from the PWM Reload Interrupt is then executed.

If test 780 determines that the 125 KHz Mode flag is set, operation 784 sets up operation in 125 KHz mode starting by calculating the PWM0 Value as:

$$\text{PWM0 Value} = (\text{Top Loop Result}/512) + 64 \qquad (22)$$

Operation 784 then sets PWM2 Value to PWM0 Value+160 to obtain a 180 degree phase offset, sets PWM Frequency to 125 KHz, sets PWM Reload Opportunity to 1, sets the PWM Reload OK flag before returning from the PWM Reload Interrupt.

The power stage can operate in either the 125 KHz mode or in the 250 KHz mode. The Top FET Current value is compared to Min 125 KHz Current or Max 250 KHz current to determine when to transition between the two modes. The purpose of changing between the 125 KHz and 250 KHz modes is to maintain continuous conduction mode at low output currents to the extent possible. This maximizes loop bandwidth and power supply performance.

In the 125 KHz mode, the top and bottom sections run at 125 KHz with the bottom section phase offset by 180 degrees. In the 250 KHz mode, the top section of the power unit runs at 250 KHz and the bottom section is off. The PWM values are unsigned numbers based on 25 nanosecond increments. In the 125 KHz mode, the maximum PWM0 value is 128 (3.2 microsecond/25 nanosecond) and the maximum PWM2 value is 288 (160+128). In the 250 KHz mode the maximum PWM0 value is 64 (1.6 microsecond/25 nanosecond).

Tick Timer Interrupt 412

Figure 12:
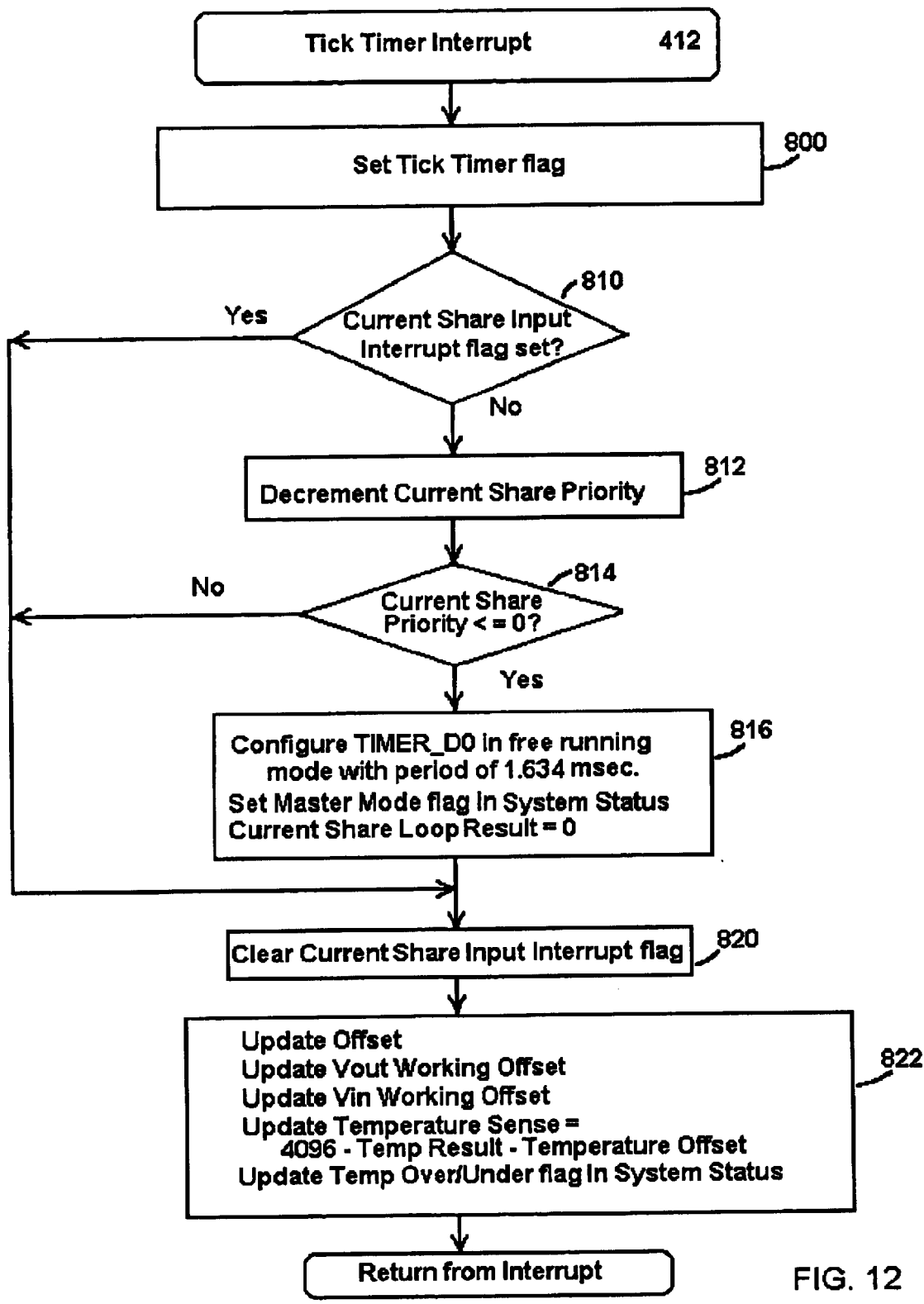
FIG. 12 is a flowchart of a Tick Timer Interrupt used in the firmware program shown in FIG. 9.

Referring now to FIG. 12, the Tick Timer Interrupt 412, which is called every 5 milliseconds, begins by setting a Tick Timer flag at operation 800. This flag notifies the background processing loop that a Tick Timer Interrupt 412 has occurred.

Next, test 810 determines whether or not the Current Share Input flag has been set. The Current Share Input flag is set each time a Current Share Input Interrupt 416 occurs. A Current Share Input Interrupt 416 should occur approximately every 1.634 milliseconds. When operating in the slave mode, as long as Current Share Input Interrupts 416 occur the power supply remains in the slave mode. If a Current Share Input Interrupt 416 has not occurred within the last 5 millisecond Tick Timer Interrupt 412 interval, a master is not currently driving the CS signal on Current Share bus 62 and execution of contention for master begins by decrementing a Current Share Priority variable at operation 812.

After decrementing Current Share Priority at operation 812, test 814 determines whether or not Current Share Priority is less than or equal to zero. If test 814 determines that Current Share Priority is less than or equal to zero, the power supply becomes a master and at operation 816 Timer_D0 is set to free running mode with a period of 1.634 millisecond. In addition, the Master Mode flag in System Status is set and Current Share Loop Result, which is used in slave mode to increase the slave unit current to match the master unit current, is set to 0 so that the output voltage set point of the power supply is at the nominal (minimum) value (5 volts in the present example). Program execution then continues with operation 820.

If at test 814 Current Share Priority has not yet been decremented to zero, master status is not yet assumed and program execution jumps to operation 820. Similarly, if at test 810 the Current Share Input flag has been set, the power supply remains in slave mode by jumping to operation 820.

At operation 820 the Current Share Input flag is cleared so that a new Current Share Input Interrupt 416 can be detected.

Next, at operation 822 DSP 200 updates several offset variables that are used to compensate for A/D errors and variations in system components. First a variable Offset is updated in response to REF Result, which is the value received at ANA3 in response to the 0.25 volt offset signal, REF. The offset variable, Offset, is updated by the Tick Timer code in a low pass filtering process incrementing or decrementing the offset variable only when REF Buffer is greater than or less than the Offset variable for 5 consecutive measurements. While Offset has a nominal value of 250 millivolts, because of the particular transfer function characteristics of the A/D converters within DSP 200, a more typical value is 61.

Operation 822 also calculates intermediate working variables, $$\text{Vout Working Offset} = \text{Vout Sense Offset} + \text{Offset} \quad (23)$$

$$\text{Vin Working Offset} = \text{Vin Sense Offset} + \text{Offset} \quad (24)$$

Vout Sense Offset and Vin Sense Offset are values from the Calibration Table.

The Offset signal, REF, is used to correct offset voltage drift due to temperature in the A/D converters that are internal to DSP 200. Signal REF is also used to bias the sample and hold current values (FIG. 6, sample and hold circuit 240) so that the ITOP and IBOT signals do not go below 250 millivolts. The hardware that provides inputs to the other analog inputs (ANA0–7 except REF input ANA3) are also biased in such a way that the minimum voltage value is 250 millivolts, which is a requirement of the A/D converters of this particular DSP configuration. The Offset variable is added to the offset values in the Calibration Table (Vout Sense Offset, Vin Sense Offset) to obtain Vout Sense and Vin Sense. Top FET Current and Bottom FET Current are also calculated in response to the Offset variable. The result is an offset correction value that reduces temperature effects of the A/D converters while still allowing for offset correction of the hardware.

Next, operation 822 updates variable Temperature Sense in response to TEMP Result, which is the A/D converted input signal, TEMP, which is read through the ANA5 input of DSP 200. Temperature Sense is determined as, $$\text{Temperature Sense} = 4096 - \text{TEMP Result} - \text{Temperature Offset} \quad (25)$$

where Temperature Offset is from Calibration Table. Then the Temperature Sense variable is compared to the Calibration Table values Temperature Min and Temperature Max and the TEMP Over/Under flag in System Status is set if the temperature value exceeds Temperature Max or is below Temperature Min. The flag is cleared if Temperature Sense is within the normal operating range. Subtraction of TEMP Result from 4096 reverses the slope from negative to positive.

Serial Data Received (RXD) Interrupt 414

Figure 13:
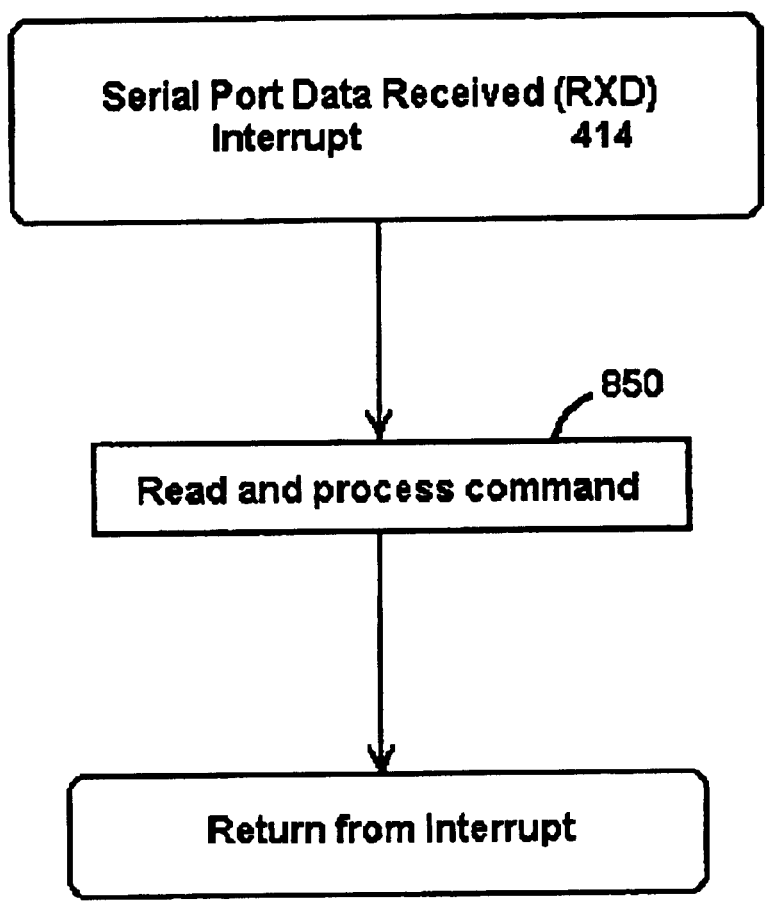
FIG. 13 is a flowchart of a Serial Port Data Received (RXD) Interrupt used in the firmware program shown in FIG. 9.

Referring now to FIG. 13, the Serial Port Data Received (RXD) Interrupt reads and responds to commands from the external data processor 50 before returning from interrupt. The possible commands, which have one or two bytes of data, together with their descriptions, are listed in Table 6 as follows:

TABLE 6

| | | | |
|---|---|---|---|
| 0 | View Setting | 1 Byte | Update the View Mode value in the Configuration variable |
| 1 | Prop Volt Gain1 Setting | 1 Byte | Update Prop Volt Gain1 in the Calibration Table |
| 2 | Integral Volt Gain1 Setting | 1 Byte | Update Integral Volt Gain1 in the Calibration Table |
| 3 | Prop Amp Gain1 Setting | 1 Byte | Update Prop Amp Gain1 in the Calibration Table |
| 4 | Integral Amp Gain Setting | 1 Byte | Update Integral Amp Gain1 in the Calibration Table |
| 5 | Temperature Gain Setting | 2 Bytes | Update Temperature Gain in the Calibration Table |

TABLE 6-continued

| | | | |
|---|---|---|---|
| 6 | Temperature Offset Setting | 2 Bytes | Update Temperature Offset in the Calibration Table |
| 7 | Integral Volt Gain2 Setting | 1 Byte | Update Prop Volt Gain2 in the Calibration Table |
| 8 | Software OVP | 2 Bytes | Update Software OVP in the Calibration Table |
| 9 | Oscillator Mode Setting | 1 Byte | Update Allow Ext Osc flag in Configuration variable |
| 10 | Osc Adjust Setting | 1 Byte | Adjust internal DSP 200 oscillator frequency and update Osc Adjust in the Configuration Table |
| 11 | Not used | | |
| 12 | Bump PWM | 1 Byte | Increase/Decrease Top Loop Result by 512 (25 nanoseconds). Command only works when System State is Normal and Closed Loop flag in Configuration is not set. |
| 13 | Current Limit Value Setting | 2 Bytes | Update Current Limit value in the Calibration Table |
| 14 | Desired Vout Setting | 2 Bytes | Update Desired Vout in the Calibration Table |
| 15 | Vout Tolerance Setting | 2 Bytes | Update Vout Tolerance in the Calibration Table |
| 16 | Vout Sense Offset Setting | 2 Bytes | Update Vout Sense Offset in the Calibration Table |
| 17 | Vout Gain Setting | 2 Bytes | Update Vout Gain in the Calibration Table |
| 18 | Not used | | |
| 19 | Current Limit Offset Setting | 2 Bytes | Update Current Limit Offset in the Calibration Table |
| 20 | Current Limit Slope Setting | 2 Bytes | Update Current Limit Slope in the Calibration Table |
| 21 | Temperature Min Setting | 2 Bytes | Update Temperature Min in the Calibration Table |
| 22 | Temperature Max Setting | 2 Bytes | Update Temperature Max in the Calibration Table |
| 23 | Vin Gain Setting | 2 Bytes | Update Vin Gain in the Calibration Table |
| 24 | Vin Sense Offset Setting | 2 Bytes | Update Vin Sense Offset in the Calibration Table |
| 25 | Current Reference Setting | 2 Bytes | Update Current Reference in the Calibration Table |
| 26 | Min Input Volt Setting | 2 Bytes | Update Min Input Volts in the Calibration Table |
| 27 | Max Input Volts Setting | 2 Bytes | Update Max Input Volts in the Calibration Table |
| 28 | Closed Loop Setting | 1 Byte | Update Closed Loop flag in the Configuration variable |
| 29 | Current Mode Setting | 1 Byte | Update Current Mode flag in the Configuration variable |
| 30 | Voltage Mode Setting | 1 Byte | Update Voltage Mode flag in the Configuration variable |
| 31 | Get Flash | 1 Byte | Set Get Flash flag for background loop |
| 32 | Write Flash | 1 Byte | Set Write Flash flag for background loop |
| 33 | Stream Data Setting | 1 Byte | Update Stream Data flag in Configuration variable |
| 34 | Ext OSC Low Limit Setting | 2 Bytes | Update Ext OSC Low Limit in the Calibration Table |
| 35 | Ext OSC Hi Limit Setting | 2 Bytes | Update Ext OSC Hi Limit in the Calibration Table |

Current Share Input Interrupt 416

Figure 14A:
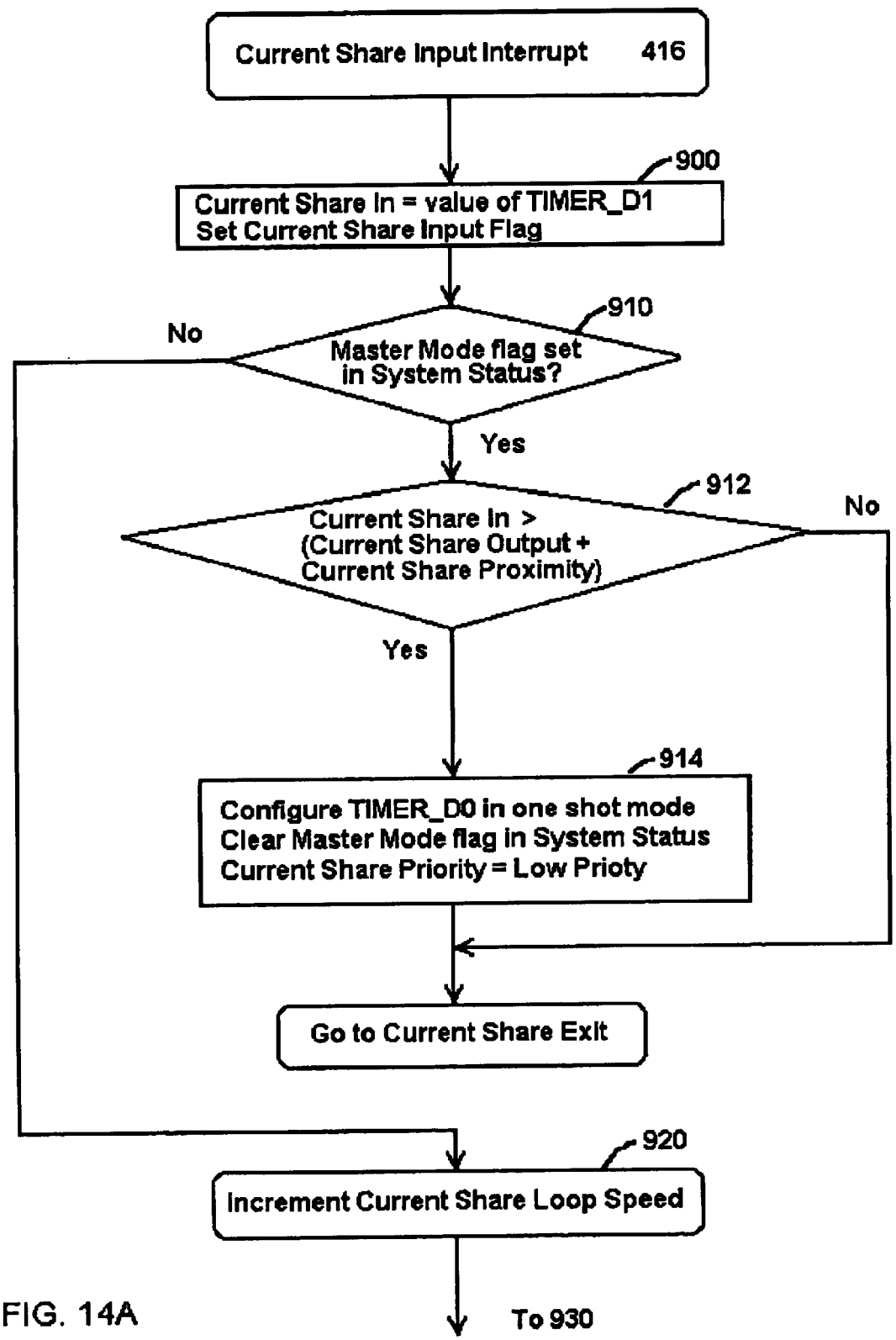
FIGS. 14A, 14B and 14C are a flowchart of a Current Share Input Interrupt used in the firmware program shown in FIG. 9.
Figure 14B:
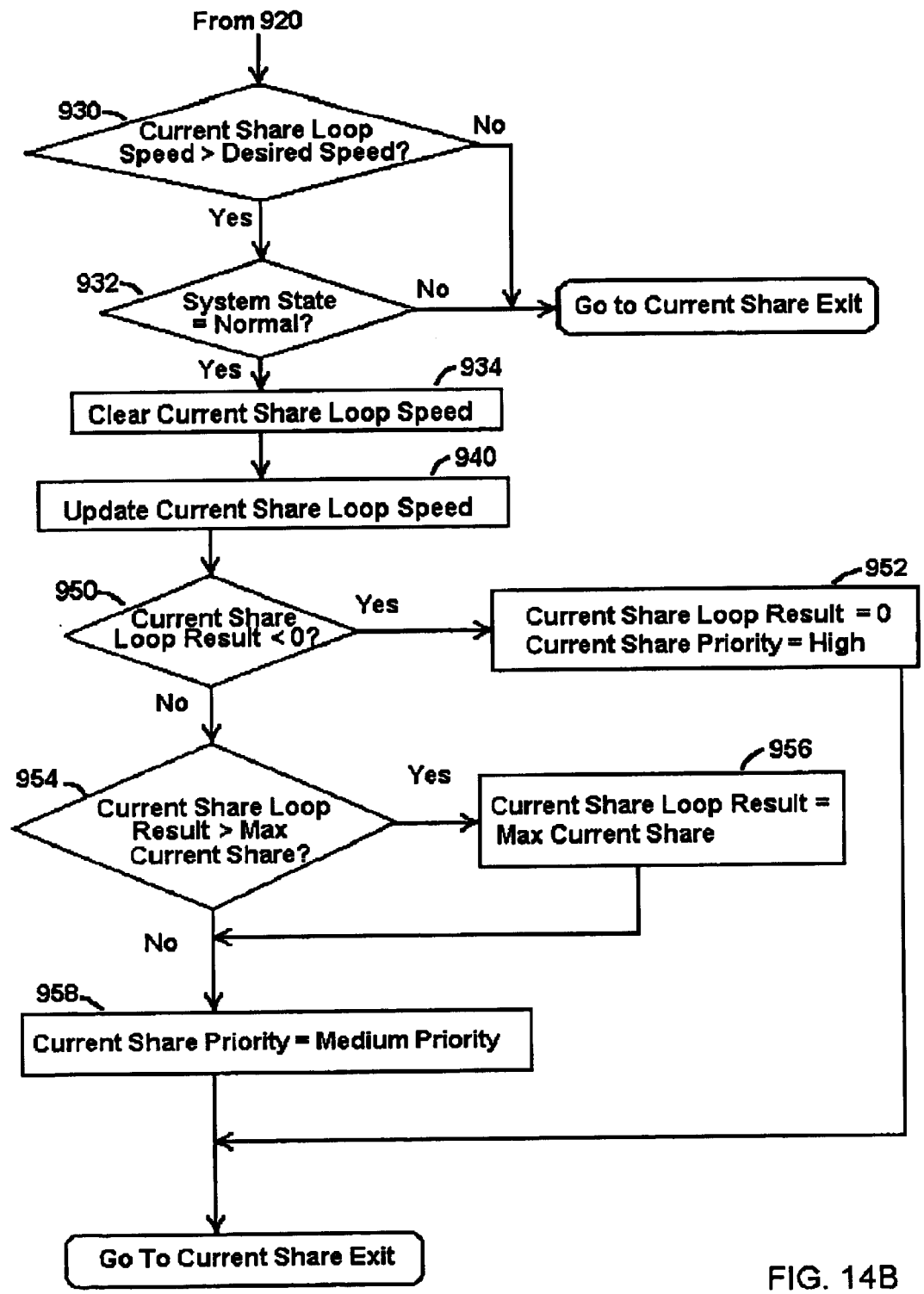
Figure 14C:
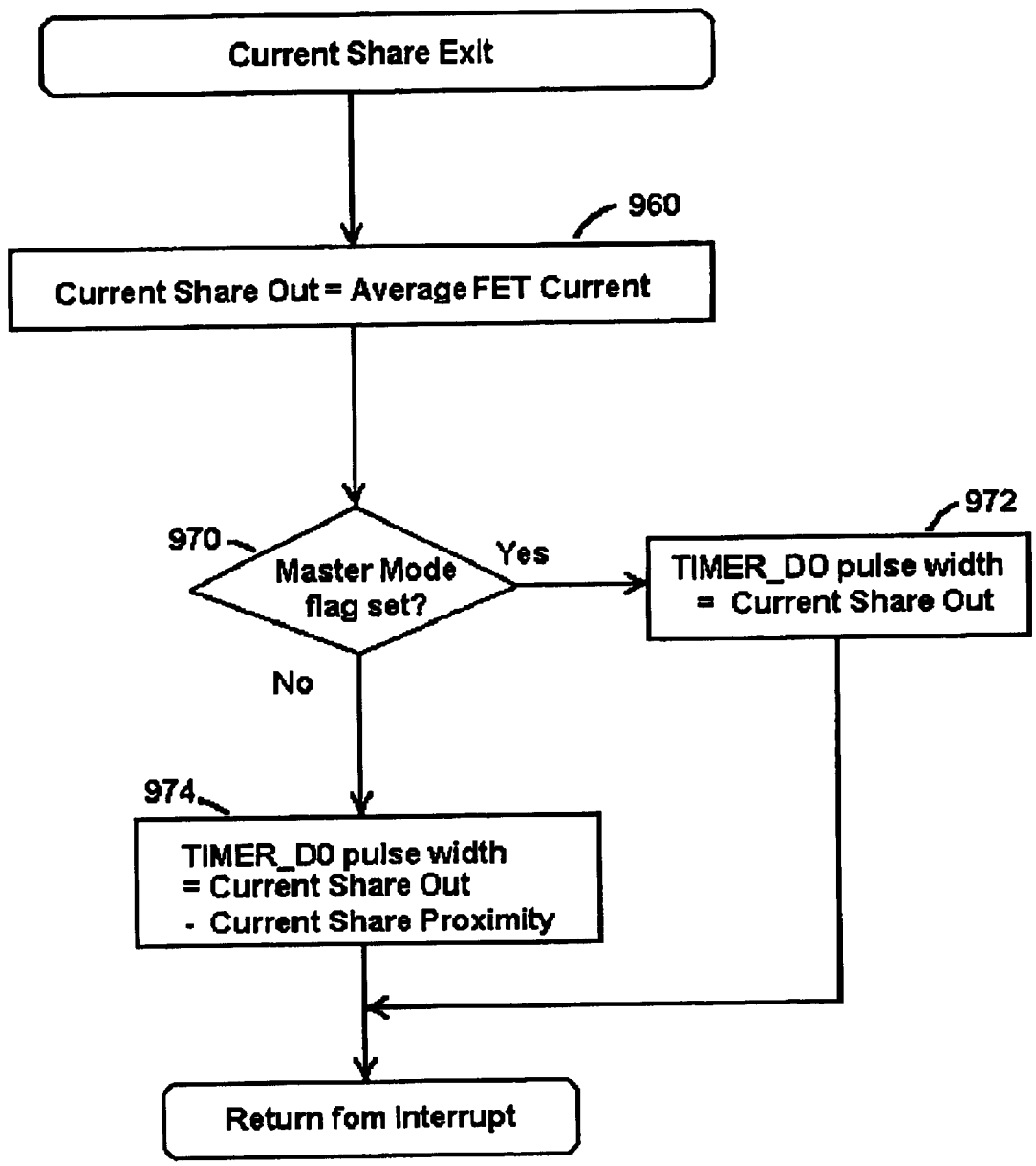

Referring now to FIGS. 14A–14C, the Current Share Input Interrupt 416 is executed on each positive edge of the CS signal on current share bus 62 (the negative edge of the TD1 input to DSP 200). The interrupt begins by setting variable Current Share In to the value of TIMER_D1 and by setting a Current Share Input flag at operation 900. While the TD1 signal is high (the inverted CS bus signal is low), TIMER_D1 counts. The high time of the TD1 signal represents the value of the Average FET Current variable of the power supply that has the greatest output current, which is typically the master.

Next, test 910 determines whether the DSP 200 is in master mode by seeing whether or not the Master Mode flag in System Status is set. If yes, a check is made to see if any other power supply is outputting more current (actually, inputting) by determining whether or not Current Share In is greater than (Current Share Out+Current Share Proximity). (Current Share Proximity is 200*25 nanoseconds=5 microseconds.) If no, the power supply is still the master and the code jumps to subpart Current Share Exit. If the power supply is not putting out the most current its master status is surrendered at operation 914 by configuring TIMER_D0 to one shot mode responsive to the CS input, clearing the Master Mode flag in System Status setting Current Share Priority to Low Priority (Low Priority=6). The code then jumps to subpart Current Share Exit.

Normally the other connected power supplies operating in the slave mode purposely a broadcast a narrower pulse width than the master. The magnitude of the pulse width reduction is Current Share Proximity, which has a value of 200 (200*25 nanoseconds=5 microseconds). This means that the output pulse width of slave power supplies should always be Current Share Proximity less than the master. If a slave pulse width ever becomes Current Share Proximity greater than the master, the master changes to slave mode. Current Share Priority is used to determine how quickly a power supply attempts to become the new master. When a power supply was previously the master some defect or output voltage drift due to temperature or aging possibly caused it to lose its master status and it is set to the lowest priority upon transition to slave status to give preference to becoming the new master to a higher priority unit that is presumably operating properly.

If test 910 indicates that the DSP 200 is operating in the slave mode then a variable Current Share Loop Speed is incremented at operation 920 and tested at test 930. When operating in the slave mode the speed of the current share loop is controlled by variable Current Share Loop Speed. This means that the current share loop is only processed once every Desired Speed interrupts, where Desired Speed= 5. Another requirement for processing the current share loop is the System State variable being set to Normal (supplying power). Thus, if test 930 indicates that Current Share Loop Speed is not greater than Desired Speed or the subsequent test 932 indicates that System State is not Normal, the Current Share Interrupt branches to subpart Current Share Exit.

However, if the DSP 200 is in slave mode, Current Share Loop Speed is greater than Desired Speed and System State is Normal, operation 934 clears Current Share Loop Speed and operation 940 updates Current Share Loop Result. Only the integral portion of the PID (proportional integral derivative) algorithm is used for the current share loop. The Error term is divided by 128 to increase the resolution of the integrator. The update equations are:

$$\text{Error} = \text{Current Share In} - \text{Current Share Out} \quad (26)$$

$$\text{Current Share Loop Result} = (\text{Error} * \text{Current Share Gain}) / 128 + \text{Current Share Loop Result} \quad (27)$$

where Current Share Gain=2.

Current Share Loop Result is used to increase the output voltage of the power supply so the output current matches the output current of the master. Slave power supplies are allowed to increase their output voltage above the nominal value if more output current is needed, but cannot decrease the output voltage below nominal value (5 volts in the present example). Once a slave reduces its nominal or base output voltage to the nominal value as it tries to keep its current output equal to that of the master, it does not further decrease its output voltage and begins increasing its priority for becoming a new current share master. If the slave power supply has not reached the nominal or base output voltage, it has a medium priority for becoming a new master.

If test 950 indicates that Current Share Loop Result is less than 0 after it is updated at operation 940, operation 952 sets Current Share Loop Result to zero and sets Current Share Priority to High Priority=0 before branching to subpart Current Share Exit. If Current Share Loop Result is not less than zero, test 954 determines whether or not Current Share Loop Result is greater than Max Current Share, where Max Current Share=Vout Tolerance in the Calibration Table=158 (a calibrated value representing 250 millivolts). If yes, operation 956 sets Current Share Loop Result to Max Current Share before proceeding to set Current Share Priority to Medium Priority (Medium Priority=3) at operation 958. If no, Current Share Priority is set to Medium Priority at operation 958 without changing Current Share Loop Result. After operation 958, execution of the Current Share Input Interrupt 416 branches to subpart Current Share Exit.

Before returning from interrupt subpart Current Share Exit executes operation 960 to calculate Current Share Out and then set the TIMER_D0 pulse width in response to Current Share Out. Current Share Out is determined as follows:

$$\text{Current Share Out} = \text{Average FET Current} + \text{Current Share Base} \quad (28)$$

where Current Share Base=1000 and corresponds to 25 microseconds (1000*25 nanoseconds). Current Share Out is the pulse width that represents the power supply current and is used to process the current share loop. Current Share Base is a constant that guarantees a minimum pulse width for the CS signal.

After updating Current Share Out at operation 960, test 970 determines whether DSP 200 is operating in master mode or slave mode by determining whether or not the Master Mode flag is set in System Status. If operating in master mode, the TIMER_D0 pulse width is set to Current Share Out at operation 972 before returning from interrupt. If operating in slave mode, the TIMER_D0 pulse width is set to Current Share Out−Current Share Proximity at operation 974 before returning from interrupt. The reduced pulse width for slave mode maintains the slave pulse width narrower than the master unit pulse width even though the currents are substantially equal.

Over Voltage FAULT Interrupt 418

The Over Voltage FAULT Interrupt 418 is executed each time an over voltage condition causes a logic one signal to be asserted at the IRQ input to DSP 200. The interrupt sets a software IRQ Over Voltage flag that enables the background loop 406 to determine that a fault condition was caused by an over voltage condition as opposed to an over current condition. The DSP 200 then returns from interrupt.

General

As used in this specification, the word "or" is intended to mean an inclusive or covering either alternative or both alternatives unless the context explicitly indicates otherwise.

In the following claims, it is intended that a claim element be interpreted as a means plus function or step plus function claim element that is to be interpreted to cover the corresponding structure, material or acts described in the specification and equivalents thereof as specified by 35 USC §

112, paragraph 6, when and only when, the claim element recites the express language "means for" or "step" for performing a function. Use of the word "act" in a process or method claim recitation is intended to exclude interpretation of the recitation as being limited covering only the corresponding structure, material or acts described in the specification and equivalents thereof.

While there has been shown and described a DC to DC power converter system and method for the purpose of enabling a person of ordinary skill in the art to make and use the invention, it will be appreciated that the invention is not limited thereto. For example, specific features or circuits may be disclosed as implemented in a preferred or alternative embodiment of the invention. However, the disclosure of a specific feature or circuit does not mean that the feature or circuit is required for all implementations of the invention or that an alternative feature or circuit (whether or not specifically disclosed) could not be used in place of the disclosed feature or circuit. The embodiment or embodiments described herein are intended to exemplify, but not limit the claimed invention. The subject matter which applicants regards as the invention is defined by the attached claims. Accordingly, any modifications variations or equivalent arrangements within the scope of the attached claims should be considered to be within the scope of the invention.

What is claimed is:

1. A DC to DC power converter comprising:
   a pulse width modulated power converter circuit providing a regulated DC output voltage to a power converter output at a selected voltage magnitude in response to a pulse width modulation control signal;
   an output voltage detector generating an output voltage signal that is representative of the regulated DC output voltage; and
   a digital data processor generating the pulse width modulation control signal in response to the output voltage signal.

2. A DC to DC power converter according to claim 1 wherein the digital data processor is a digital signal processor (DSP) having an analog input receiving an analog representation of the output voltage signal, having an analog to digital converter converting the analog representation of the output voltage signal to a digital representation of the output voltage signal and having a pulse width modulation output generating the pulse width modulation control signal in response to the digital representation of the output voltage signal.

3. A DC to DC power converter according to claim 1 wherein the digital data processor is a digital signal processor implemented on a single integrated circuit chip having an analog input receiving an analog representation the output voltage signal, having an analog to digital converter converting the analog representation of the output voltage signal to a digital representation of the output voltage signal and having a pulse width modulation output generating the pulse width modulation control signal under program control in response to the digital representation of the output voltage signal.

4. A DC to DC power converter according to claim 1 wherein the digital data processor is a digital signal processor having an analog input receiving an analog representation of the output voltage signal and having a pulse width modulation output generating the pulse width modulation control signal in response to the analog representation of the output voltage signal with a pulse width selected to maintain the regulated DC output voltage at the selected voltage magnitude.

5. A DC to DC power converter according to claim 1 wherein the regulated DC output voltage varies in response to a duration of an active duty cycle portion of the pulse width modulation control signal.

6. A DC to DC power converter according to claim 1 wherein the digital data processor is a digital signal processor having an analog input having a maximum allowable voltage, the analog input receiving an analog signal representation of the output voltage signal generated by the output voltage detector, the output voltage signal generated by the output voltage detector being scaled by the output voltage detector to provide an analog signal representation at the analog input to the digital data processor that is substantially 80% of the maximum allowable voltage of the analog input when the DC to DC converter output voltage is at the selected voltage magnitude.

7. A DC to DC power converter according to claim 1 wherein the digital data processor is a digital signal processor having an analog input having a maximum allowable voltage, the analog input receiving an analog signal representation of the output voltage signal generated by the output voltage detector, the output voltage signal generated by the output voltage detector being scaled by the output voltage detector to provide an analog signal representation at the analog input to the digital data processor that is between 70% and 90% of the maximum allowable voltage of the analog input when the DC to DC converter output voltage is at the selected voltage magnitude.

8. A DC to DC power converter according to claim 1 further comprising a current sense circuit generating a current signal that is representative of input current to the DC to DC power converter and a second pulse width modulated power converter circuit providing a regulated DC output voltage to the converter output at the selected voltage magnitude in response to a second pulse width modulation control signal, the digital data processor receiving a representation of the current signal, generating the second pulse width modulation control signal when the representation of the current signal is above a selected threshold magnitude and discontinuing generation of the second pulse width modulation control signal when the representation of the current signal drops below the selected threshold magnitude.

9. A DC to DC power converter according to claim 1 further comprising a current sense circuit generating a current signal that is representative of input current to the DC to DC converter and a second pulse width modulated power converter circuit providing a regulated DC output voltage to the converter output at the selected voltage magnitude in response to a second pulse width modulation control signal, the digital data processor receiving a representation of the current signal, generating the second pulse width modulation control signal when the representation of the current signal is above a selected threshold magnitude and discontinuing generation of the second pulse width modulation control signal when the representation of the current signal drops below the selected threshold magnitude, the digital data processor generating the first mentioned and second pulse width modulation control signals at a first frequency when both pulse width modulation control signals are being generated and generating the first mentioned pulse width modulation control signal at a second frequency greater than the first frequency when only the first mentioned pulse width modulation control signal is being generated.

10. A DC to DC power converter according to claim 1 further comprising a current sense circuit generating a current signal that is representative of output current provided by the DC to DC converter to the converter output, the digital data processor receiving a representation of the current signal and a current share signal having a pulse width that is representative of current provided to the converter output by another DC to DC power converter, the digital data processor generating the pulse width modulation control signal in response to the received representation of the current signal with a pulse width commanding an output current to the converter output that is less than the current indicated by the current share signal.

11. A DC to DC power converter according to claim 1 further comprising a current sense circuit generating a current signal that is representative of output current provided by the DC to DC converter to the converter output, the digital data processor receiving a representation of the current signal and receiving a current share signal having a pulse width that is representative of current provided to the converter output by another DC to DC power converter, the digital data processor generating the pulse width modulation control signal in response to the received representation of the current signal to command the converter circuit to provide to the converter output a current that is less than the current indicated by the current share signal.

12. A DC to DC power converter according to claim 1 further comprising a current sense circuit generating a current signal that is representative of input current to the DC to DC power converter and a second pulse width modulated power converter circuit providing a regulated DC output voltage to the converter output at the selected voltage magnitude in response to a second pulse width modulation control signal, the digital data processor receiving a representation of the current signal, generating the second pulse width modulation control signal when the representation of the current signal is above a selected threshold and discontinuing generation of the second pulse width modulation control signal to generate only the first mentioned pulse width modulation control signal when the representation of the current signal drops below the selected threshold magnitude, the digital data processor generating the first mentioned and second pulse width modulation control signals at a first frequency when both pulse width modulation control signals are being generated and generating the first mentioned pulse width modulation control signal at a second frequency twice the first frequency when only the first mentioned pulse width modulation control signal is being generated.

13. A DC to DC power converter according to claim 1 further comprising a current sensing circuit generating a current signal that is representative of output current generated by the DC to DC power converter, the digital data processor receiving an analog signal representation of the current signal and generating as an output a current share signal having a repetitive pulse having a pulse width that is indicative of the output current indicated by the analog signal representation of the current signal.

14. A DC to DC power converter according to claim 1 further comprising a current sense circuit generating a current signal that is representative of output current from the DC to DC power converter and wherein the digital data processor receives an analog signal representation of the current signal and generates the pulse width modulation control signal in response to the output voltage signal and the analog signal representation of the current signal.

15. A DC to DC power converter according to claim 1 further comprising a second pulse width modulated power converter circuit providing current to the power converter output in response to a second pulse width modulation control signal, a first current sense circuit generating a first current signal that is representative of the current output of the first mentioned pulse width modulated power converter circuit, a second current sense circuit generating a second current signal that is representative of the current output of the second pulse width modulated power converter circuit, the digital data processor generating the second pulse modulation control signal in response to the first and second current signals to maintain the first and second current signals substantially equal.

16. A DC to DC power converter according to claim 1 further comprising a second pulse width modulated power converter circuit providing current to the power converter output in response to a second pulse width modulation control signal, a first current sense circuit generating a first current signal that is representative of the current output of the first mentioned pulse width modulated power converter circuit, and a second current sense circuit generating a second current signal that is representative of the current output of the second pulse width modulated power converter circuit, and wherein the digital data processor is a digital signal processor having analog inputs receiving analog signal representations of the output voltage signal, the first current signal and the second current signal, and a plurality of pulse width modulation outputs generating the first mentioned and second pulse width modulation control signals, the second pulse width modulation control signal being generated in response to the received analog signal representations of the first and second current signals with an active duty cycle portion selected to maintain the current output of the second pulse width modulated power converter circuit substantially equal to the current output of the first mentioned pulse width modulated power converter circuit.

17. A DC to DC power converter according to claim 1 wherein the pulse width modulation control signal and the output voltage signal are part of a standardized interface having standardized signal levels and information representations that can remain substantially unchanged notwithstanding changes in the design of the pulse width modulated power converter.

18. A DC to DC power converter according to claim 1 further comprising an auxiliary power converter providing auxiliary power and an input voltage signal and a current sense circuit providing a current signal representing output current generated by the pulse width modulated power converter circuit, and wherein the digital data processor is a digital signal processor operating in response to the auxiliary power and having a pulse width modulation output providing the pulse width modulation control signal as a continuous stream of pulses having a frequency and active pulse width selected under program control, the digital data processor having a plurality of analog inputs receiving representations of the output voltage signal, the input voltage signal and the current signal.

19. A DC to DC power converter according to claim 1 further comprising an auxiliary power converter providing auxiliary power and an input voltage signal and a current sense circuit providing a current signal representing output current generated by the pulse width modulated power converter circuit, and wherein the digital data processor is a digital signal processor operating in response to the auxiliary power and having a pulse width modulation output providing the pulse width modulation control signal as a continuous stream of pulses having a frequency and active pulse width selected under program control, the digital data processor having a plurality of analog inputs having a predetermined signal range, the analog inputs receiving representations of the output voltage signal, the input voltage signal and the current signal at signal levels selected to utilize substantially the full resolution of the signals range of the analog inputs.

20. A DC to DC power converter according to claim 1 wherein the digital data processor stores a calibration table containing at least one calibration value that compensates for component tolerance variations in the pulse width modulated power converter circuit and wherein the digital data processor generates the pulse width modulated control signal in response to at least one value in the calibration table.

21. A DC to DC power converter according to claim 1 wherein the digital data processor stores a calibration table containing a plurality of calibration values that are determined in response to actual component values in the pulse width modulation power converter circuit and that provide compensation for the component tolerance variations in the pulse width modulated power converter circuit and wherein the digital data processor generates the pulse width modulated control signal in response to the plurality of values in the calibration table.

22. A DC to DC power converter according to claim 1 wherein the digital data processor stores a calibration table containing a plurality of calibration values that are selected to provide compensation for the component tolerance variations in the pulse width modulated power converter circuit and wherein the digital data processor generates the pulse width modulated control signal in response to the plurality of values in the calibration table.

23. A DC to DC power converter according to claim 1 further comprising an input voltage detector generating an input voltage signal that is representative of input voltage to the DC to DC power converter and a current detector generating a current signal that is representative of current received by the DC to DC power converter and wherein the digital data processor stores a calibration table containing a plurality of calibration values that are selected to provide compensation for the component tolerance variations in the output voltage detector, the input voltage detector and the current detector and wherein the digital data processor generates the pulse width modulated control signal in response to the plurality of values in the calibration table, the output voltage signal, the input voltage signal and the current signal.

24. A DC to DC power converter according to claim 1 further comprising an input voltage detector generating an input voltage signal that is representative of input voltage to the DC to DC power converter and a current detector generating a current signal that is representative of current received by the DC to DC power converter and wherein the digital data processor stores a calibration table containing a plurality of calibration values that are selected to provide compensation for the component tolerance variations in the output voltage detector, the input voltage detector and the current detector, the plurality of calibration values including a desired output voltage calibration value having a value set to the value of an output voltage sense signal derived in response to the output voltage signal when the output voltage is at a desired magnitude, and wherein the digital data processor generates the pulse width modulated control signal in response to the plurality of values in the calibration table, the output voltage signal, the input voltage signal and the current signal.

25. A DC to DC power converter according to claim 1 further comprising an input voltage detector generating an input voltage signal that is representative of input voltage to the DC to DC power converter and a current detector generating a current signal that is representative of current received by the DC to DC power converter and wherein the digital data processor stores a calibration table containing a plurality of calibration values that are selected to provide compensation for the component tolerance variations in the output voltage detector, the input voltage detector and the current detector, the plurality of calibration values including values of set points and limits that allow the pulse width modulation control signal to generate in response to sensed output voltage, sensed input voltage and sensed current variables that are determined in response to the output voltage signal, the input voltage signal and the current signal, respectively without compensation in response to calibration values.

26. A DC to DC power converter comprising:
a pulse width modulated power converter circuit providing current to a regulated DC output in response to a pulse width modulated control signal;
a current detector generating a current signal that is representative of input current to the pulse width modulated power converter circuit; and
a digital data processor receiving the current signal and a current share input signal indicating a current magnitude, the data processor generating the pulse width modulated control signal in response to the current signal and the current share signal with an active duty cycle portion tending to maintain the current provided by the pulse width modulated power converter circuit to the regulated DC output equal to the current magnitude indicated by the current share signal.

27. A DC to DC power converter comprising:
a pulse width modulated power converter circuit providing current to a regulated DC output in response to a pulse width modulated control signal, the pulse width modulated power converter circuit including a power transformer having a primary winding receiving input current and a secondary winding coupled to provide the current to the regulated DC output, the input current having a cyclical signal characteristic with the input current reaching a peak at the termination of an active duty cycle portion of each cycle of the pulse width modulated control signal;
a current detector generating a current signal that is representative of input current to the pulse width modulated power converter circuit, the current detector including a sample and hold circuit that is responsive to the input current to the pulse width modulated power converter circuit and responsive to the pulse width modulated control signal, the sample and hold circuit generating a peak current signal indicating the peak input current at the termination of each active duty cycle portion of each cycle of the pulse width modulated control signal; and
a digital data processor receiving the peak current signal and generating the pulse width modulation control signal in response to the peak current signal.

28. A DC to DC power converter according to claim 27 further comprising an output voltage detector generating an output voltage signal that is representative of a voltage at the regulated DC output and wherein the digital data processor generates the pulse width modulation control signal in response to both the peak current signal and the output voltage signal.

29. A DC to DC power converter according to claim 27 further comprising an output voltage detector generating an output voltage signal that is representative of a voltage at the regulated DC output and input voltage detector generating an input voltage signal that is representative of a voltage at the input to the pulse width modulated power converter circuit and wherein the digital data processor generates the pulse width modulation control signal in response to the peak current signal, the input voltage signal and the output voltage signal.

30. A DC to DC power converter comprising:
at least one pulse width modulated power converter circuit receiving DC power from a power converter input and providing a regulated DC output voltage to a converter output in response to at least one pulse width modulation control signal, one for each power converter circuit;
a current detector providing a current signal indicating current input to the at least one pulse width modulated power converter circuit;
an output voltage detector providing an output voltage signal indicating voltage at the converter output; and
a digital signal processor having a plurality of analog inputs receiving information in analog format, the received information including current information received in response to the current signal and indicating current input to the at least one pulse width modulated power converter circuit, and output voltage information received in response to the output voltage signal and indicating output voltage at the converter output, the digital signal processor receiving from a current share bus a pulse width modulated current share signal indicating a largest current magnitude being provided to a load by a plurality of DC to DC converters, the digital signal processor having a plurality of pulse width modulation outputs and operating under program control to generate at least one output pulse width modulation control signal controlling the generation of the at least one pulse width modulation control signal in response to the received current share signal, the received current information, and the received output voltage information, the digital signal processor operating as a current share master and controlling the voltage at the converter output when the received current information indicates a current magnitude equal to a current magnitude indicated by the received current share signal, the digital signal processor operating as a current share slave and controlling current indicated by the received current information to be less than a current magnitude indicated by the current share signal when the received current information indicates a current magnitude less than a current magnitude indicated by the received current share signal.

31. A DC to DC power converter according to claim 30 wherein the at least one pulse width modulated power converter circuit includes at least first and second pulse width modulated power converter circuit operating in response to first and second pulse width modulation control signals, respectively; the digital signal processor generating first and second output pulse width modulation control signals at a first frequency to command substantially equal current outputs from the first and second pulse width modulated power converter circuits when the received current information indicates a current magnitude sufficient to permit operation of both of the first and second pulse width modulated power converter circuits in continuous conduction mode and the digital signal processor generating the first and second output pulse width modulation control signals at a second frequency twice the first frequency to command a current output from only the first pulse width modulated power converter circuit when the received current information indicates a current magnitude that is not sufficient to permit operation of both of the first and second pulse width modulated power converter circuits in continuous conduction mode.

32. A DC to DC power converter comprising:
first and second pulse width modulated power converter circuits receiving DC power from a power converter input and providing a regulated DC output voltage to a converter output in response to first and second pulse width modulation control signals, respectively;
a current detector providing a signal indicating current input to the DC to DC power converter;
an output voltage detector providing an output voltage signal indicating voltage at the converter output; and
a digital signal processor having a plurality of analog inputs receiving information in analog format, the received information including current information received in response to the current signal and indicating current input to the DC to DC power converter and output voltage information received in response to the output voltage signal and indicating output voltage at the converter output, the digital signal processor having a plurality of pulse width modulation outputs and operating under program control to generate first and second output pulse width modulation control signals controlling the generation of the first and second pulse width modulation control signals, respectively, in response to the received current share signal, the received current information and the received output voltage information, the digital signal processor generating the first and second output pulse width modulation control signals at a first frequency to command substantially equal current outputs from the first and second pulse width modulated power converter circuits when the received current information indicates a current magnitude sufficient to permit operation of both of the first and second pulse width modulated power converter circuits in continuous conduction mode and the digital signal processor generating the first output pulse width modulation control signal at a second frequency twice the first frequency to command a current output from only the first pulse width modulated power converter circuit and no current output from the second pulse width modulated power converter circuit when the received current information indicates a current magnitude that is not sufficient to permit operation of both of the first and second pulse width modulated power converter circuits in continuous conduction mode.

33. A DC to DC power converter comprising:
first and second pulse width modulated power converter circuits receiving DC power from a power converter input and providing a regulated DC output voltage to a converter output in response to first and second pulse width modulation control signals, respectively;
a current detector providing a signal indicating current input to the DC to DC power converter;
an output voltage detector providing an output voltage signal indicating voltage at the converter output; and
a digital signal processor having a plurality of analog inputs receiving information in analog format, the received information including current information received in response to the current signal and indicating current input to the DC to DC power converter and output voltage information received in response to the output voltage signal and indicating output voltage at the converter output, the digital signal processor having a plurality of pulse width modulation outputs and operating under program control to generate first and second output pulse width modulation control signals controlling the generation of the first and second pulse width modulation control signals, respectively, in response to the received current share signal, the received current information and the received output voltage information, the digital signal processor generating the first and second output pulse width modulation control signals to command substantially equal current outputs from the first and second pulse width modulated power converter circuits when the received current information indicates a current magnitude sufficient to permit operation of both of the first and second pulse width modulated power converter circuits in continuous conduction mode and the digital signal processor generating the first output pulse width modulation control signal to command a current output from only the first pulse width modulated power converter circuit and no current output from the second pulse width modulated power converter circuit when the received current information indicates a current magnitude that is not sufficient to permit operation of both of the first and second pulse width modulated power converter circuits in continuous conduction mode.

34. A DC to DC power converter comprising:

first and second pulse width modulated power converter circuits receiving DC power from a power converter input and providing a regulated DC output voltage to a converter output in response to first and second pulse width modulation control signals, respectively;

a current detector providing a current signal indicating current input to the DC to DC power converter;

an output voltage detector providing an output voltage signal indicating voltage at the converter output; and a digital signal processor having a plurality of analog inputs receiving information in analog format, the received information including current information received in response to the current signal and indicating current input to the DC to DC power converter and output voltage information received in response to the output voltage signal and indicating output voltage at the converter output, the digital signal processor receiving from a current share bus a pulse width modulated current share signal indicating a largest current magnitude being provided to a load by a plurality of DC to DC converters, the digital signal processor having a plurality of pulse width modulation outputs and operating under program control to generate first and second output pulse width modulation control signals controlling the generation of the first and second pulse width modulation control signals, respectively, in response to the received current share signal, the received current information and the received output voltage information, the digital signal processor operating as a current share master and controlling the voltage at the converter output when the received current information indicates a current magnitude equal to a current magnitude indicated by the received current share signal, the digital signal processor operating as a current share slave and controlling current indicated by the received current information to be less than a current magnitude indicated by the current share signal when the received current information indicates a current magnitude less than a current magnitude indicated by the received current share signal.

35. A DC to DC power converter according to claim 34 wherein the digital signal processor outputs a pulse width modulated current share signal to the current share bus having a pulse width that is indicative of a current magnitude indicated by the received current information.

36. A DC to DC power converter comprising:

a pulse width modulated power converter circuit receiving DC power from a power converter input and providing a regulated DC output voltage to a converter output in response to a pulse width modulation control signal;

a current detector providing a current signal indicating current input to the DC to DC power converter;

an output voltage detector providing an output voltage signal indicating voltage at the converter output; and a digital signal processor having a plurality of analog inputs receiving information in analog format, the received information including current information received in response to the current signal and indicating current input to the power converter circuit and output voltage information received in response to the output voltage signal and indicating output voltage at the converter output, the digital signal processor receiving from a current share bus a pulse width modulated current share signal indicating a largest current magnitude being provided to a load by a plurality of DC to DC converters, the digital signal processor having a pulse width modulation output and operating under program control to generate an output pulse width modulation control signal controlling the generation of the pulse width modulation control signals in response to the received current share signal, the received current information and the received output voltage information, the digital signal processor operating as a current share master and controlling the voltage at the converter output when the received current information indicates a current magnitude equal to a current magnitude indicated by the received current share signal, the digital signal processor operating as a current share slave and controlling current indicated by the received current information to be less than a current magnitude indicated by the current share signal when the received current information indicates a current magnitude less than a current magnitude indicated by the received current share signal.

37. A DC to DC power converter according to claim 36 wherein the digital signal processor outputs a pulse width modulated current share signal to the current share bus having a pulse width that is indicative of a current magnitude indicated by the received current information.

38. A DC to DC power converter comprising:

a pulse width modulated power converter circuit receiving DC power from a power converter input and providing a regulated DC output voltage to a converter output in response to a pulse width modulation control signal;

a current detector providing a current signal indicating current input to the DC to DC power converter;

an output voltage detector providing an output voltage signal indicating voltage at the converter output; and a digital signal processor having a plurality of analog inputs receiving information in analog format, the received information including current information received in response to the current signal and indicating current input to the power converter circuit and output voltage information received in response to the output voltage signal and indicating output voltage at the converter output, the digital signal processor receiving from a current share bus a current share signal indicating a largest current magnitude being provided to a load by one of a plurality of DC to DC converters, the digital signal processor having a pulse width modulation output and operating under program control to generate an output pulse width modulation control signal controlling the generation of the pulse width modulation control signals in response to the received current share signal, the received current information and the received output voltage information, the digital signal processor controlling the voltage at the converter output when the received current information indicates a current magnitude equal to a current magnitude indicated by the received current share signal.

39. A DC to DC power converter according to claim 38 wherein the digital signal processor outputs a current share signal to the current share bus that is indicative of a current magnitude indicated by the received current information.

40. A DC to DC power converter comprising:

a pulse width modulated power converter circuit receiving DC power from a power converter input and providing a regulated DC output voltage to a converter output in response to a pulse width modulation control signal;

a current detector providing a current signal indicating current input to the DC to DC power converter;

an output voltage detector providing an output voltage signal indicating voltage at the converter output; and a digital signal processor having a plurality of analog inputs receiving information in analog format, the received information including current information received in response to the current signal and indicating current input to the power converter circuit and output voltage information received in response to the output voltage signal and indicating output voltage at the converter output, the digital signal processor receiving from a current share bus a current share signal indicating a largest current magnitude being provided to a load by one of a plurality of DC to DC converters, the digital signal processor having a pulse width modulation output and operating under program control to generate an output pulse width modulation control signal controlling the generation of the pulse width modulation control signals in response to the received current share signal, the received current information and the received output voltage information, the digital signal processor controlling current indicated by the received current information to be less than a current magnitude indicated by the current share signal when the received current information indicates a current magnitude less than a current magnitude indicated by the received current share signal.

41. A DC to DC power converter according to claim 40 wherein the digital signal processor outputs a current share signal to the current share bus that is indicative of the a current magnitude indicated by the received current information.

42. A DC to DC power converter comprising:

first and second pulse width modulated power converter circuits receiving DC power from a power converter input and providing a regulated DC output voltage to a converter output in response to first and second pulse width modulation control signals, respectively;

first and second current detectors providing first and second current signals indicating current input to the first and second pulse width modulated power converter circuits, respectively;

an output voltage detector providing an output voltage signal indicating voltage at the converter output;

an over voltage detector providing an over voltage signal indicating voltage at an output of the first and second pulse width modulated power converter circuits;

an input voltage detector providing an input voltage signal indicating voltage at the power converter input;

an auxiliary DC to DC converter providing +12 volt and +3.8 volt DC power; and a digital signal processor operating in response to the +12 volt and +3.8 volt DC power, the digital signal processor having a plurality of analog inputs receiving information in analog format, the received information including first and second current information received in response to the first and second current signals and indicating current input to the first and second pulse width modulated power converter circuits, respectively, output voltage information received in response to the output voltage signal and indicating output voltage at the converter output, over voltage information received in response to the over voltage signal and indicating voltage at the output of the first and second pulse width modulated power converter circuits, and input voltage information received in response to the input voltage signal and indicating voltage at the power converter input, the digital signal processor receiving from a current share bus a pulse width modulated current share signal indicating a largest current magnitude being provided to a load by a plurality of DC to DC converters, the digital signal processor having a plurality of pulse width modulation outputs and operating under program control to generate first and second output pulse width modulation control signals controlling the generation of the first and second pulse width modulation controls signals, respectively, in response to the received current share signal, the received first and second current information, the received output voltage information and the received input voltage information, the digital signal processor operating as a current share master and controlling the voltage at the converter output when the received current information indicates a current magnitude equal to a current magnitude indicated by the received current share signal, the digital signal processor operating as a current share slave and controlling current indicated by the received current information to be less than a current magnitude indicated by the current share signal when the received current information indicates a current magnitude less than a current magnitude indicated by the received current share signal, the digital signal processor generating the first and second output pulse width modulation control signals at a first frequency to command substantially equal current outputs from the first and second pulse width modulated power converter circuits when the received current information indicates a current magnitude sufficient to permit operation of both of the first and second pulse width modulated power converter circuits in continuous conduction mode and the digital signal processor generating the first output pulse width modulation control signal at a second frequency twice the first frequency to command a current output from only the first pulse width modulated power converter circuit when the received current information indicates a current magnitude that is not sufficient to permit operation of both of the first and second pulse width modulated power converter circuits in continuous conduction mode, the digital signal processor discontinuing generation of the first and second output pulse width modulation control signals when the received current information indicates an over current condition or the received over voltage information indicates an over voltage condition.

43. A method of converting DC input power to voltage regulated DC output power comprising the acts of:
providing a regulated DC output voltage to a power converter output at a selected voltage magnitude in response to a pulse width modulation control signal;
generating an output voltage signal that is representative of the regulated DC output voltage; and
generating the pulse width modulation control signal in response to the output voltage signal using a digital data processor that is operating under program control.

44. A method of converting DC input power to voltage regulated DC output power according to claim 43 wherein the digital data processor is a digital signal processor (DSP) having an analog input receiving an analog representation the output voltage signal, having an analog to digital converter converting the analog representation of the output voltage signal to a digital representation of the output voltage signal and having a pulse width modulation output generating the pulse width modulation control signal in response to the digital representation of the output voltage signal.

45. A method of converting DC input power to voltage regulated DC output power according to claim 43 wherein the digital data processor is a digital signal processor implemented on a single integrated circuit chip having an analog input receiving an analog representation the output voltage signal, having an analog to digital converter converting the analog representation of the output voltage signal to a digital representation of the output voltage signal and having a pulse width modulation output generating the pulse width modulation control signal under program control in response to the digital representation of the output voltage signal.

46. A method of converting DC input power to voltage regulated DC output power according to claim 43 wherein the digital data processor is a digital signal processor having an analog input receiving an analog representation of the output voltage signal and having a pulse width modulation output, the method further comprising the act of generating the pulse width modulation control signal with the pulse width modulation output of the digital signal processor in response to the analog representation of the output voltage signal with a pulse width selected to maintain the regulated DC output voltage at the selected voltage magnitude.

47. A method of converting DC input power to voltage regulated DC output power according to claim 43 wherein the regulated DC output voltage varies in response to a duration of an active duty cycle portion of the pulse width modulation control signal.

48. A method of converting DC input power to voltage regulated DC output power comprising the acts of:
receiving DC power;
providing a regulated DC output voltage to an output in response to the received DC power and in response to at least one pulse width modulation control signal;
providing a current signal indicating current magnitude of the received DC power;
providing an output voltage signal indicating voltage at the output; and
digitally processing current information that is representative of the current magnitude indicated by the current signal and voltage information that is representative of the voltage at the output indicated by the output voltage signal to generate the at least one pulse width modulation control signal in response to the current information and the voltage information.

49. A method of converting DC input power to voltage regulated DC output power comprising the acts of:
receiving DC power;
providing a regulated DC output voltage to an output in response to the received DC power and in response to a first pulse width modulation control signal;
providing a regulated DC output voltage to an output in response to the received DC power and in response to a second pulse width modulation control signal;
providing a signal indicating current magnitude of the received DC power;
providing an output voltage signal indicating voltage at the output; and
generating first and second output control signals controlling the first and second pulse width modulation signals, respectively, with a digital signal processor having a plurality of analog inputs receiving information in analog format, the received information including current information received in response to the current signal and indicating current input to the DC to DC power converter and output voltage information received in response to the output voltage signal and indicating output voltage at the converter output, the digital signal processor having a plurality of pulse width modulation outputs and operating under program control to generate first and second output pulse width modulation control signals in response to the received current share signal, the received current information and the received output voltage information, the digital signal processor generating the first and second output pulse width modulation control signals at a first frequency to command substantially equal current outputs when the received current information indicates a current magnitude sufficient to satisfy a current magnitude test and the digital signal processor generating the first output pulse width modulation control signal at a second frequency twice the first frequency to command a current output from only the first pulse width modulated power converter circuit and no current output from the second pulse width modulated power converter circuit when the received current information indicates a current magnitude that is not sufficient to satisfy the current magnitude test.

50. A method of converting DC input power to voltage regulated DC output power comprising the acts of:
providing current to an output using first and second pulse width modulated power converter circuits receiving DC power from a power converter input and providing a regulated DC output voltage to an output in response to first and second pulse width modulation control signals, respectively;
providing a current signal indicating current input to the first pulse width modulated power converter circuit;
providing an output voltage signal indicating voltage at the output;
generating the first and second pulse width modulation control signals in response to first and second output pulse width control signals, respectively; and
generating the pulse width modulation control signals under program control using a digital signal processor having a plurality of analog inputs receiving information in analog format, the received information including current information received in response to the current signal and indicating current input to the DC to DC power converter and output voltage information received in response to the output voltage signal and indicating output voltage at the converter output, the digital signal processor receiving from a current share bus a pulse width modulated current share signal indicating a largest current magnitude being provided to a load by a plurality of DC to DC converters, the digital signal processor having a plurality of pulse width modulation outputs and operating to generate the first and second output pulse width modulation control signals in response to the received current share signal, the received current information and the received output voltage information, the digital signal processor operating as a current share master and controlling the voltage at the output when the received current information indicates a current magnitude equal to a current magnitude indicated by the received current share signal, the digital signal processor operating as a current share slave and controlling current indicated by the received current information to be less than a current magnitude indicated by the current share signal when the received current information indicates a current magnitude less than a current magnitude indicated by the received current share signal.

51. A method of convening DC input power to voltage regulated DC output power according to claim 50, wherein the digital signal processor outputs a pulse width modulated current share signal to the current share bus having a pulse width that is indicative of the a current magnitude indicated by the received current information.

52. A method of converting DC input power to voltage regulated DC output power comprising the acts of:

providing current to an output using a pulse width modulated power converter circuit receiving DC power from a power converter input and providing a regulated DC output voltage to an output in response to a pulse width modulation control signal;

providing a current signal indicating current input to the first pulse width modulated power converter circuit;

providing an output voltage signal indicating voltage at the output;

generating the pulse width modulation control signal in response to an output pulse width control signals; and generating the pulse width modulation control signals under program control using a digital signal processor having a plurality of analog inputs receiving information in analog format, the received information including current information received in response to the current signal and indicating current input to the DC to DC power converter and output voltage information received in response to the output voltage signal and indicating output voltage at the converter output, the digital signal processor receiving from a current share bus a pulse width modulated current share signal indicating a largest current magnitude being provided to a load by a plurality of DC to DC converters, the digital signal processor having a plurality of pulse width modulation outputs and operating to generate the output pulse width modulation control signal in response to the received current share signal, the received current information and the received output voltage information, the digital signal processor operating as a current share master and controlling the voltage at the output when the received current information indicates a current magnitude equal to a current magnitude indicated by the received current share signal, the digital signal processor operating as a current share slave and controlling current indicated by the received current information to be less than a current magnitude indicated by the current share signal when the received current information indicates a current magnitude less than a current magnitude indicated by the received current share signal.

53. A method of converting DC input power to voltage regulated DC output power according to claim 52, wherein the digital signal processor outputs a pulse width modulated current share signal to the current share bus having a pulse width that is indicative of the a current magnitude indicated by the received current information.

54. A method of converting DC input power to voltage regulated DC output power comprising the acts of:

providing current to an output using a pulse width modulated power converter circuit receiving DC power from a power converter input and providing a regulated DC output voltage to an output in response to a pulse width modulation control signal;

providing a current signal indicating current input to the first pulse width modulated power converter circuit;

providing an output voltage signal indicating voltage at the output;

generating the pulse width modulation control signal in response to an output pulse width control signals; and generating the pulse width modulation control signals under program control using a digital signal processor having a plurality of analog inputs receiving information in analog format, the received information including current information received in response to the current signal and indicating current input to the DC to DC power converter and output voltage information received in response to the output voltage signal and indicating output voltage at the converter output, the digital signal processor receiving from a current share bus a pulse width modulated current share signal indicating a largest current magnitude being provided to a load by a plurality of DC to DC converters, the digital signal processor having a plurality of pulse width modulation outputs and operating to generate the output pulse width modulation control signal in response to the received current share signal, the received current information and the received output voltage information, the digital signal processor operating as a current share master and controlling the voltage at the output when the received current information indicates a current magnitude equal to a current magnitude indicated by the received current share signal.

55. A method of converting DC input power to voltage regulated DC output power comprising the acts of:

providing current to an output using a pulse width modulated power converter circuit receiving DC power from a power converter input and providing a regulated DC output voltage to an output in response to a pulse width modulation control signal;

providing a current signal indicating current input to the first pulse width modulated power converter circuit;

providing an output voltage signal indicating voltage at the output;

generating the pulse width modulation control signal in response to an output pulse width control signals; and generating the pulse width modulation control signals under program control using a digital signal processor having a plurality of analog inputs receiving information in analog format, the received information including current information received in response to the current signal and indicating current input to the DC to DC power converter and output voltage information received in response to the output voltage signal and indicating output voltage at the converter output, the digital signal processor receiving from a current share bus a pulse width modulated current share signal indicating a largest current magnitude being provided to a load by a plurality of DC to DC converters, the digital signal processor having a plurality of pulse width modulation outputs and operating to generate the output pulse width modulation control signal in response to the received current share signal, the received current information and the received output voltage information, the digital signal processor operating as a current share slave and controlling current indicated by the received current information to be less than a current magnitude indicated by the current share signal when the received current information indicates a current magnitude less than a current magnitude indicated by the received current share signal.

56. A DC to DC power converter comprising:
a pulse width modulated power converter circuit providing a regulated DC output voltage to a power converter output at a selected voltage magnitude in response to a pulse width modulation control signal;
an output voltage detector generating an output voltage signal that is representative of the regulated DC output voltage; and
a digital data processor generating the pulse width modulation control signal in response to the received output voltage signal to command the power converter circuit to maintain the regulated DC output voltage.

57. A DC to DC power converter comprising:
a pulse width modulated power converter providing a regulated DC output voltage in response to pulse width modulation control signal;
an output voltage detector generating an output voltage signal that is representative of the regulated DC output voltage;
an output current detector generating an output current signal that is representative of the output current;
a digital data processor receiving the output voltage signal and the output current signal and generating the pulse width modulation control signal in response to the received
output voltage signal and output current signal to maintain the DC output voltage at a selected magnitude.

58. A DC to DC power converter system comprising:
a current share bus; and
a plurality of DC to DC converter units providing electrical power to a system output with the total current at the system output being shared substantially equally be each of the DC to DC converter units, each DC to DC converter unit including:
an output voltage detector generating an output voltage signal that is representative of the voltage at the system output;
a current sensing circuit generating an output current signal that is representative of a current provided to the system output by the DC to DC converter unit;
a DC to DC converter receiving DC power as an input and providing DC power to the system output in response to a pulse width modulation control signal; and
a digital data processor operating under control of a program, the digital data processor maintaining a priority status indication, receiving an indication of output voltage in response to the output voltage signal generated by the output voltage detector, receiving an indication of the DC to DC converter unit output current magnitude in response to the output current signal generated by the current sensing circuit, and being connected to receive a current share signal from the current share bus,
the current share signal being a repetitive signal having a pulse width that is indicative of current magnitude being provided to the system output by one of the plurality of DC to DC converter units if one of the DC to DC converter units is operating current share bus master and having no pulses if no DC to DC converter unit is operating as bus master,
if one of the DC to DC converter units is operating as a current share master, the current share master asserting current share pulses onto the current share bus at a selected pulse rate and with a pulse width that is representative of the current that is being provided by the current master, the current share master terminating asserting current share pulses onto the current share bus if a pulse on the current share bus has a pulse width greater than the width of a current share pulse asserted by the current share master, each additional DC to DC converter unit operating as a current share slave by:
if the output voltage indicated by the output voltage signal indicates a voltage at the system output that is at or above a selected magnitude, providing a current substantially equal to the current indicated by the width of pulses appearing on the current share bus,
if the output voltage indicated by the output voltage signal indicates a voltage at the system output that is not at or above the selected magnitude, providing a current sufficient to tend maintain the output voltage indicated by the output voltage signal at the selected magnitude, and
each current share slave responding to the beginning of each pulse on the current share bus by asserting on the current share bus a pulse having a pulse width representing a current that is no greater than the current output by the current share slave,
if no pulses appear on the current share bus for a predetermined period of time that is longer than an expected time between pulses, the digital data processor of each DC to DC converter increasing the priority status indication until the priority status indication reaches a top priority or until a pulse appears on the current share bus, whichever occurs first, the digital data processor which first reaches a top priority status beginning operation as bus master by asserting current share pulses onto the current share bus with the selected pulse rate and with a pulse width that is representative of the current that is being provided to the output.

59. A DC to DC power converter system according to claim 58 wherein the width of each pulse asserted on the current share bus by each current share slave having a pulse width representing a current that is less than the actual current output by the current share slave by a tolerance amount, the tolerance amount being selected to assure that as long as the output voltage is at or above the selected magnitude, the width of the pulses asserted onto the current share bus by the current share slave will not exceed the width of the pulses asserted onto the current share bus by the current share master.

60. A DC to DC power converter system comprising:
  means for providing a regulated DC output voltage to a power converter output at a selected voltage magnitude in response to a pulse width modulation control signal;
  means for generating an output voltage signal that is representative of the regulated DC output voltage; and
  a digital data processor that is operating under program control to generate the pulse width modulation control signal in response to the output voltage signal.

61. A DC to DC power converter system comprising according to claim 60, wherein the digital data processor is a digital signal processor (DSP) having an analog input receiving an analog representation the output voltage signal, having an analog to digital converter converting the analog representation of the output voltage signal to a digital representation of the output voltage signal and having a pulse width modulation output generating the pulse width modulation control signal in response to the digital representation of the output voltage signal.

62. A DC to DC power converter system comprising according to claim 60 wherein the digital data processor is a digital signal processor implemented on a single integrated circuit chip having an analog input receiving an analog representation the output voltage signal, having an analog to digital converter converting the analog representation of the output voltage signal to a digital representation of the output voltage signal and having a pulse width modulation output generating the pulse width modulation control signal under program control in response to the digital representation of the output voltage signal.

63. A DC to DC power converter system comprising:
  means for providing a regulated DC output voltage to an output in response to received DC power and in response to at least one pulse width modulation control signal;
  means for providing a current signal indicating current magnitude of the received DC power;
  an output voltage detector providing an output voltage signal indicating voltage at the output; and
  means for digitally processing current information that is representative of the current magnitude indicated by the current signal and voltage information that is representative of the voltage at the output indicated by the output voltage signal to generate the at least one pulse width modulation control signal in response to the current information and the voltage information.

64. A DC to DC power converter system comprising:
  first means for receiving DC power and providing a regulated DC output voltage to an output in response to the received DC power and in response to a first pulse width modulation control signal;
  second means for receiving DC power and providing a regulated DC output voltage to an output in response to the received DC power and in response to a second pulse width modulation control signal;
  a current sensing circuit providing a signal indicating current magnitude of the received DC power;
  an output voltage detector providing an output voltage signal indicating voltage at the output; and
  a digital signal processor generating first and second output control signals controlling the first and second pulse width modulation signals, respectively, the digital signal processor having a plurality of analog inputs receiving information in analog format, the received information including current information received in response to the current signal and indicating current input to the DC to DC power converter and output voltage information received in response to the output voltage signal and indicating output voltage at the converter output, the digital signal processor having a plurality of pulse width modulation outputs and operating under program control to generate first and second output pulse width modulation control signals in response to the received current share signal, the received current information and the received output voltage information, the digital signal processor generating the first and second output pulse width modulation control signals at a first frequency to command substantially equal current outputs when the received current information indicates a current magnitude sufficient to satisfy a current magnitude test and the digital signal processor generating the first output pulse width modulation control signal at a second frequency twice the first frequency to command a current output from only the first pulse width modulated power converter circuit and no current output from the second pulse width modulated power converter circuit when the received current information indicates a current magnitude that is not sufficient to satisfy the current magnitude test.

65. A DC to DC power converter system comprising:
  means for providing a regulated DC output voltage to an output in response to the received DC power and in response to a first pulse width modulation control signal;
  means for providing a regulated DC output voltage to an output in response to the received DC power and in response to a second pulse width modulation control signal;
  means for providing a signal indicating current magnitude of the received DC power;
  means for providing an output voltage signal indicating voltage at the output; and
  a digital signal processor generating first and second output control signals controlling the first and second pulse width modulation signals, respectively, the digital signal processor having a plurality of analog inputs receiving information in analog format, the received information including current information received in response to the current signal and indicating current input to the DC to DC power converter and output voltage information received in response to the output voltage signal and indicating output voltage at the converter output, the digital signal processor having a plurality of pulse width modulation outputs and operating under program control to generate first and second output pulse width modulation control signals in response to the received current share signal, the received current information and the received output voltage information, the digital signal processor generating the first and second output pulse width modulation control signals to command substantially equal current outputs when the received current information indicates a current magnitude sufficient to satisfy a current magnitude test and the digital signal processor generating the first output pulse width modulation control signal to command a current output from only the first pulse width modulated power converter circuit and no current output from the second pulse width modulated power converter circuit when the received current information indicates a current magnitude that is not sufficient to satisfy the current magnitude test.

66. A DC to DC converter system comprising:

a plurality of DC to DC converter units providing output electrical power, each DC to DC converter unit including:

a power unit receiving power as an input and providing power as an output in response a duty cycle modulation control signal, the power unit providing an output voltage signal indicating a voltage magnitude of the output power, an input voltage signal indicating a voltage magnitude of the input power and an input current signal indicating a current magnitude of the input power;

a controller including a digital data processor generating the duty cycle modulation control signal under program control in response to the output voltage signal, the input voltage signal and the input current signal;

the plurality of DC to DC converters units all sharing the providing of output electrical power.

67. A DC to DC converter comprising:

a pulse width modulated power converter providing a regulated DC output voltage in response to an active pulse width duration of a pulse width modulation control signal;

an output voltage detector generating an output voltage signal that is representative of the regulated DC output voltage;

a digital data processor receiving the output voltage signal from the voltage detector and generating the pulse width modulation control signal in response to the received output voltage signal with an active pulse width duration that is selected to maintain the DC output voltage at a selected magnitude.

68. A DC to DC converter system comprising:

a synchronization source generating a synchronization signal;

a current share bus carrying a current share signal;

a plurality of DC to DC converter units for providing output electrical power to a load with each DC to DC converter unit providing a portion of the output electrical power, each DC to DC converter unit including:

a power section having first and second power converters receiving DC power as an input and providing DC power as an output in response to first and second duty cycle modulation control signals, respectively, the first and second duty cycle modulation control signals being a part of a standardized interface to a controller, the power section providing the following power section output signals as part of the standardized interface to the controller:

a 12 volt DC power signal;

a 3.8 volt DC power signal, a first output voltage signal indicating a voltage magnitude of the output power at the load, an output voltage ground reference signal indicating a ground reference at the load, a second output voltage signal indicating a voltage magnitude of the output power at the power section, an input voltage signal indicating a voltage magnitude of the input power, an input voltage ground signal, an input current signal indicating a current magnitude of the input power, and an input current ground reference signal, the controller, including a digital data processor operating in response to a dock signal that is synchronized with the synchronization signal, the controller receiving the power section output signals and the current share signal from the current share bus and generating the first and second duty cycle modulation control signals under program control in response to the received power section output signals and the received current share signal;

one of the DC to DC converter units being a master unit generating output power in response to the first output voltage signal to tend to maintain the output voltage signal at a selected voltage and providing to the current share bus a repetitive current share signal having a pulse duration that is indicative of the output current magnitude of the master unit; and at least one second DC to DC converter unit being a slave unit generating output power with a current magnitude that is less than the current magnitude indicated by the pulse duration of the current share signal provided by the master unit except that the at least one slave unit current magnitude may be greater than the indicated master unit current magnitude if necessary the maintain the first output voltage signal of the at least one slave unit at or above the selected voltage, the at least one slave unit providing to the current share bus a current share signal having a pulse that begins in response to the beginning of the pulse provided by the master unit and has a pulse width that is indicative of the output current magnitude of the slave unit output power, the at least one slave unit assuming the role of master unit if its own current share signal pulse duration becomes greater than the current share pulse duration of the master unit.

69. A method of providing DC to DC power conversion comprising the acts of:

generating a synchronization signal;

communicating a current share signal on a current share bus;

providing output electrical power to a load using a plurality of DC to DC converter units, each DC to DC converter unit providing a portion of the output electrical power, each DC to DC converter unit including:

a power section having first and second power converters receiving DC power as an input and providing DC power as an output in response to first and second duty cycle modulation control signals, respectively, the first and second duty cycle modulation control signals being a part of a standardized interface to a controller, the power section providing the following power section output signals as part of the standardized interface to the controller:

a 12 volt DC power signal;

a 3.8 volt DC power signal, a first output voltage signal indicating a voltage magnitude of the output power at the load, an output voltage ground reference signal indicating a ground reference at the load, a second output voltage signal indicating a voltage magnitude of the output power at the power section, an input voltage signal indicating a voltage magnitude of the input power, an input voltage ground signal, an input current signal indicating a current magnitude of the input power, and an input current ground reference signal, the controller, including a digital data processor operating in response to a dock signal that is synchronized with the synchronization signal, the controller receiving the power section output signals and the current share signal from the current share bus and generating the first and second duty cycle modulation control signals under program control in response to the received power section output signals and the received current share signal;

one of the DC to DC converter units being a master unit generating output power in response to the first output voltage signal to tend to maintain the output voltage signal at a selected voltage and providing to the current share bus a repetitive current share signal having a pulse duration that is indicative of the output current magnitude of the master unit; and at least one second DC to DC converter unit being a slave unit generating output power with a current magnitude that is less than the current magnitude indicated by the pulse duration of the current share signal provided by the master unit except that the at least one slave unit current magnitude may be greater than the indicated master unit current magnitude if necessary the maintain the first output voltage signal of the at least one slave unit at or above the selected voltage, the at least one slave unit providing to the current share bus a current share signal having a pulse that begins in response to the beginning of the pulse provided by the master unit and has a pulse width that is indicative of the output current magnitude of the slave unit output power, the at least one slave unit assuming the role of master unit if its own current share signal pulse duration becomes greater than the current share pulse duration of the master unit.

70. A DC to DC power converter system comprising:

means for generating a synchronization signal;

means for communicating a current share signal;

a plurality of DC to DC converter units, each DC to DC converter unit providing a portion of the output electrical power, each DC to DC converter unit including:

a power section having first and second power converters receiving DC power as an input and providing DC power as an output in response to first and second duty cycle modulation control signals, respectively, the first and second duty cycle modulation control signals being a part of a standardized interface to a controller, the power section including means for providing the following power section output signals as part of the standardized interface to the controller:

DC power for energizing the controller, a first output voltage signal indicating a voltage magnitude of the output power at the load, a second output voltage signal indicating a voltage magnitude of the output power at the power section, an input voltage signal indicating a voltage magnitude of the input power, and an input current signal indicating a current magnitude of the input power, the controller, including a digital data processor operating in response to a clock signal that is synchronized with the synchronization signal, the controller receiving the power section output signals and the current share signal from the current share bus and generating the first and second duty cycle modulation control signals under program control in response to the received power section output signals and the received current share signal;

one of the DC to DC converter units being a master unit generating output power in response to the first output voltage signal to tend to maintain the output voltage signal at a selected voltage and providing to the current share bus a repetitive current share signal having a pulse duration that is indicative of the output current magnitude of the master unit; and at least one second DC to DC converter unit being a slave unit generating output power with a current magnitude that is less than the current magnitude indicated by the pulse duration of the current share signal provided by the master unit except that the at least one slave unit current magnitude may be greater than the indicated master unit current magnitude if necessary the maintain the first output voltage signal of the at least one slave unit at or above the selected voltage, the at least one slave unit providing to the current share bus a current share signal having a pulse that begins in response to the beginning of the pulse provided by the master unit and has a pulse width that is indicative of the output current magnitude of the slave unit output power, the at least one slave unit assuming the role of master unit if its own current share signal pulse duration becomes greater than the current share pulse duration of the master unit.

* * * * *